US009710902B2

(12) United States Patent
Di Venuto Dayer, V et al.

(10) Patent No.: US 9,710,902 B2
(45) Date of Patent: Jul. 18, 2017

(54) MEANS FOR USING MICROSTRUCTURE OF MATERIALS SURFACE AS A UNIQUE IDENTIFIER

(71) Applicant: ALPVISION S.A., Vevey (CH)

(72) Inventors: Celine Di Venuto Dayer, V, Les Paccots (CH); Martin Kutter, Remaufens (CH); Frederic Jordan, Les Paccots (CH)

(73) Assignee: ALPVISION S.A., Vevey (CH)

( * ) Notice: Subject to any disclaimer, the term of this patent is extended or adjusted under 35 U.S.C. 154(b) by 0 days.

(21) Appl. No.: 15/193,769

(22) Filed: Jun. 27, 2016

(65) Prior Publication Data

US 2016/0379358 A1 Dec. 29, 2016

Related U.S. Application Data

(63) Continuation of application No. 14/959,803, filed on Dec. 4, 2015, now Pat. No. 9,390,345, which is a
(Continued)

(30) Foreign Application Priority Data

Sep. 5, 2005 (EP) .................................. 05108123

(51) Int. Cl.
*G06K 9/00* (2006.01)
*G06T 7/00* (2017.01)
(Continued)

(52) U.S. Cl.
CPC ........ *G06T 7/0004* (2013.01); *G06K 9/00093* (2013.01); *G06K 9/00577* (2013.01);
(Continued)

(58) Field of Classification Search
USPC .................................. 382/124–127
See application file for complete search history.

(56) References Cited

U.S. PATENT DOCUMENTS

| 4,371,866 | A | 2/1983 | Smith |
| 4,490,849 | A | 12/1984 | Grumet et al. |

(Continued)

FOREIGN PATENT DOCUMENTS

| EP | 0 578 875 | 1/1994 |
| GB | 2 221 870 | 2/1990 |

(Continued)

OTHER PUBLICATIONS

International Search Report issued in International Application No. PCT/EP2006/066043, dated Jan. 8, 2007.
(Continued)

*Primary Examiner* — Alex Liew
(74) *Attorney, Agent, or Firm* — DLA Piper LLP (US)

(57) ABSTRACT

The present application concerns the visual identification of materials or documents for tracking or authentication purposes.
It describes methods to automatically authenticate an object by comparing some object images with reference images, the object images being characterized by the fact that visual elements used for comparison are non-disturbing for the naked eye. In some described approaches it provides the operator with visible features to locate the area to be imaged. It also proposes ways for real-time implementation enabling user friendly detection using mobile devices like smart phones.

13 Claims, 31 Drawing Sheets

Figure 1:
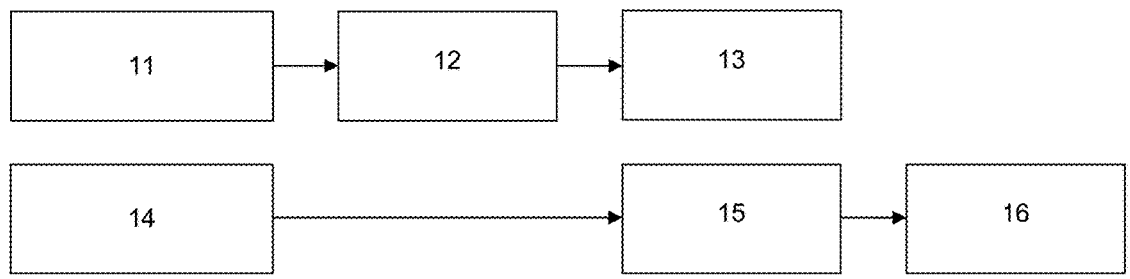

Related U.S. Application Data continuation of application No. 13/471,185, filed on May 14, 2012, now Pat. No. 9,208,394, which is a continuation-in-part of application No. 12/041,790, filed on Mar. 4, 2008, now Pat. No. 8,180,174, which is a continuation-in-part of application No. PCT/EP2006/066043, filed on Sep. 5, 2006.

(51) Int. Cl.

| | | |
|---|---|---|
| *G06K 9/32* | (2006.01) | |
| *G06K 9/62* | (2006.01) | |
| *G06K 9/68* | (2006.01) | |
| *G07D 7/121* | (2016.01) | |
| *G07D 7/2033* | (2016.01) | |
| *G06K 9/46* | (2006.01) | |
| *G06K 9/78* | (2006.01) | |
| *H04N 5/225* | (2006.01) | |
| *G04B 47/00* | (2006.01) | |

(52) U.S. Cl.
CPC .......... *G06K 9/3208* (2013.01); *G06K 9/46* (2013.01); *G06K 9/4604* (2013.01); *G06K 9/6203* (2013.01); *G06K 9/6204* (2013.01); *G06K 9/685* (2013.01); *G06K 9/6857* (2013.01); *G06K 9/78* (2013.01); *G07D 7/121* (2013.01); *G07D 7/2033* (2013.01); *H04N 5/2256* (2013.01); *G04B 47/00* (2013.01); *G06K 2009/6213* (2013.01); *G06T 2207/30176* (2013.01)

(56) References Cited

U.S. PATENT DOCUMENTS

| | | | |
|---|---|---|---|
| 5,159,647 A | | 10/1992 | Burt |
| 5,454,045 A | | 9/1995 | Perkins et al. |
| 5,959,541 A | * | 9/1999 | DiMaria ................. G06K 9/00 340/5.52 |
| 5,975,581 A | | 11/1999 | Nicolette et al. |
| 6,030,657 A | | 2/2000 | Butland et al. |
| 6,384,409 B1 | | 5/2002 | Libbey, III et al. |
| 6,459,175 B1 | | 10/2002 | Potega |
| 6,461,987 B1 | | 10/2002 | Walker et al. |
| 6,504,948 B1 | | 1/2003 | Schemmel |
| 6,546,125 B1 | | 4/2003 | Su |
| 6,547,137 B1 | | 4/2003 | Begelfer et al. |
| 6,565,000 B2 | | 5/2003 | Sehr |
| 6,584,214 B1 | | 6/2003 | Pappu et al. |
| 6,629,061 B1 | | 9/2003 | Shaffer |
| 6,706,314 B2 | | 3/2004 | Butland |
| 6,776,341 B1 | | 8/2004 | Sullivan et al. |
| 6,869,015 B2 | | 3/2005 | Cummings et al. |
| 6,920,437 B2 | | 7/2005 | Messina |
| 6,922,687 B2 | | 7/2005 | Vernon |
| 7,546,114 B1 | | 6/2009 | Glaze |
| 8,180,174 B2 | | 5/2012 | Di Venuto et al. |
| 2002/0146153 A1 | | 10/2002 | Hu |
| 2003/0014647 A1 | | 1/2003 | Bourrieres et al. |
| 2003/0076989 A1 | | 4/2003 | Maayah |
| 2003/0219145 A1 | | 11/2003 | Smith |
| 2004/0001604 A1 | * | 1/2004 | Amidror ............. G07D 7/0013 382/100 |
| 2004/0076310 A1 | | 4/2004 | Hersch |
| 2004/0079800 A1 | | 4/2004 | Sugino et al. |
| 2005/0053259 A1 | | 3/2005 | Asano et al. |
| 2005/0075984 A1 | | 4/2005 | Bourrieres et al. |
| 2006/0013486 A1 | | 1/2006 | Burns |
| 2007/0291988 A1 | | 12/2007 | Karimov et al. |

FOREIGN PATENT DOCUMENTS

| | | |
|---|---|---|
| GB | 2 417 074 | 2/2006 |
| GB | 2 417 592 | 3/2006 |
| GB | 2 417 707 | 3/2006 |
| GB | 2 426 100 | 11/2006 |
| WO | WO 92/15965 | 9/1992 |
| WO | WO 01/43086 | 6/2001 |
| WO | WO 2005/088517 | 9/2005 |
| WO | WO 2005/088533 | 9/2005 |
| WO | WO 2005/122100 | 12/2005 |
| WO | WO 2006/078651 | 7/2006 |

OTHER PUBLICATIONS

U.S. Appl. No. 12/041,790.
U.S. Appl. No. 13/471,185.
U.S. Appl. No. 14/959,803.

* cited by examiner

91
Beginning of the engraving

92
Pulse zone

371: location where the signal is flipped

381: location where the signal is flipped

391: location where the signal is flipped

MEANS FOR USING MICROSTRUCTURE OF MATERIALS SURFACE AS A UNIQUE IDENTIFIER

CROSS-REFERENCE TO RELATED APPLICATIONS

This application is a Continuation of U.S. patent application Ser. No. 14/959,803 filed Dec. 4, 2015, which is a Continuation of U.S. patent application Ser. No. 13/471,185 filed May 14, 2012 (now U.S. Pat. No. 9,208,394 issued Dec. 8, 2015), which is a Continuation-in-Part of U.S. patent application Ser. No. 12/041,790, filed Mar. 4, 2008 (now U.S. Pat. No. 8,180,174 issued May 15, 2012), which is a Continuation-in-Part of International Application No. PCT/EP2006/066043, filed Sep. 5, 2006, which, in turn, claims the benefit of European Application No. 05108123.0, filed Sep. 5, 2005. All of the foregoing applications are incorporated by reference in their entireties.

INTRODUCTION

The present application concerns the visual identification of materials or documents for tracking, tampering and anti-counterfeiting purpose.

STATE OF THE ART

This patent addresses the problem of counterfeiting, tampering and traceability. Each of these three security issues are generally addressed using a specific approach:
  For counterfeiting, approaches are based on special markings (like holograms, DNA codes, optically variable inks, Cryptoglyph, etc.) where the operator checks if the marking is there or not. Such solutions are useful mainly against counterfeiting (and tampering in some cases) and their security solely relies on the complexity to counterfeit the mark.
  For tampering, solutions are either based on a redundant encoding strategy or on a tamper evident approach. Redundant security is based on a double encoding of critical information (like the name on a passport which is also encoded in the attached magnetic strip or the hash of a text which is printed on a document which should not be modified). Tamper evidence can also be achieved using various physical or chemical means which enable to detect modifications performed to a document or to a package. Such means include special paper treatments which enable it to be immediately colored by solvents or ultrasonic detection systems which are capable to detect an overlay of a thin piece of paper.
  Traceability is achieved using a unique identification of each item. This type of system typically uses a central database which maintains a record of information for each numbered item. It should be noted that unique identification potentially enables to address all security issues like counterfeiting, tampering and diversion. The following section details the state of the art of this approach For carton and paper application, unique identification is often performed by ink-jet printing (DOD or continuous) of an alphanumeric string or a barcode.

In the case of tampering detection, the goal is to guarantee that data printed in clear text on a document has not been illegally modified (for instance a check value is increased). One simple way to reach this objective is to uniquely identify the document (using barcode or hexadecimal string) with an identification number printed on the document. This number gives access through a look-up table to the data also printed in clear text on the document. It is then possible to check if the data printed on the document matches with the data stored in the loop-up table (Optical Character Recognition may be used for automating the comparison process). There exists many way to implement this idea for specific problems, for instance a solution for integrity check of identity documents is described in U.S. Pat. No. 6,920,437, another for passport documents is given in U.S. Pat. No. 6,565,000.

Traceability is particularly important for finding parallel import of goods, but also for other security purposes, in the following we choose to focus on the specific diversion problem for the sake of clarity. Unique identifiers for each package sent to a given country A and by a given distributor, are listed in a database. In case of gray market, the good is re-imported in a country B. By using this code it is then possible to trace back the origin of the good. A particular system architecture (comprising a central server, database and client applications) of such an approach using central database is described in U.S. Pat. No. 6,922,687, another system architecture is given in U.S. Pat. No. 6,547,137 (where the identifier is printed on a label attached to the product). For the pharmaceutical industry, this solution can also be implemented by marking the identifier directly on a label or a pill as described in U.S. Pat. No. 6,776,341. For the electronic industry U.S. Pat. No. 6,629,061 describes a solution where the identifier is printed on the circuit board and embedded in the memory device (another approach for fighting gray market in this industry is given in U.S. Pat. No. 6,459,175 with power supplies). For the clothing industry, U.S. Pat. No. 6,461,987 describes a solution where unique identification is obtained by the means of micro label strips.

In the case of counterfeit detection, identifiers of all the produced packages or documents are kept in a central database. For each product it is then possible to interrogate the database and know:
  If the identifier belongs to the database. If so, then it is the proof that this is a valid identifier, i.e. it has not been invented by a counterfeiter (identification numbers are randomly chosen using a secret algorithm).
  If another request has already been sent for the same identifier. If so, it would prove that several counterfeit copies of the same product are circulating.

Some of the patent applications listed in the above section on traceability also describe solutions for counterfeit detection. Hence, counterfeit is also described in U.S. Pat. No. 6,776,341 (using labels, as described above) and U.S. Pat. No. 6,461,987 (using micro label strips for the clothing industry, see above).

The marking of the code can be performed either by means of printing or engraving as described in U.S. Pat. No. 6,706,314 (in this case a laser can be used for reading) for traceability and anti-counterfeit applications. It can also be used special light sources with material reacting to specific wavelengths. Although this approach is generally more used as a yes/no answer (since it is capable of generating a very limited number of different identifiers), patents U.S. Pat. No. 6,384,409 and U.S. Pat. No. 6,030,657 (where the material is a biological marker) mention fighting gray market using this approach. The same stands for the analog magnetic reader described in U.S. Pat. No. 5,975,581.

The unique identification method described above is therefore a powerful approach that enables to solve three different security issues: tampering, tracking and counterfeiting.

So far, we have investigated only unique identification relying on a marking of the product. There exists also a totally different approach enabling unique identification without marking (both approaches are described in FIG. 1).

Indeed, it is also possible to measure precisely some features of a document or product and use it to characterize the product uniquely. For instance, Ingenia Technology discloses an invention where the micro topology of carton and paper is measured using a coherent light (typically produced by a laser) and used for unique identification purposes in GB0418138.4, GB0418173.1, GB0418178.0 and GB0509635.9. This technology may be directly embedded in printer devices (as described in PCT/GB2005/000903). This technology can basically be used on any chaotic surface, using an array of laser sources enabling to probe the material surface at various incidences (as described in PCT/GB2005/000922). A similar approach was also described in application GB2221870 from De La Rue Company Plc, where the scattering of a coherent light was used for detection. Another solution is described in U.S. Pat. No. 6,584,214 by the MIT where the whole 3D chaotic structure of a material is used to generate a unique identifier. The 3D structure is acquired using devices which are based on coherent light (for transparent material) or ultrasound and X-rays (for non-transparent materials). Another approach using ultrasonic measurement is described in U.S. Pat. No. 5,454,045, where features (either macroscopic or microscopic) are measured inside a material, stored and subsequently compared with new measurements for match test. However, all of these approaches use specific acquisition devices in order to ease the detection of unique features required for unique identification applications. The current application describes solutions for using standard imaging devices.

In published patent US20050075984 (also in US20030014647-A1 and US20030712659) an original method based on random set of micro bubbles inserted in a transparent medium is described. The detection is based on measurement of shadows and reflections to determine a unique signature for each set of bubbles. The transparent medium is then physically affixed to the product or document to be identified. This approach is unusual as it is somehow between the two processes described in FIG. 1: on the one hand it is an analog random process but on the other hand it requires to be physically applied on the product which is conceptually the same approach as printing out a serial number.

Another family of solutions is based on the creation of a digital signature using the random and chaotic nature of materials. Such a digital signature can be used for authentication purposes, for encryption purposes or for tampering detection. Applications related to authentication are for instance disclosed in PCT/BY99/00011 (where the signature is encrypted and printed on the material itself). Two patent applications disclosed by the company Signoptic Technologies focus on the generation and use of a digital signature using material microstructure. In document WO2005/122100, different applications are described where the signature is used to encrypt data. The document WO2006/078651 focuses specifically on signatures obtained from fibrous materials for authentication purposes.

However, those approaches do not address the so-called mass-serialization application. This strategy is used today in many industries and consists in individually marking each product which enables to track of each of them. Such marks typically represent variable barcodes or alphanumeric codes which are digitally printed (using Drop On Demand on continuous inkjet) or engraved (using for instance laser marking). The solutions disclosed in the current application enable to provide all the functionality offered by mass-serialization but without the need of any marking, by only using images of their microstructure. It describes in particular solutions in order to provide automatic high speed recording and identification of products.

Although the present invention focuses on using characteristics of document and object surfaces, the presented concepts can be extended beyond surfaces of our 3d world and be applied many other and media and corresponding characteristics. Such media may include, but are not limited to: 1) Mechanical wave responses such as sound, earthquakes, engine vibrations, vibration responses on objects generated by rubbing; 2) Characteristics of space time observations according to Albert Einstein, such as ripples in space due to the big bang; 3) Electromagnetic wave patterns generate trough reflection or traversal, such as X-ray images; 4) Magnetic waves or object characteristics, such as magnetic noise on a metal surface; 5) Chemical and molecular compositions, such as spectrums of pharmaceutical components; 6) Smell patterns in space and/or time.

SHORT DESCRIPTION OF THE INVENTION

The invention describes how to perform a reliable and fast identification or traceability of a product by uniquely using an optical image of the microstructure of its surface. The randomness of this microstructure, from one product to the other is used to identify uniquely each product. The identification is performed by a match between the acquired image and a set of previously recorded images of the microstructure of all the products of a given production line. A fundamental aspect of the invention is that products typically look exactly undistinguishable, although their fingerprint is different. The reason lies is the fact that the naked eye can only distinguish details which are large enough (above 50 um) while the microstructure is generally based (but not exclusively) on details which are smaller than that and therefore invisible for the naked eye. Another aspect to take into consideration is the fact that some objects may look identical but still feature differences which are visible for the naked eye. This can be the case for instance for plastic containers like bottles that have a molded surface structure featuring some random located peaks and holes around 500 um or more. Still, the height (or deepness) of such surface variations is small enough, and uniform enough that it is visually non-disturbing and rather contributes to give a specific "texture" to the object (such texture being sometimes used to help grabbing the object or decrease the visibility of scratches). Another example is leather structure. It is obvious that such structure is always, for the naked eye, different from a piece of leather to another one; nevertheless these variations between items stay generally un-noticed, because it is simply non-disturbing.

In the following, some cases of materials are specifically analyzed but the described method is not limited to these materials and can be applied easily to other types of materials and detected features for any person skilled in the art of image processing and physics of materials.

The present invention proposes a method to automatically identify an object comprising a parameter settings phase, an acquisition phase and an identification phase, the parameter setting phase comprising the steps of:
  defining for a given set of objects, a resolution, a type of non-coherent light illumination and a location, called region of interest, for the acquired image for which the object's microstructure image contains noise,
the acquisition phase comprising the following steps, for each object to be later identified:
  digitally acquiring a two-dimensional image of the object according to parameter settings through sampling on a uniformly spaced orthogonal grid of at least one color component,
  applying a flattening function on said template in order to produce a flattened template by removing macroscopic color variations,
  generating at least one downsampled template version of the flattened template,
  storing in a reference database the downsampled template version and the flattened template,
the identification phase comprising the following steps, for the object to be identified:
  digitally acquiring a two-dimensional snapshot image according to the same parameters as the template image,
  applying to the snapshot image the same flattening function as the one applied to the template image in order to produce a flattened snapshot image,
  generating at least one downsampled version of the flattened snapshot image,
  cross-correlating the downsampled version of the flattened snapshot image with the corresponding downsampled templates version stored in the reference database, and selecting the templates according to the value of the signal to noise ratio of said cross-correlation,
  for the selected templates, cross-correlating the flattened snapshot image with the flattened template stored in the reference database, and thus identifying the object by finding the best corresponding template which signal to noise ratio value of said cross-correlation is above a predefined threshold.

The main fields of applications of the presented technology include tracking, identification and counterfeit detection. Three versions of the technology are described, each covering parts or all of the fields of application:
  The first level is named "unique fingerprint" in this document. With this technique it is possible to identify, to track uniquely and to detect counterfeiting for some valuable item or document. This technology is based on the unique microstructure of the surface of each item.
  The second level is named "microscopic fingerprint" in the present document. With this technology it is possible to detect counterfeited items but not to trace them or to identify them uniquely. This technology is based on the microstructure of the object used to make the item, for example a mold or an offset sheet, depending on the material in which the item is made.
  The third level is named "macroscopic fingerprint" in the present document. This allows detecting coarsely counterfeited items, such as fake medicines that are sold on the internet. This technology is based on the macroscopic structure of the item to protect.

Examples of usage of this technology are watch traceability and anti-counterfeiting, authentication and anti-counterfeiting of paper document, label or package, authentication of containers, authentication of automotive parts, authentication of electric pieces, such as circuit breaker, retrieval of advertisements in newspaper pages and so on. It can be used for example in watch industry, pharmaceutical industry, car industry, electronic industry, food industry or newspaper industry and more generally for any industry which requires identification or traceability of items without marking. This technology has been named "fingerprint" as it is based on concepts which are similar to those used for the human fingerprint technologies. In fact, the inside surface of hands and feet of humans (all primates in fact) contains tiny ridges with furrows in between which are unique for each individual. This is also true for the majority of materials like wood, paper, metal, stone, resin, plastics or other coated materials. The concept of this application is actually not limited to images of materials. It can be also applied to any noisy signal which constitutes a signature, including but not limited to magnetic signal (magnetic spatial variations around a magnet for instance), electric signal (electric field generated by an electronic component), electromagnetic signal (spectrum of light emitted by an object), etc

SHORT DESCRIPTION OF THE FIGURES

Figure 2:
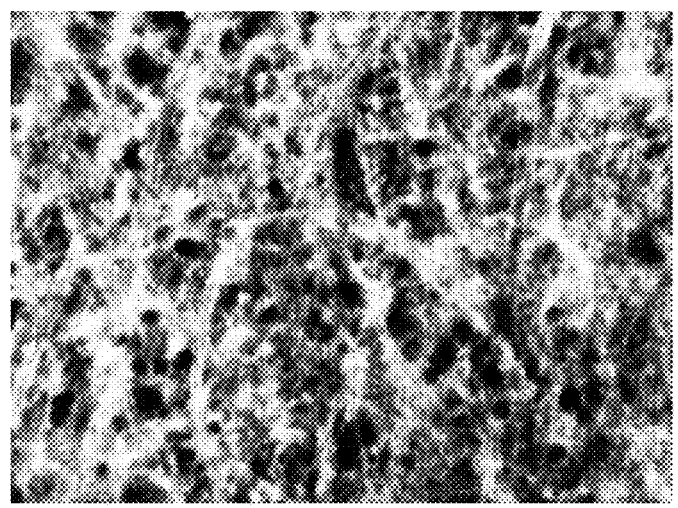
Figure 3:
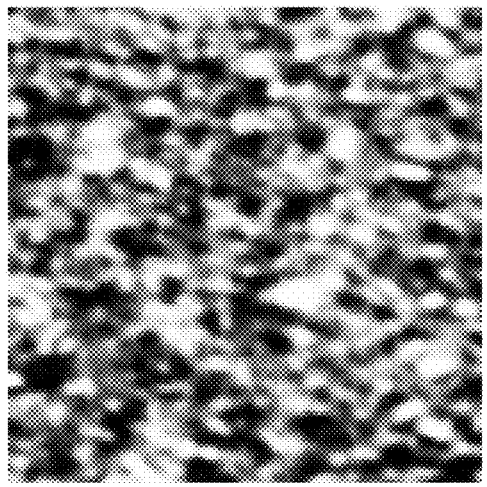
Figure 4:
Figure 5:
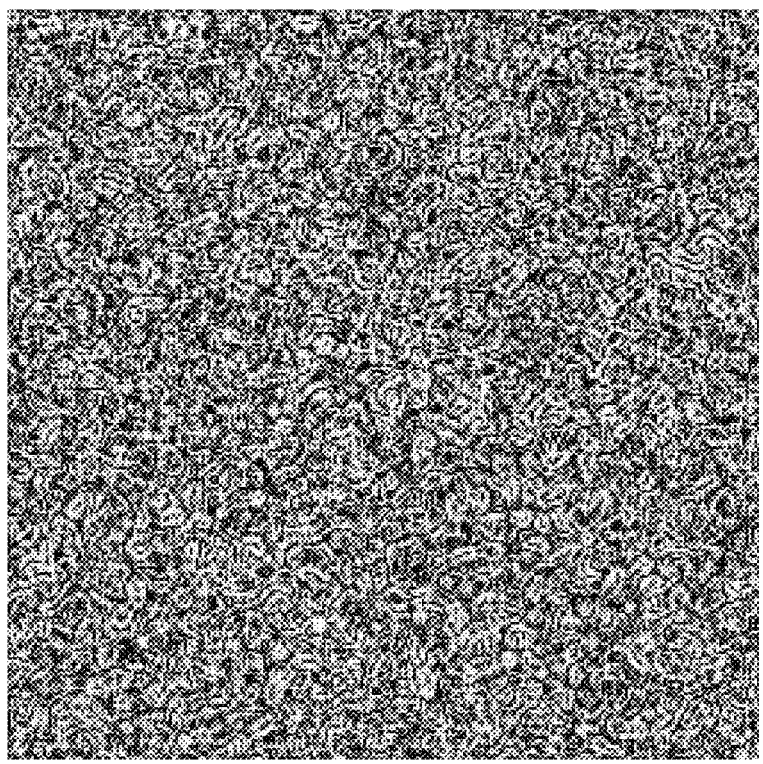
Figure 6:
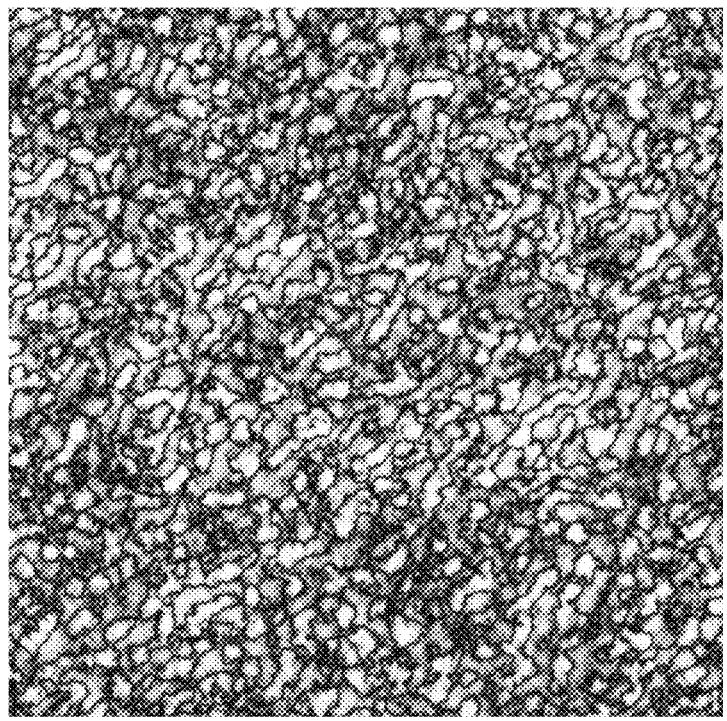
Figure 7:
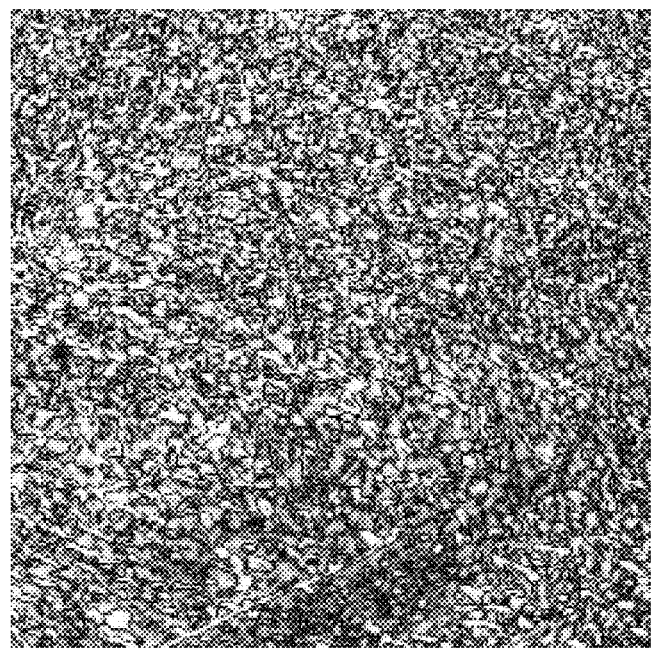
Figure 8:
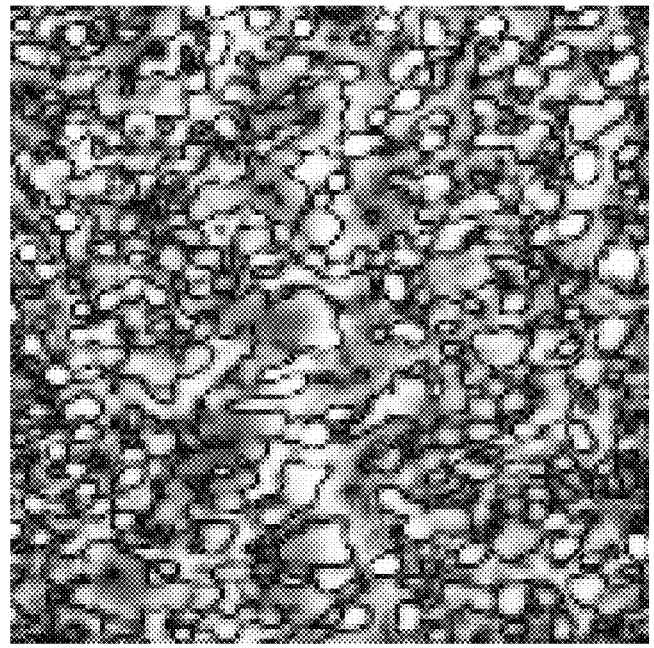
Figure 9:
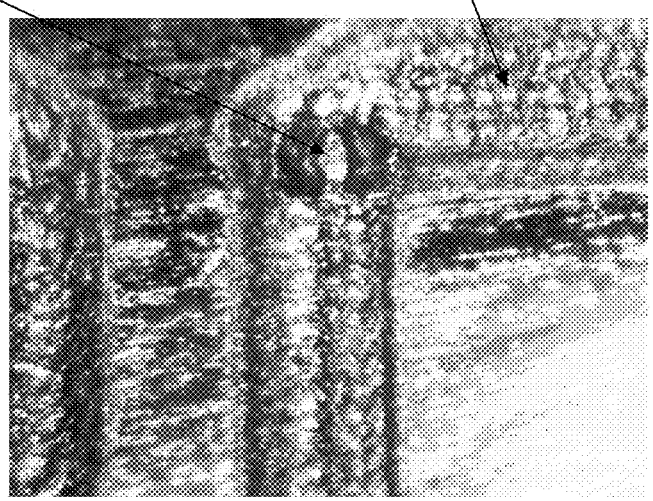
Figure 10:
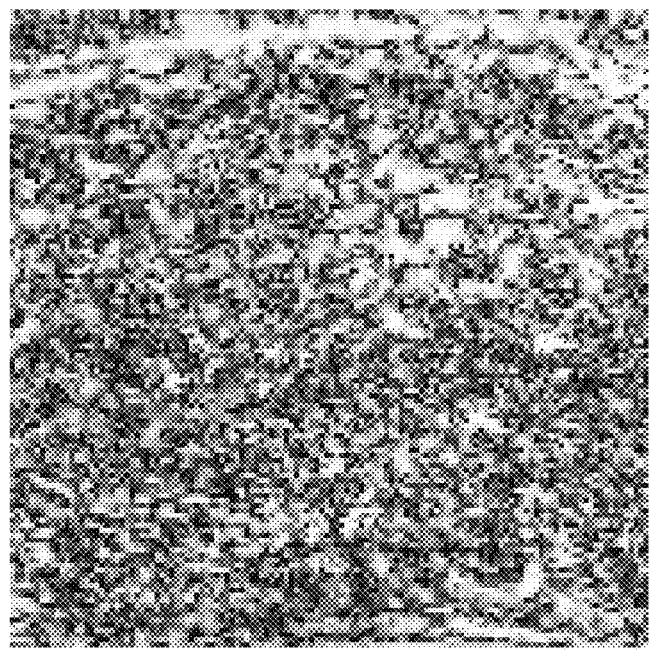
Figure 11:
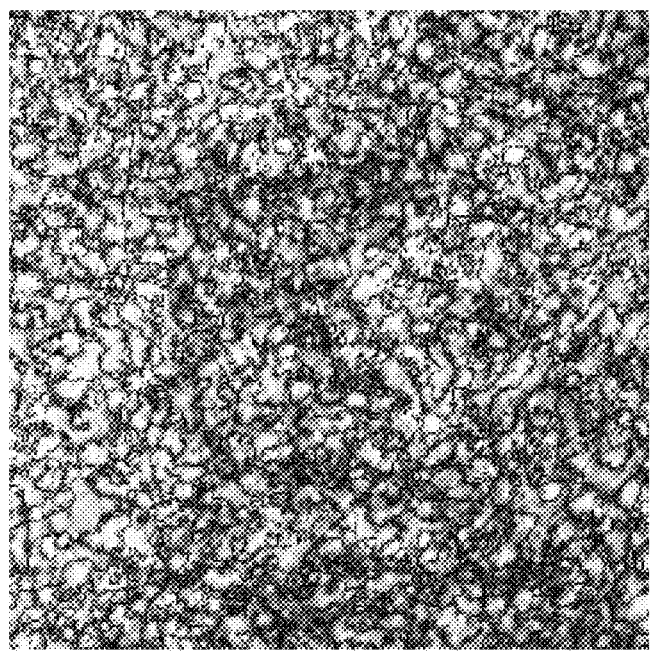

The invention will be better understood thanks to the attached drawings in which:
  FIG. 1: Two different processes enabling a unique identification. Process 1: an analog random process 11 (like the microstructure of a paper) is digitized with 12 and the resulting data is stored an unique identifier 13. In process 2, a generator 14 provide a digital random (or pseudo-random) value that is stored as a unique identifier 15 and finally printed 16.
  FIG. 2: Picture a magnified portion of office paper showing the important randomness of the paper structure. The height of the picture is approximately 1 mm. The image has been processed to enhance the contrast.
  FIG. 3: A portion of a metallic logo of a back of watch. The height of the image is approximately 1 mm. The picture has been processed to enhance the contrast. Picture was taken with an office digital scanner at 4,800 dpi.
  FIG. 4: A portion of molded plastic. The height of the picture is approximately 5 mm. The image has been processed to enhance contrast. Picture was taken with as scanner at 2,400 dpi.
  FIG. 5: A part of a printed area on a paper label. The height of the picture is approximately 5 mm. The image has been processed to enhance the contrast. Picture was taken with a scanner at 2,400 dpi.
  FIG. 6: A part of a coated dial of a watch. The height of the picture is about 1 mm. The image was processed to enhance contrast. Picture was taken with a microscope at about 10,000 dpi.
  FIG. 7: A part of a resin item. The size of the picture is 0.35 mm×0.35 mm. Picture was taken with a microscope at 20,000 dpi. The image was processed to enhance contrast.
  FIG. 8: A part of a laser engraved metal. The size of the picture is 0.11 mm×0.11 m. Picture was taken with a microscope at 30,000 dpi. The image was processed to enhance contrast.
  FIG. 9: A part of laser engraved metal. 91 shows the beginning of the engraving and 92 shows the pulsed part.
  FIG. 10: A part of homogenous metal. The size of the picture is 2.2 mm×2.2 mm. Picture was taken with a digital camera at 1445 dpi. The image was processed to enhance contrast.
  FIG. 11: A part of non molded plastic. The size of the picture is 2.2 mm×2.2 mm. Picture was taken with a digital camera at 1445 dpi. The image was processed to enhance contrast.

Figure 12:
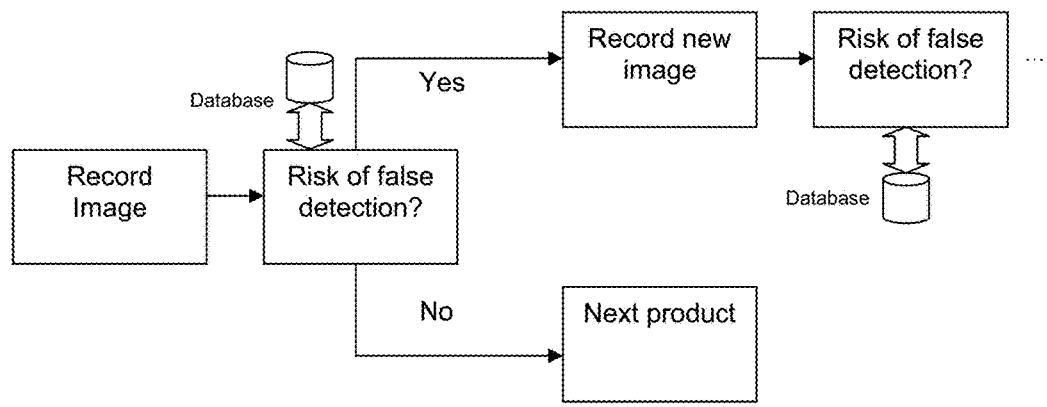

FIG. 12: Diagram showing how the captured data can be increase to prevent possible false positive or false negative detections.

Figure 13:
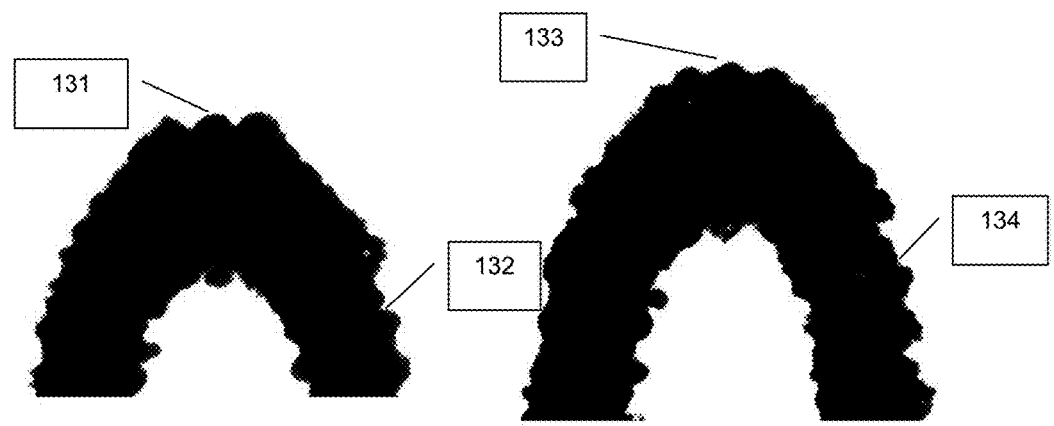

FIG. 13: Contours of the same text printed with industrial roto-gravure technology (scale ~1 mm height) for two successive samples of the same production batch.

Figure 14:
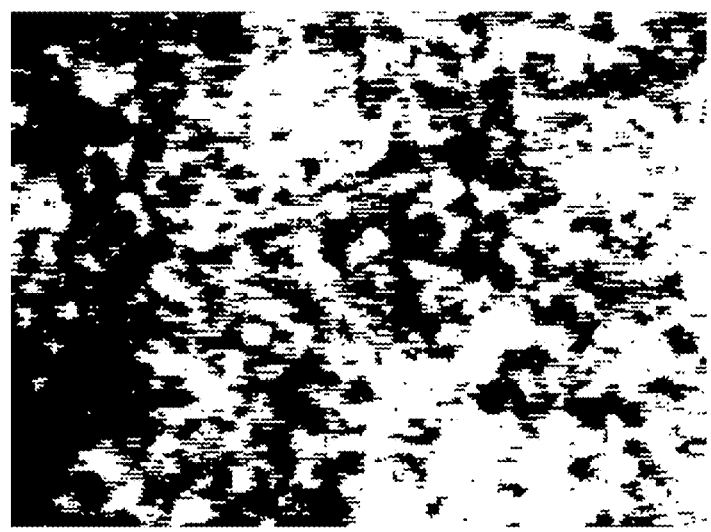

FIG. 14: Image of a uniform tint area of color printed in offset (scale ~1 mm for image height).

Figure 15:
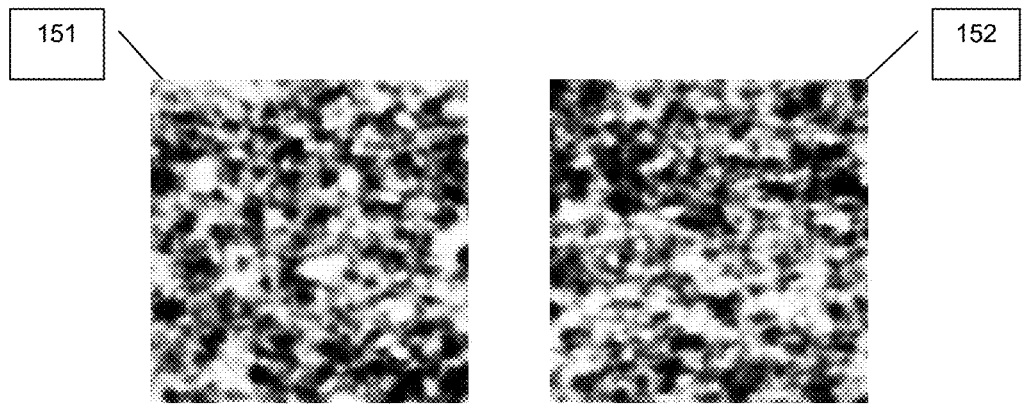

FIG. 15: Difference between structure of the chemically engraved logo of two different watches from the same model. Picture has been processed to enhance contrast. The field of view is of about 5 mm and the dpi is 4,800. 151 is the engraved logo of one watch. 152 is the engraved logo of the other watch.

Figure 16:
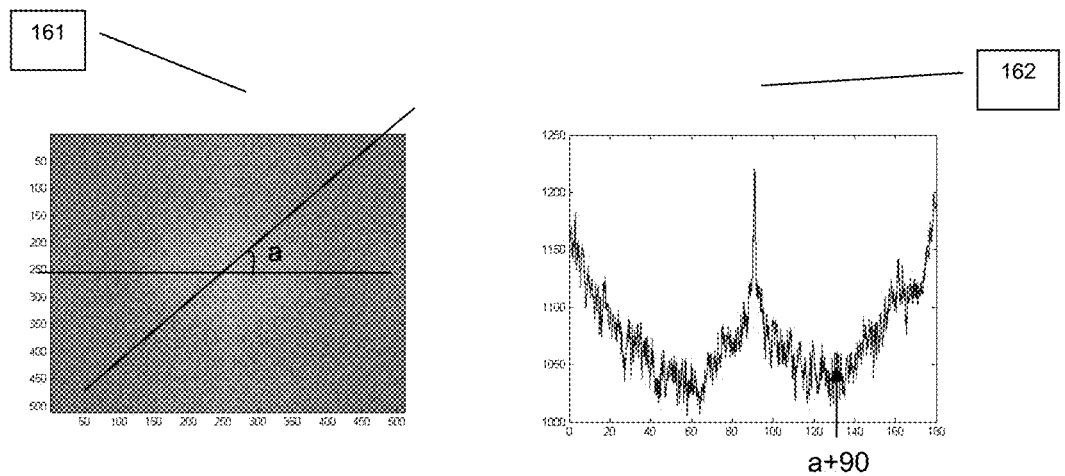

FIG. 16: Picture showing how to retrieve the angle of rotation of an item. 161 is the Fourier transform of a specific item. 162 is the additions of the values on an axis of 161 at each angle.

Figure 17:
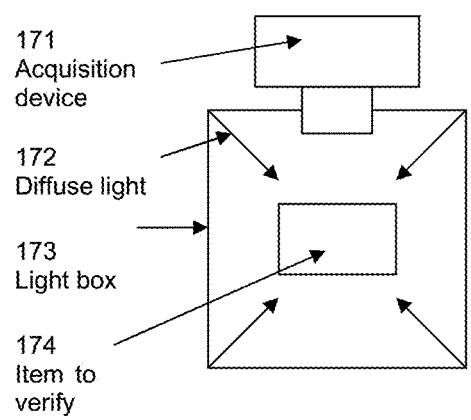

FIG. 17: Schema of image acquisition with diffuse light and 2D CCD. 171 is the image acquisition device. 172 represents the diffuse light, 173 is the light box and 174 is the item to verify.

Figure 18:
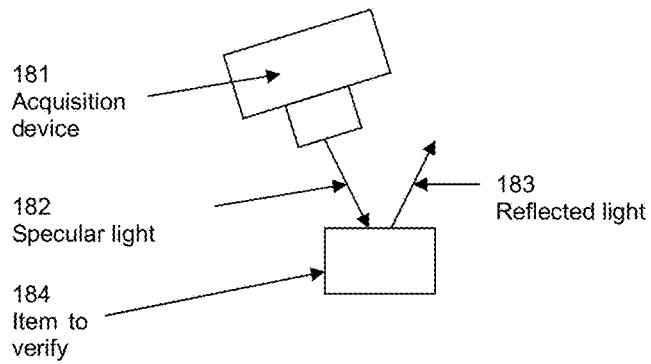

FIG. 18: Schema of image acquisition with specular light. 181 is the image acquisition device, 182 represents the specular light, 183 represents the reflected light and 184 is the item to verify.

Figure 19:
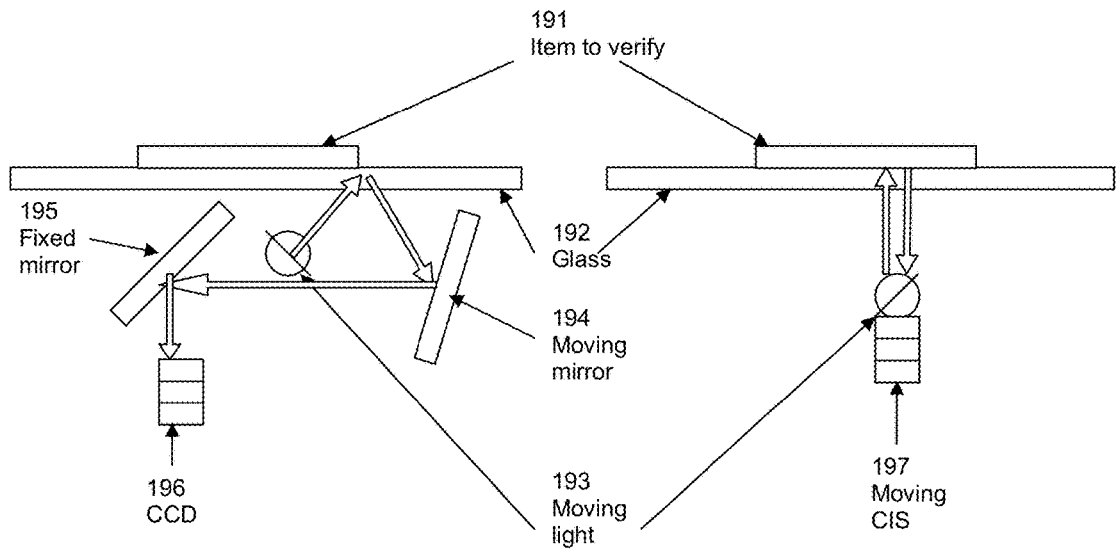

FIG. 19: Schema of image acquisition with diffuse light and 1D CCD. 191 is the item to verify, 192 is a sheet of glass, 193 is a moving light, 194 is a moving mirror, 195 is a fixed mirror and 196 is a 1D CCD.

Figure 20:
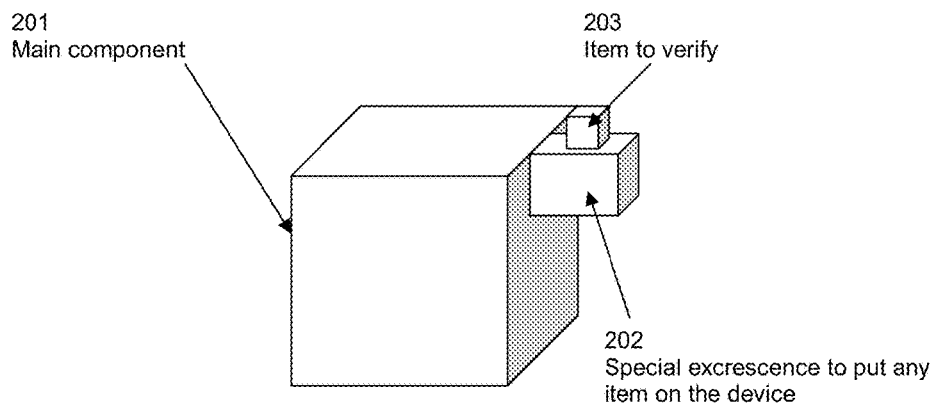

FIG. 20: Extension of the imaging device of FIG. 51. 201 is the main component as described in FIG. 51. 202 is a excrescence specially designed to put any item on it. 203 is the item to verify.

Figure 21:
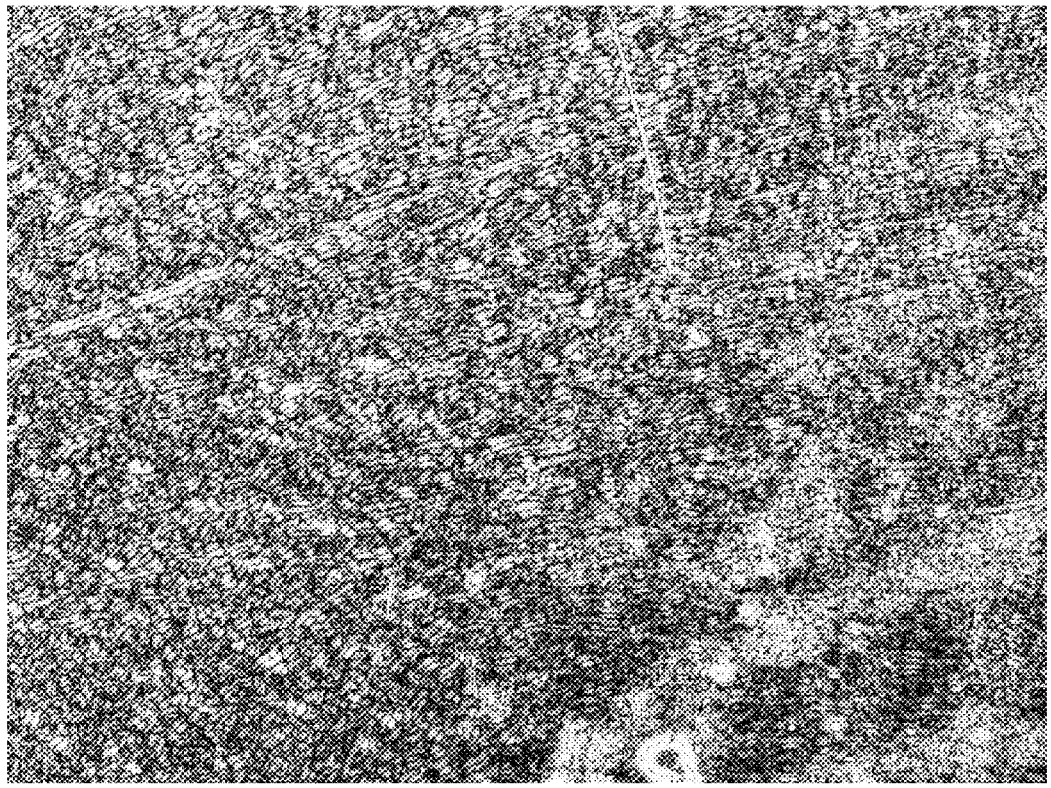

FIG. 21: Picture of a coated dial observed with specular axial light. Picture has been processed to enhance the contrast. The field of view is about 2×3 mm and the dpi is about 10,000.

Figure 22:
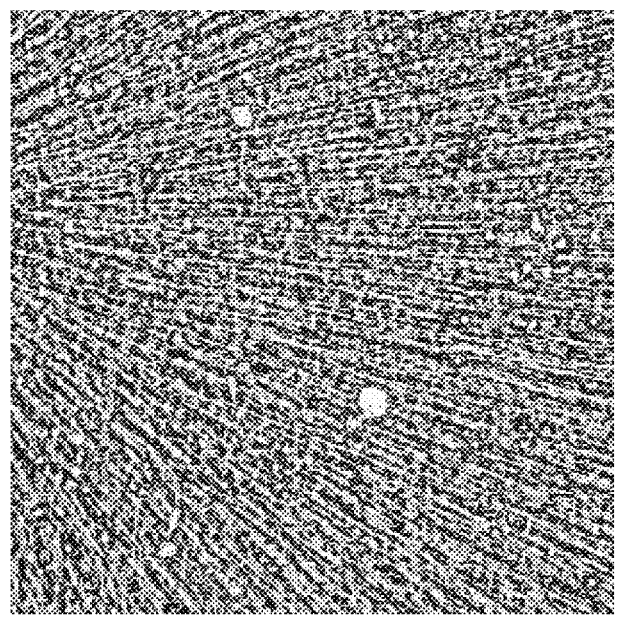

FIG. 22: Picture of the same dial than in FIG. 21 but taken with a 1D CCD diffuse light. Picture has been processed to enhance the contrast. The field of view is about 5 mm and the dpi is 4,800.

Figure 23:
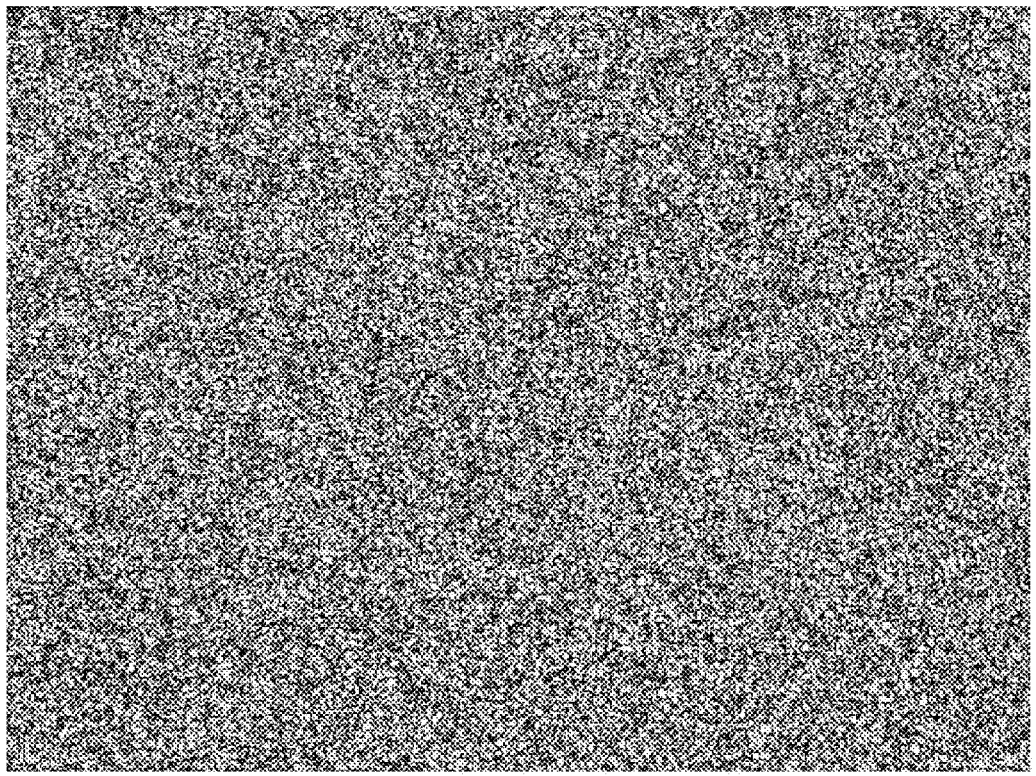

FIG. 23: Picture of a coated dial observed with specular axial light. Picture has been processed to enhance the contrast. The field of view is about 2×3 mm and the dpi is about 10,000.

Figure 24:
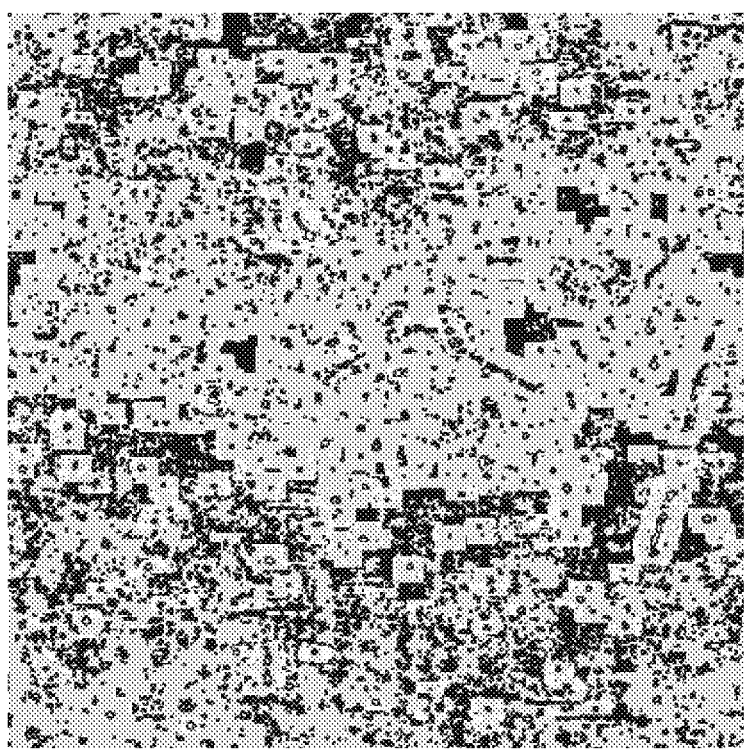

FIG. 24: Picture of the same dial than in FIG. 23 but taken with a 1D CCD diffuse light. Picture has been processed to enhance the contrast. The field of view is about 5 mm and the dpi is 4,800.

Figure 25:
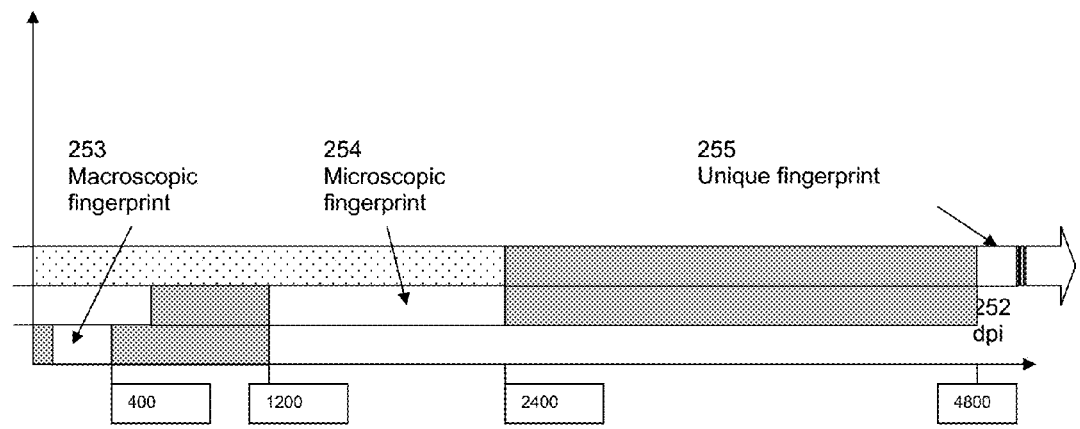

FIG. 25: Schema depicting the difference between the three levels of fingerprint technology. 251 is the axis for the technology, 252 is the axis for the dpi. 253 represents the macroscopic fingerprint, 254 represents the microscopic fingerprint and 255 represents the unique fingerprint. White area are best area for the given technology whereas gray area are possible extensions of the area for the given technology. Resolutions in dpi corresponding to each area depends on the materials properties.

Figure 26:
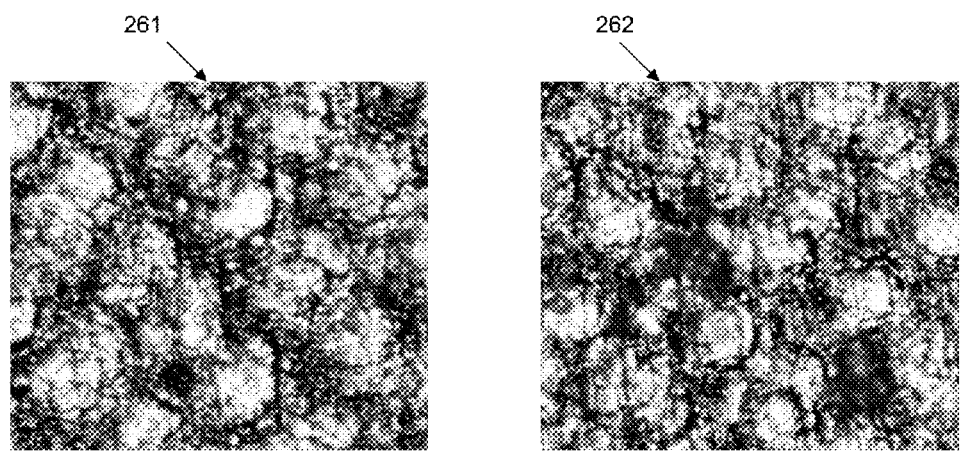

FIG. 26: Picture of two different back of watches that are stamped. The field of view is about 0.4×0.6 mm for a dpi of 10,837. 261 is the stamped structure of one watch, 262 is the one from the other.

Figure 27:
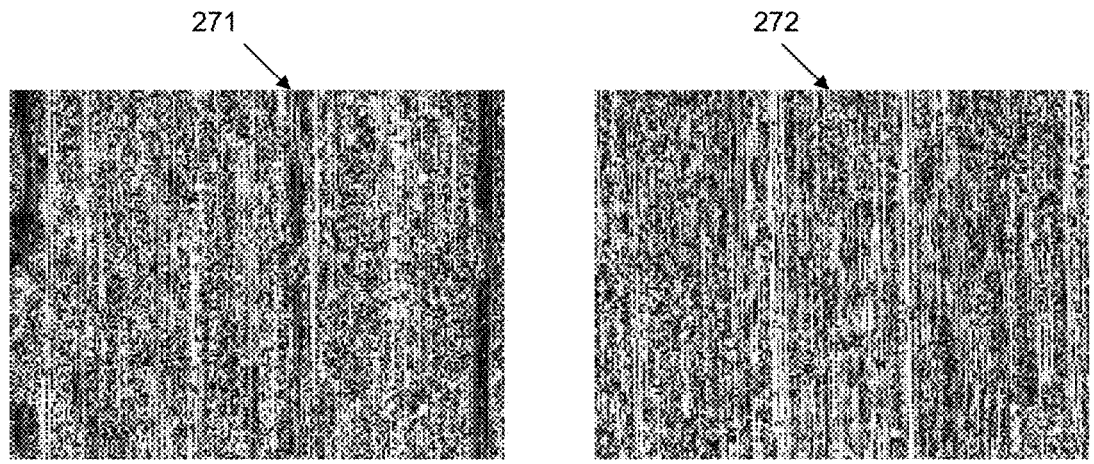

FIG. 27: Picture of two different back of watches that are brushed. The field of view is about 0.4×0.6 mm for a dpi of 10,837. 271 is the brushed structure of one watch, 272 is the brushed structure of the other one. Picture has been processed to enhance the contrast.

Figure 28:
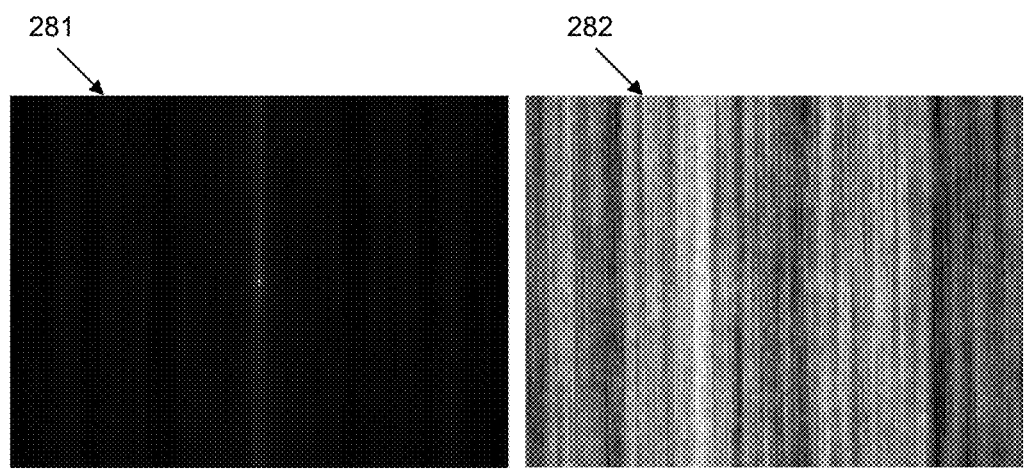

FIG. 28: Picture of cross-correlation of brushed watches. The template is a picture from the same watch than 271. 281 is the cross-correlation of 281 with the template and 282 is the cross-correlation of 282 with the template.

Figure 29:
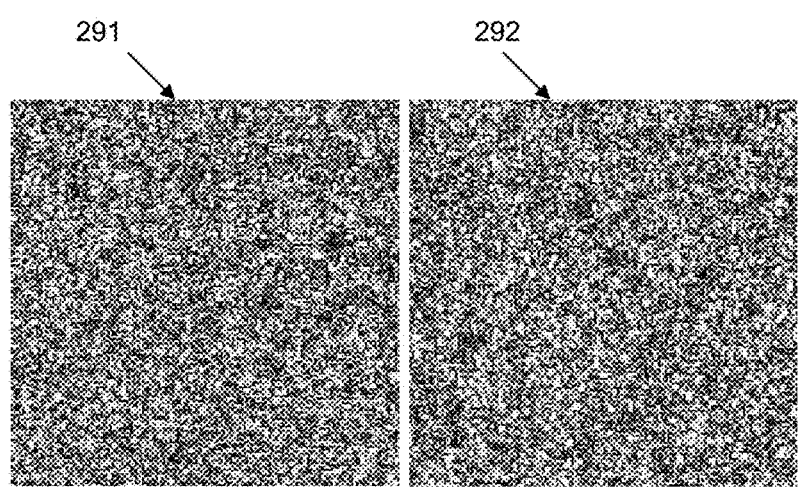

FIG. 29: Picture of two different coated dials of watches. 291 is the microstructures of the coated dial of one watch and 292 of the other. Picture has been processed to enhance contrast. The field of view is about 1×1 mm and the dpi is 10,837.

Figure 30:
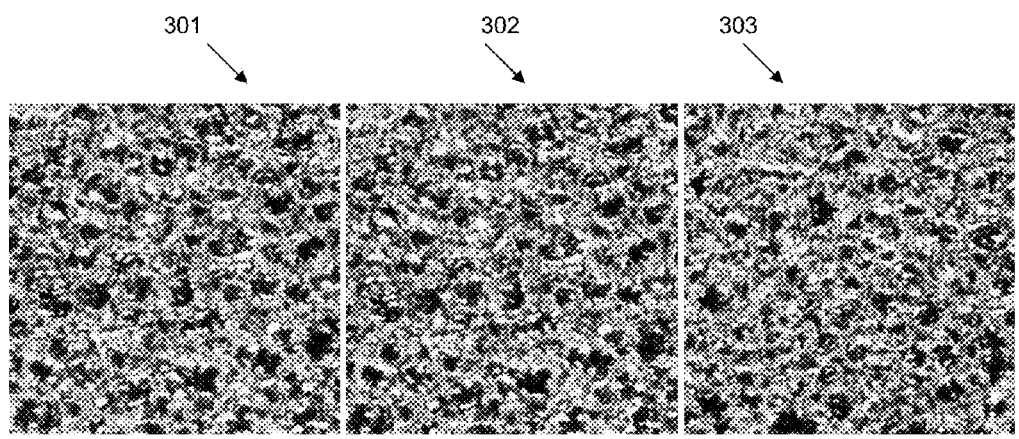

FIG. 30: Picture of three different caps. 301 and 302 comes from the same mould whereas 303 comes from another mould. Picture has been processed to enhance contrast. The field of view is about 5×5 mm and the dpi is 2,400.

Figure 31:
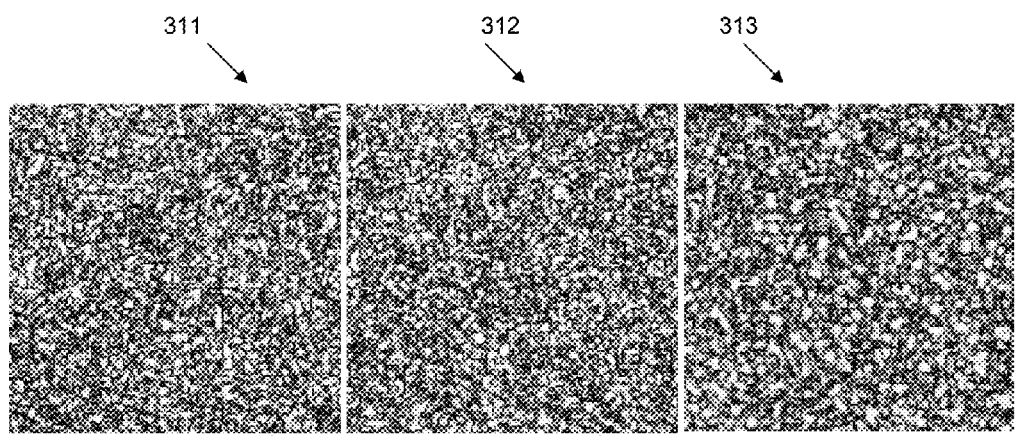

FIG. 31: Pictures of three different labels. 311 and 312 comes from the same printer and the same position on the offset sheet. 313 comes from another printer. Pictures have been processed to enhance contrast. The field of view is about 2.5×2.5 mm and the dpi is 2,400.

Figure 32:
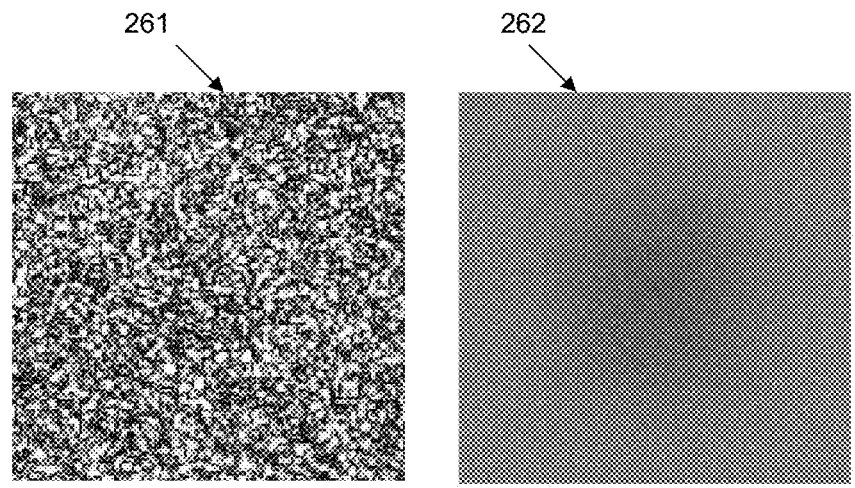

FIG. 32: Pictures of uniform microstructures and its Fourier Transform. 261 is a picture with uniform microstructures. 262 is its Fourier Transform. The field of view is about 2.5×2.5 mm and the dpi is 2,400.

Figure 33:
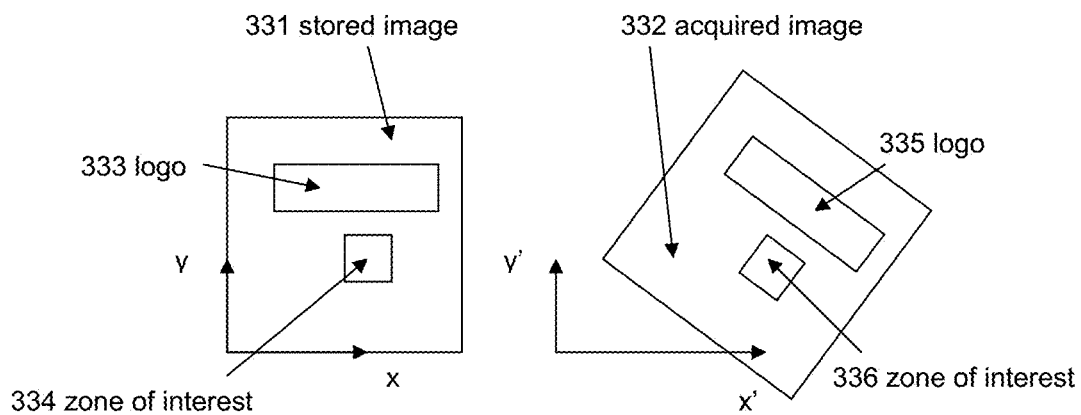

FIG. 33: diagram showing the difference between the stored image 331 and the acquired image 332. 333 and 335 are a logo or a macroscopic zone on 331 and 332 respectively. 334 and 336 are the microscopic zone of interest on 331 and 332 respectively.

Figure 34:
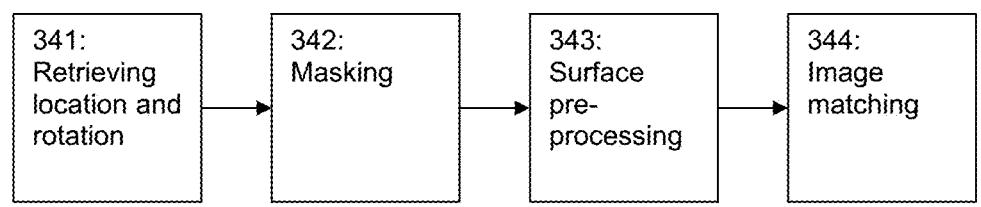

FIG. 34: schema showing the different steps of image detection. 341 is the location and rotation retrieval, 342 is the masking operation, 343 is the image pre-processing and 344 is the image-matching.

Figure 35:
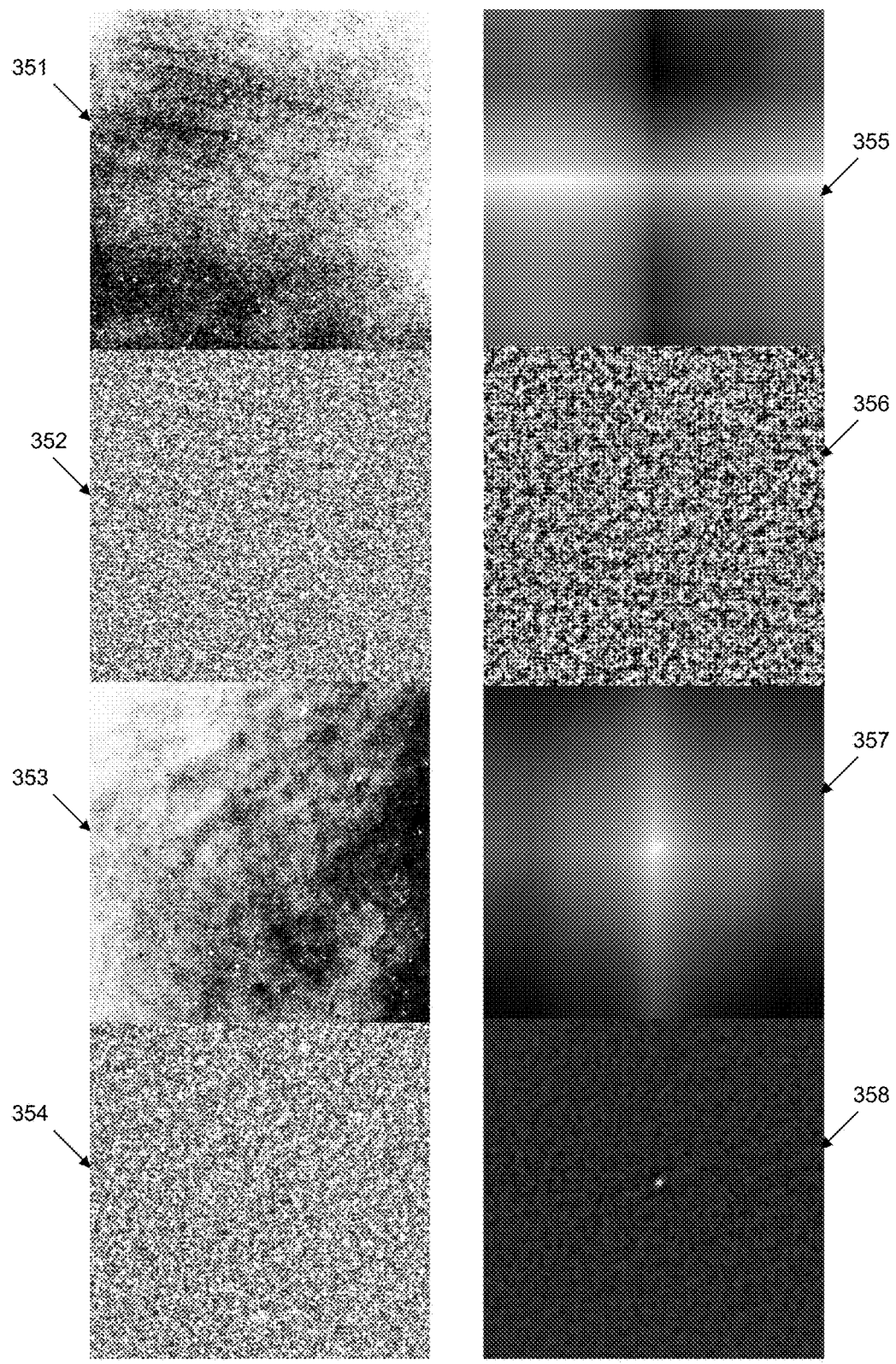

FIG. 35: Pictures of uniform microstructures. 351 and 353 are pictures without flattening. 352 and 354 are pictures with flattening. Cross-correlations of the each image with the template (which matches image 354) are shown on the right.

Figure 36:
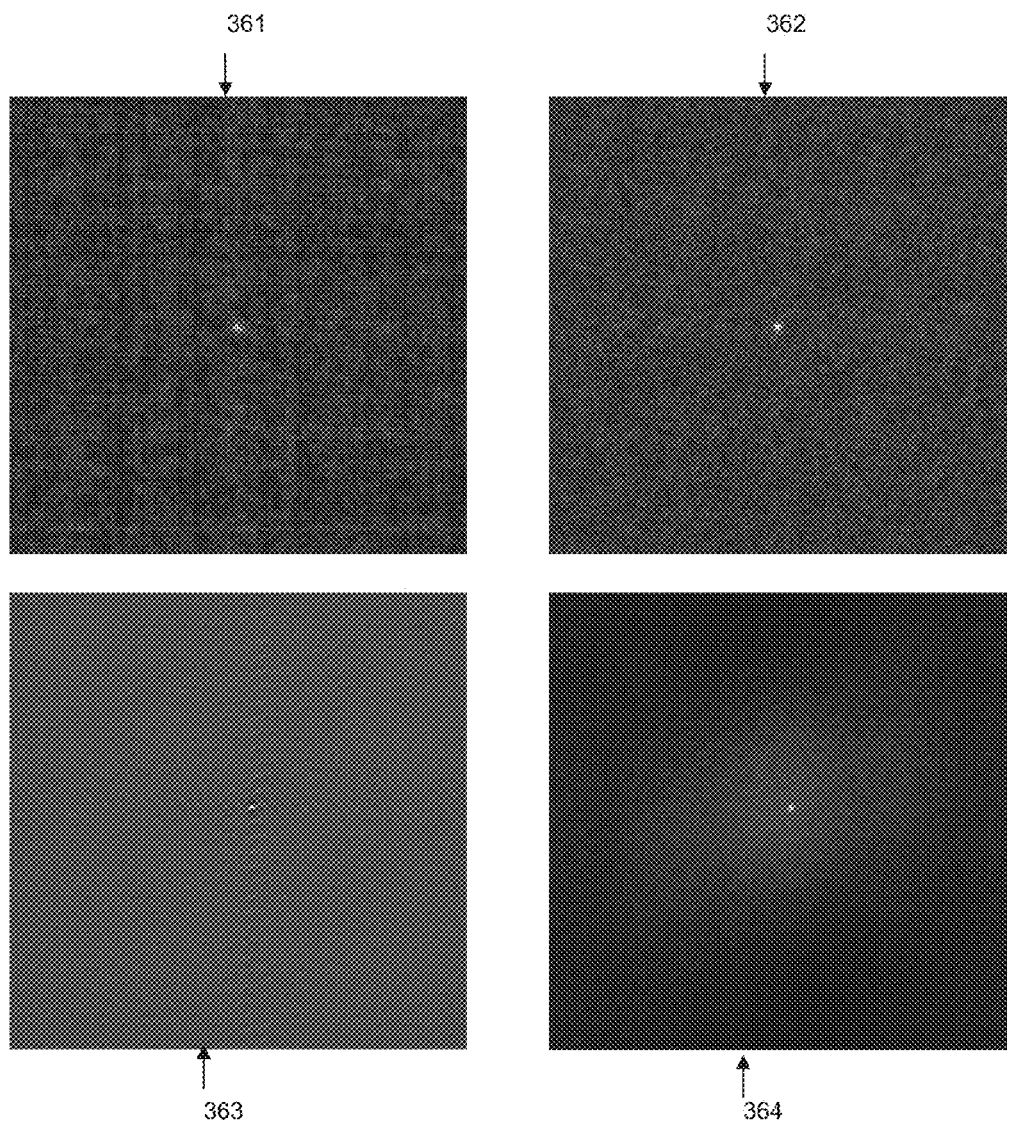

FIG. 36: Pictures showing the effect of different flattening methods on the cross-correlation. 361 shows the cross-correlation of two pictures taken with a device with specular light where the flattening is done by subtraction. The SNR of 15.26 dB is better than the SNR of 13.81 dB of 362. 362 shows the cross-correlation of two pictures taken with a device with specular light where the flattening is done by absolute difference. 363 shows the cross-correlation of two pictures taken with a device with diffuse light where the flattening is done by subtraction. The SNR of 10.51 dB is less good than the one of 18.03 dB of 364. This is because in 363 the anti-correlation is visible and decreases drastically the SNR. 364 shows the cross-correlation of two pictures taken with a device with diffuse light where the flattening is done by absolute difference.

Figure 37:
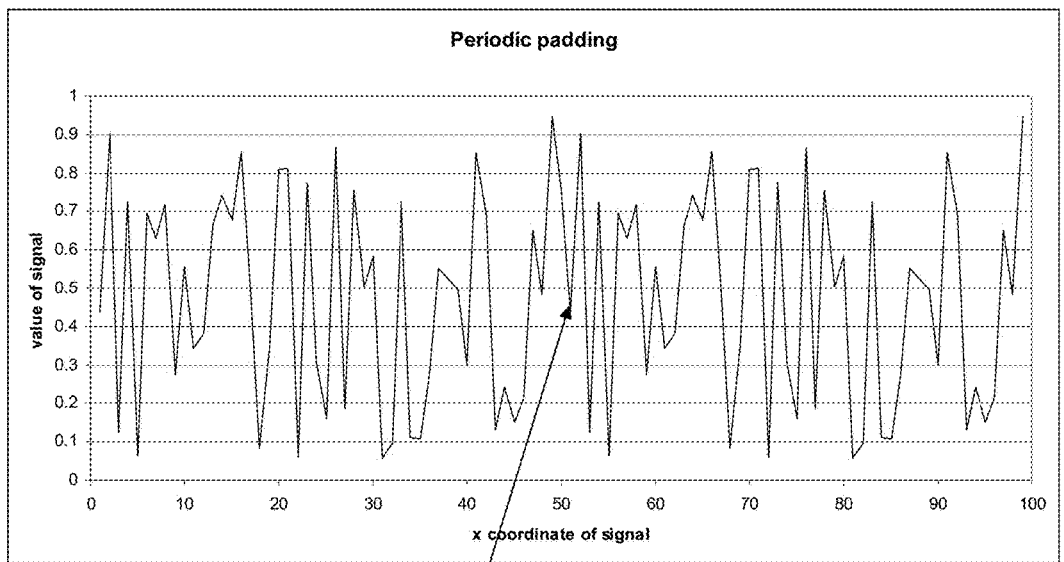

FIG. 37: 1D signal illustrating the effect of periodic padding. 371 is the point where the padding begins. It can be seen that if the first value of the signal is far from the last value of the signal then the padding induces a border effect FIG. 38: 1D signal illustrating the effect of mirror padding. 381 is the point where the padding begins. It induces less border effect than periodic padding. But if the signal is varying a lot at the end, then it induces some border effects.

Figure 39:
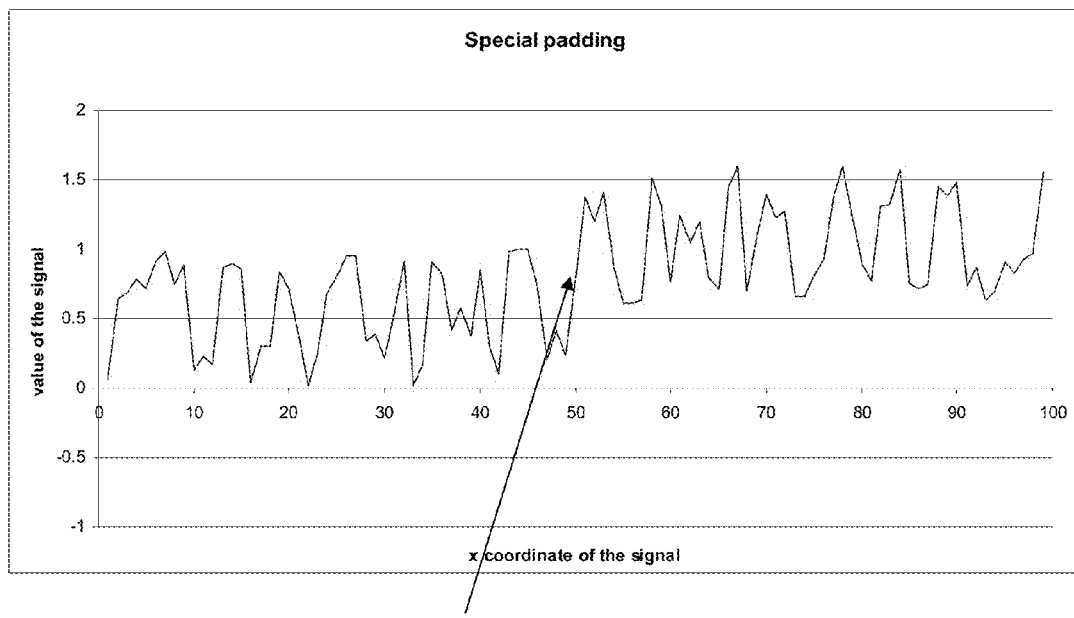

FIG. 39: 1D signal illustrating the effect of "Flip Flat". 391 is the point where the padding begins. It induces no border effect.

Figure 40:
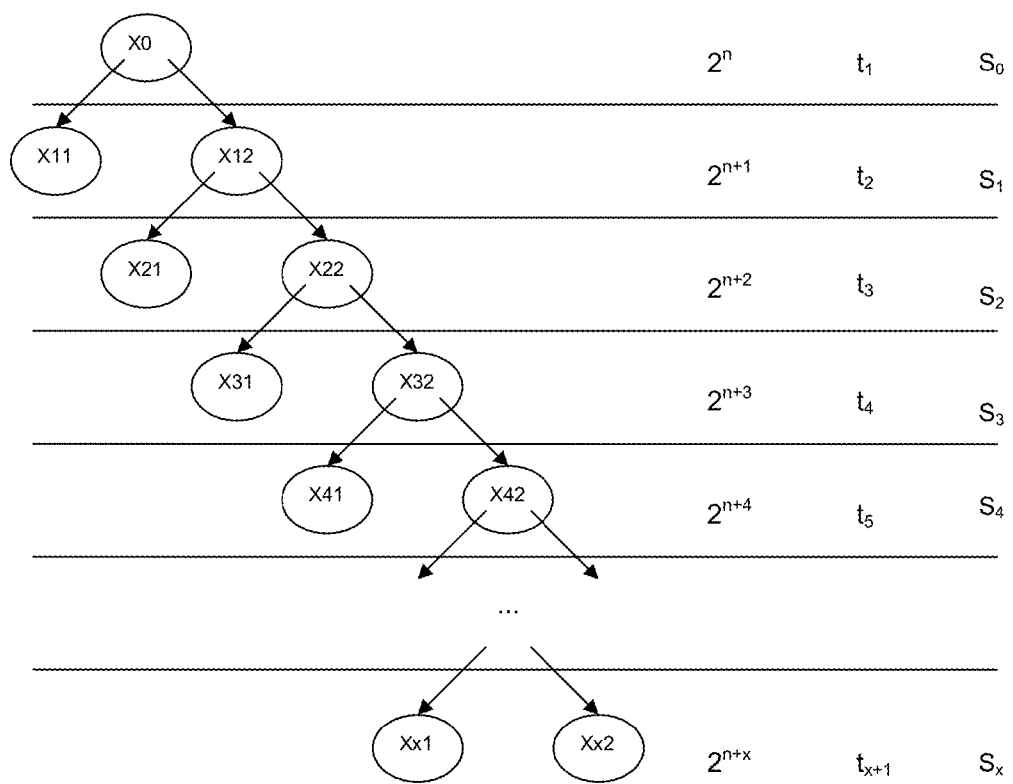

FIG. 40: Diagram describing the detection strategy progressively increasing cross-correlation sizes. The first Set $S_0$ contains $X_0$ candidates of size $2^n$. The candidates that have an SNR which is superior to $t_1$ are classified in $X_{12}$. Those which have an SNR which is inferior to $t_1$ are classified in $X_{22}$. The set $S_1$ contains the $X_{12}$ candidates of size $2^{n+1}$. The same matching is performed at each step. The last set $S_x$ should contain only one candidate.

Figure 41:
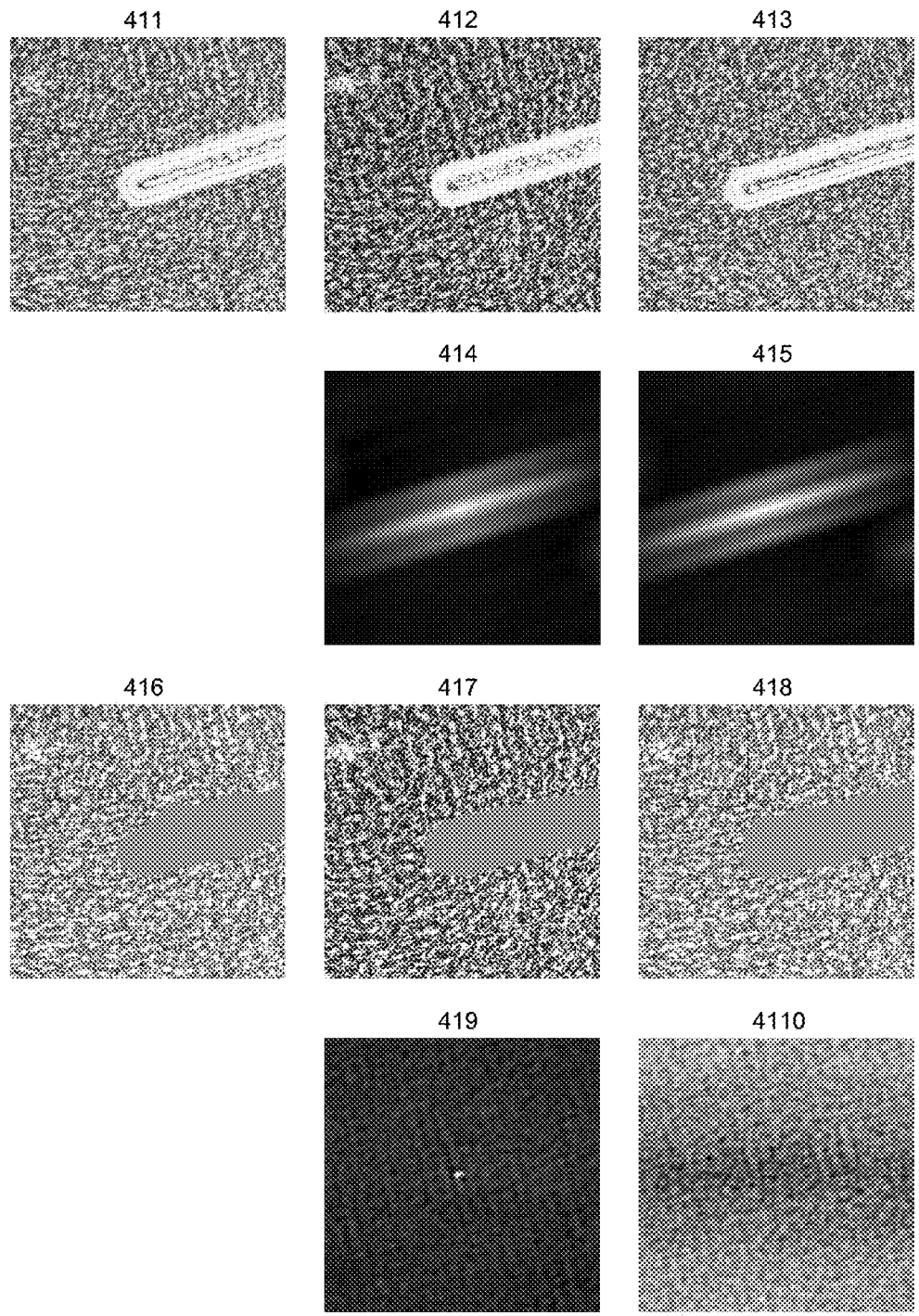

FIG. 41: Pictures depicting the importance of padding disturbing elements to the mean value. 411 is the template, without padding. 412 is another picture matching with the template, without padding. 413 is a picture from another item, without padding. 414 is the cross-correlation between the 411 and 412. 415 is the cross-correlation between 411 and 413. 416 is the image 411 padded. 417 is 412 padded. Image 418 is the image 413 after padding. 419 is the cross-correlation between 416 and 417. 4110 is the cross-correlation between 416 and 418.

Figure 42:
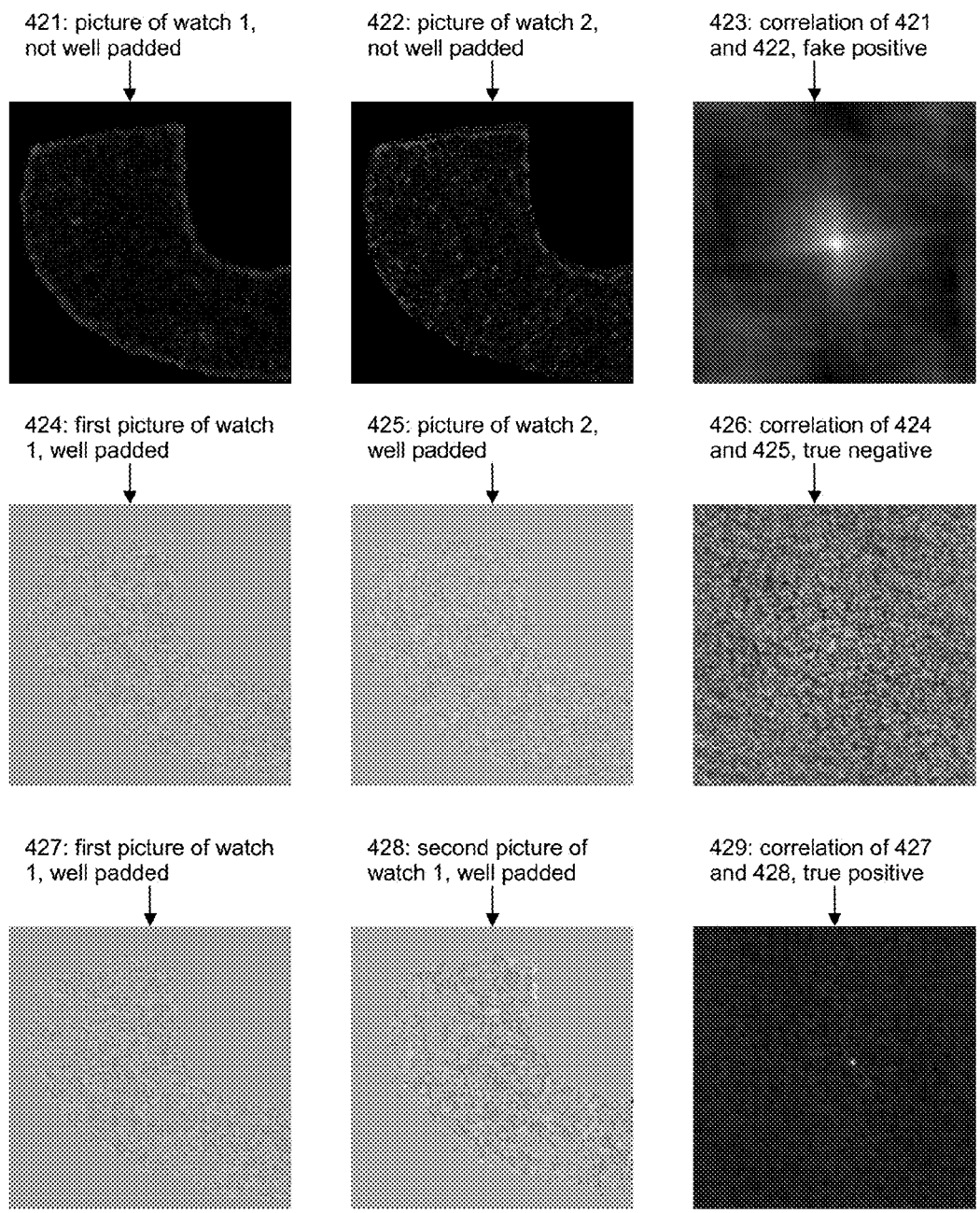

FIG. 42: Pictures illustrating the effect of padding with smooth borders. 421 shows a picture of a watch called watch 1, which is not well padded. 422 shows a picture of watch 2, which is not well padded. 423 is the correlation between 421 and 422 and it induces a fake positive. 424 shows a first picture of watch 1 which is padded by putting all the pixels above 20% of the mean value and all the pixels below 20% of the mean value to the mean value. 425 shows a picture of watch 2 with the same padding. 426 is the correlation between 424 and 425. The correlation is as expected, a true negative. 427 is the same picture as 424. 428 is a second picture of watch 1 with the same padding method. 429 is the correlation between 427 and 428. It is as expected, a true positive.

Figure 43:
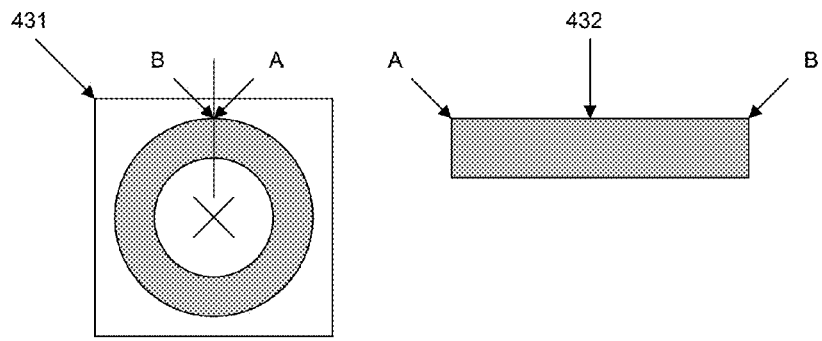

FIG. 43: Scheme representing the transform between to spaces. 431 is a circular donut around a point of interest. 432 is the donut in the transformed space.

Figure 44:
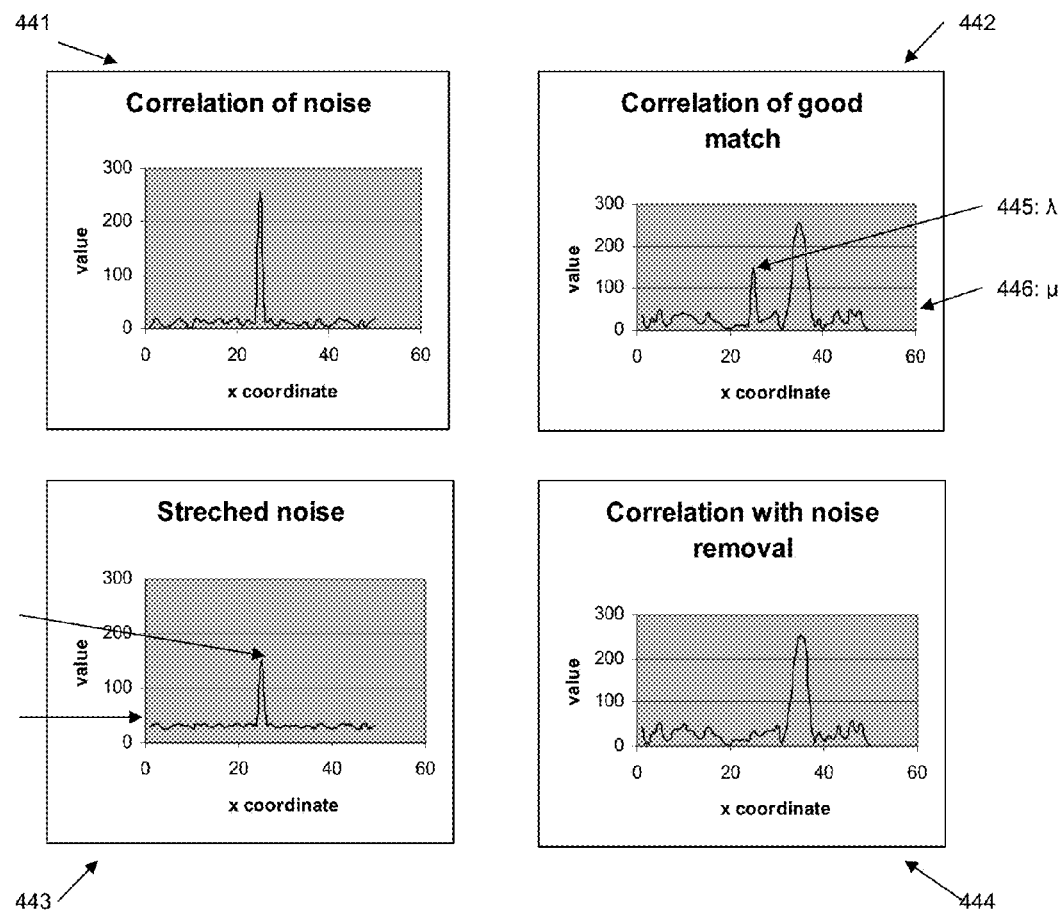

FIG. 44: Removing correlation due to noise. 441 shows the normalized noise correlation and 442 is the normalized correlation between the snapshot and its corresponding template. It can be seen that there are two peaks of correlation; the sharp centered one (445) is due to the noise and has a value of λ and the other one is the real peak. It has a mean of μ (446). 443 represent the noise correlation, which is stretched in order to correspond to the noise in the correlation between the snapshot and the template. It has the peak at the same value λ (447) and the same mean μ (448). 444 is the normalized subtraction from the correlation between the snapshot and the template.

Figure 45:
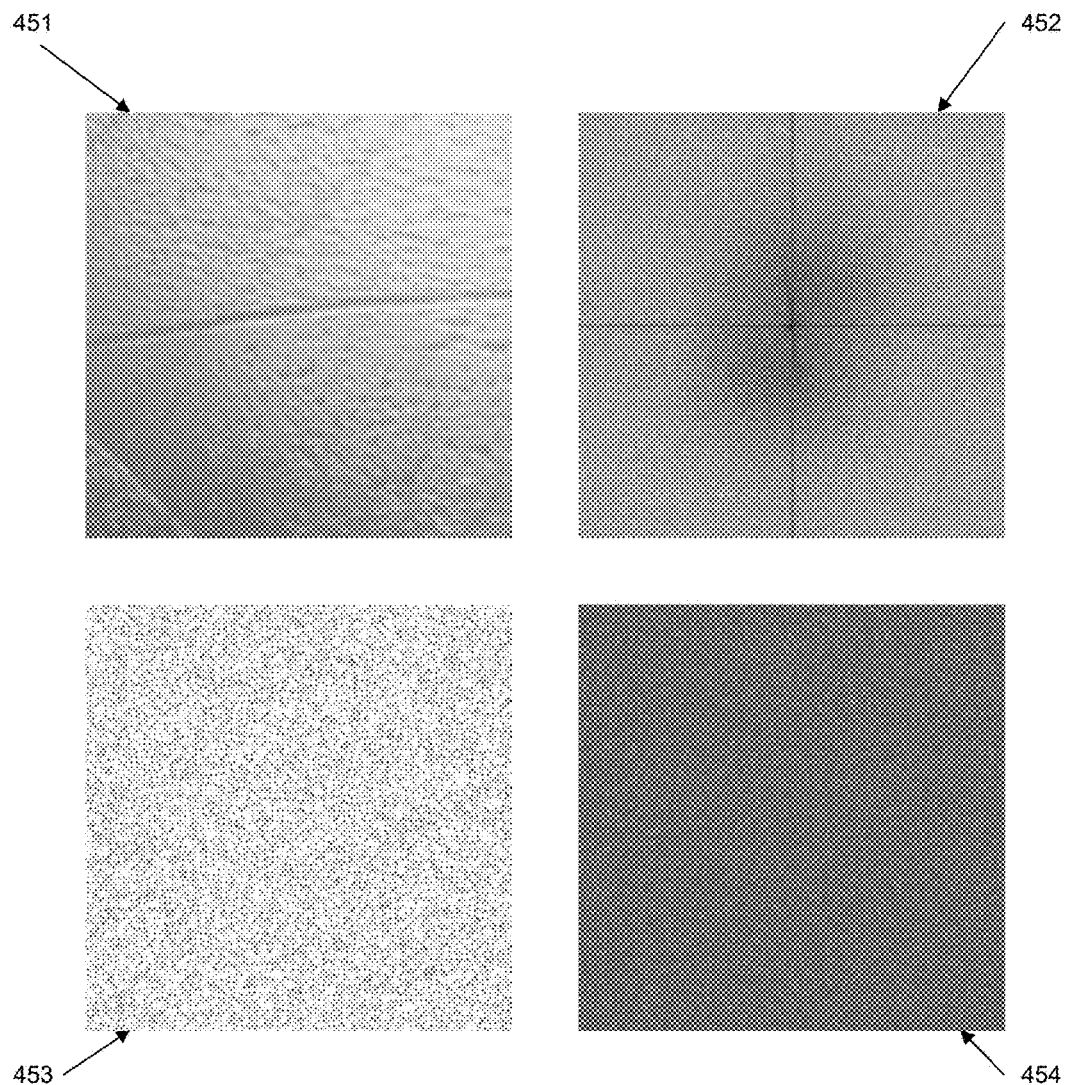

FIG. 45: Difference of Fourier spectrum between images used for Fingerprint and random noise images. 451 shows the spatial image used for Fingerprint authentication. 452 shows its Fourier transform. 453 shows the spatial image of random noise. 454 shows its Fourier transform.

Figure 46:
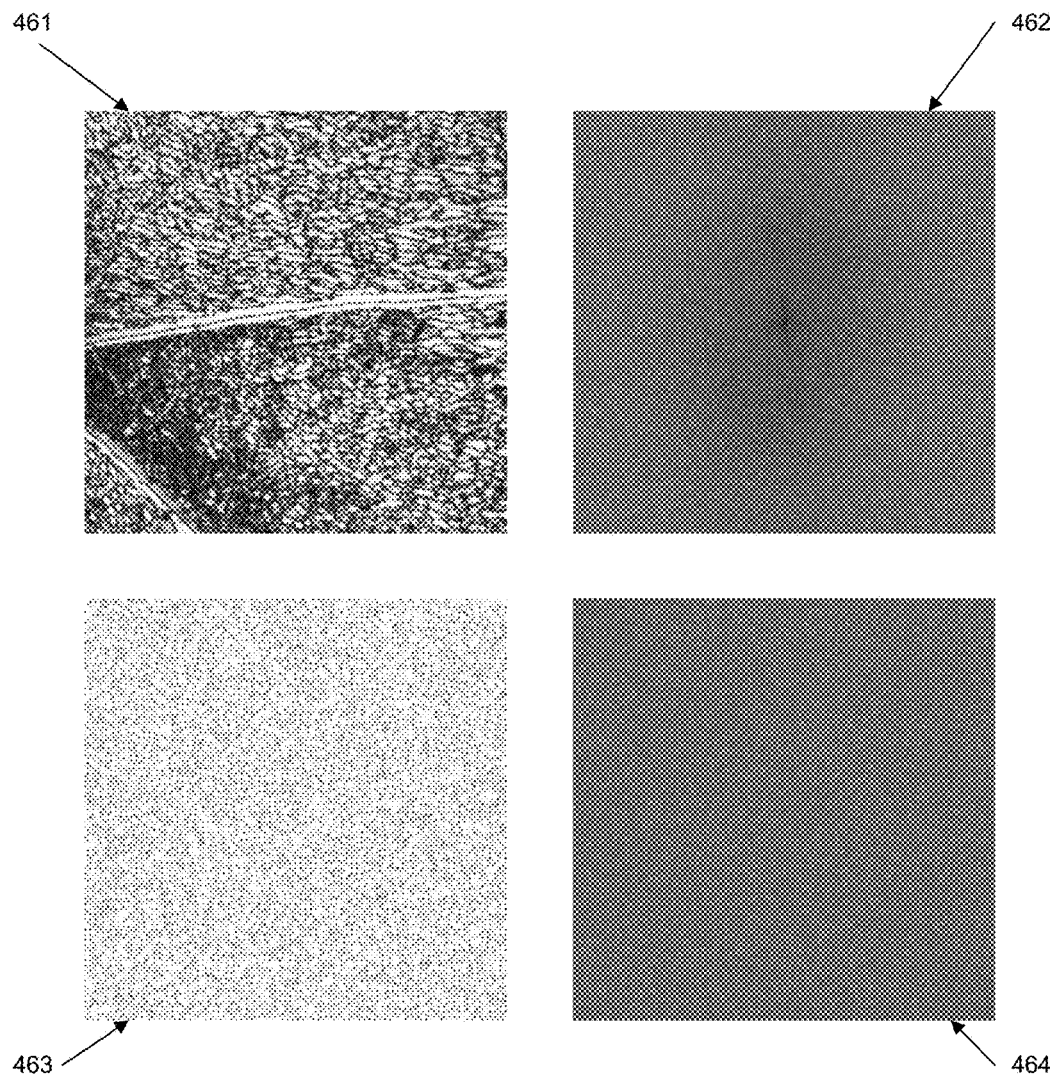

FIG. 46: Resemblance of Fourier spectrum between images used for Fingerprint and random noise images. 461 shows the spatial flattened image used for Fingerprint authentication. 462 shows its Fourier transform. 463 shows the spatial image of random noise. 464 shows its Fourier transform.

Figure 47:
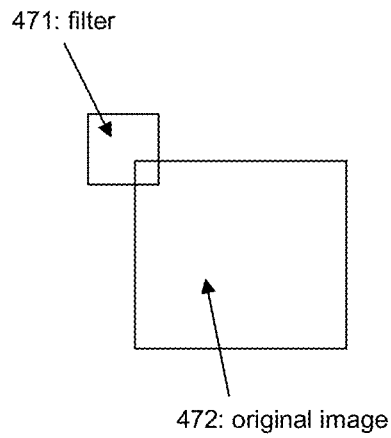

FIG. 47: convolution in the spatial domain. 471 shows the filter and 472 the picture to be convolved with it.

Figure 48:
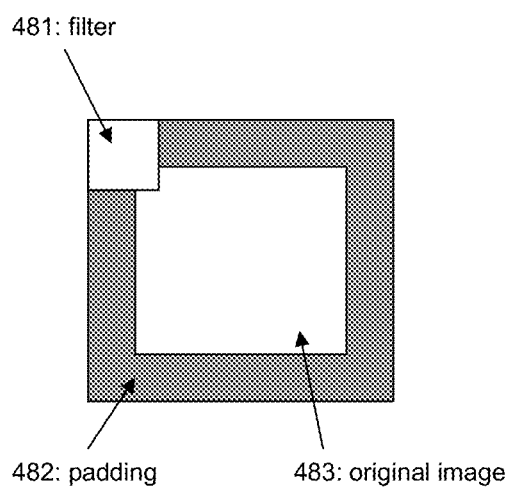

FIG. 48 shows the convolution of padded image. 481 shows the filter, 482 shows the padding and 483 shows the picture to be convolved with the filter.

Figure 49:
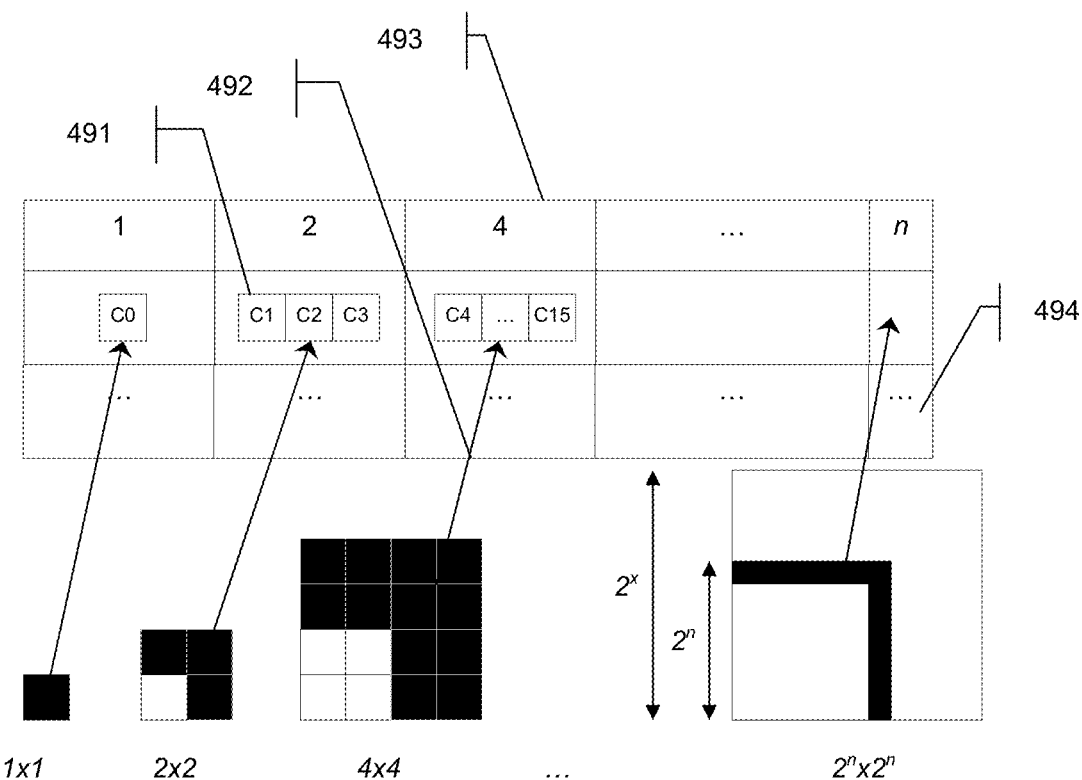

FIG. 49 shows the way Fourier coefficients (complex values) can be stored in the database. The coefficients displayed in black are stored in each column 491 of the database table 493. The figure shows that column 1 has only one coefficient (the average value of the image), the column 2 has the 3 following coefficients, the column 3 has 12 coefficients, etc. . . . This approach enables to optimize the required bandwidth for transferring data (492) from the database on the hard disk to the CPU. A new line 494 is allocated in the database for each template image.

Figure 50:
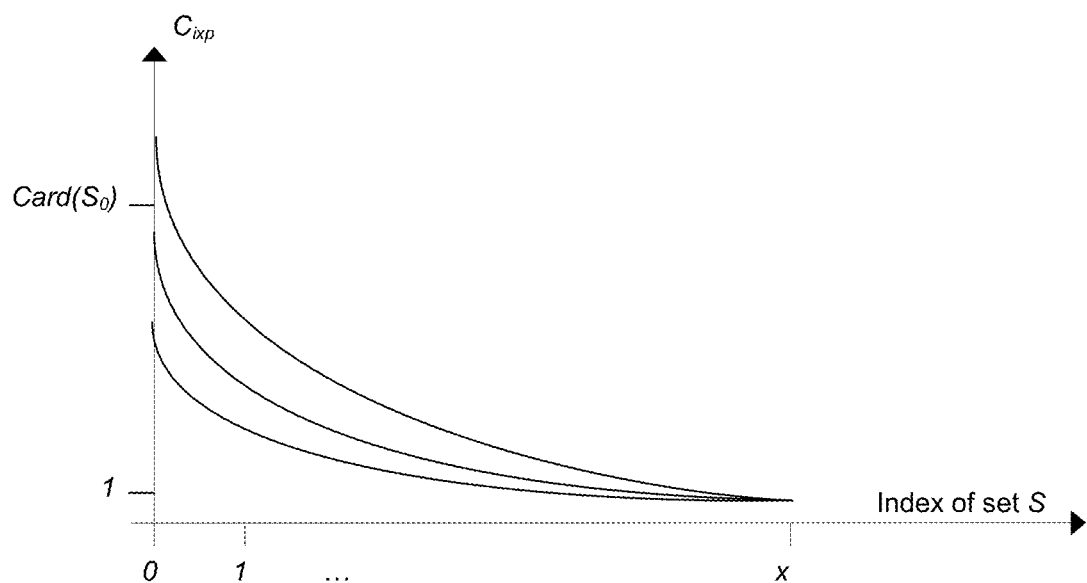

FIG. 50 shows the coverage of the database size using the "Best Rank" method. For each set of images of a given size, a certain number $C_{ixp}$ of items should be correlated. $C_{ixp}$ follows a geometrical law. During the detection process, the common ratio of this law is increased until $C_{ix1}$ is bigger than Card ($S_0$).

Figure 51:
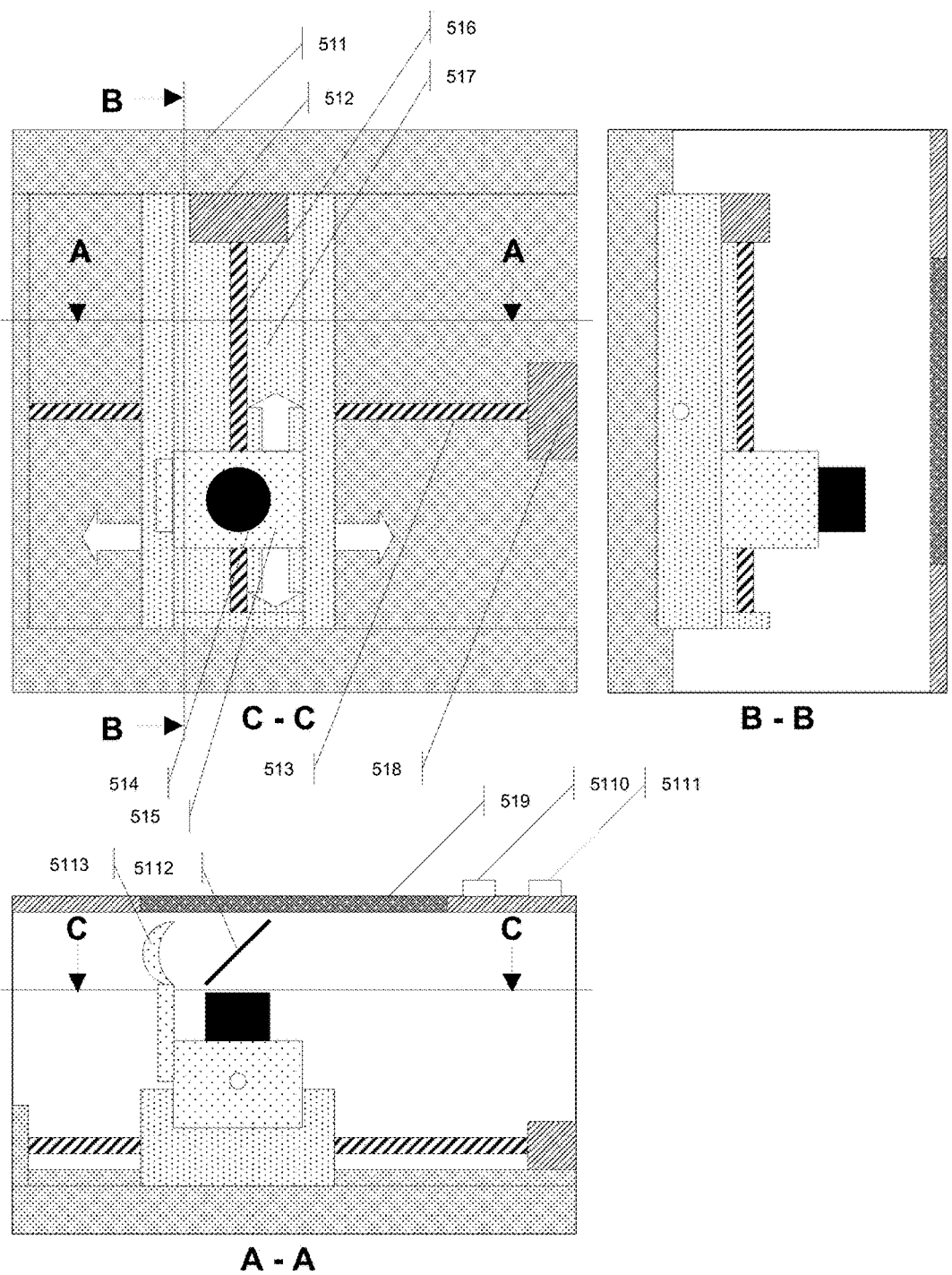

FIG. 51 describes an imaging device featuring both high dpi and large field of view. 511 is the main case, which guides part 517. This part is moved in one direction using electric motor 518 connected with to the part 517 with the threaded rod 513. Likewise, the part 515 is guided by case 517 and its displacement controlled thanks to electric motor 512 using a threaded rod 516. The digital camera 5112 is mounted on part 515, along with a lighting system 5113 and a semi-transparent mirror 5112 which is used to light the imaged surface with a specular lighting. Alternatively, other types of lighting can easily be conceived in order to enable diffuse lighting, as for instance the flash of a digital camera. The sample to be detected is put on the non-reflective glass 519. The motors and camera (and possible lighting) are controlled by a computer. Optionally, the detection process can be launched using button 5110 and result of detection displayed on system 5111 (led or LCD system for instance).

Figure 52:
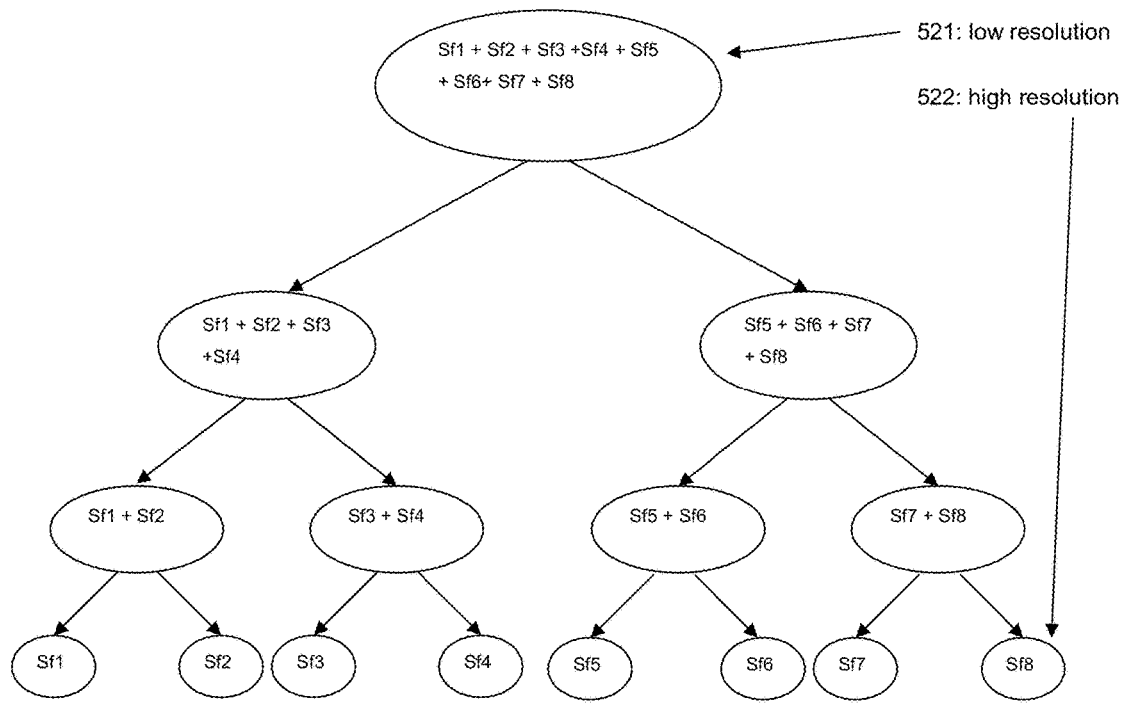

FIG. 52: Tree representing the different scale factors or rotation factors for an item. 521 shows that at low resolution, the templates with different scale factors have the same Fourier transform. Then, when the resolution increases, the different scale factors become distinct. At high resolution (522), there is one Fourier transform per scale factor. This approach is also true for changes in rotation factor.

Figure 53:
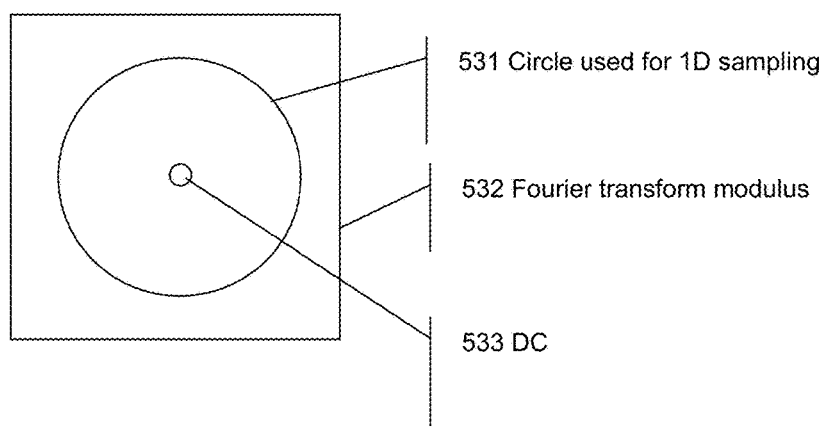

FIG. 53: Figure illustrating how a 1D signal can be sampled along a circle 531 of the Fourier transform modulus 532 centered on the DC component 533.

Figure 54:
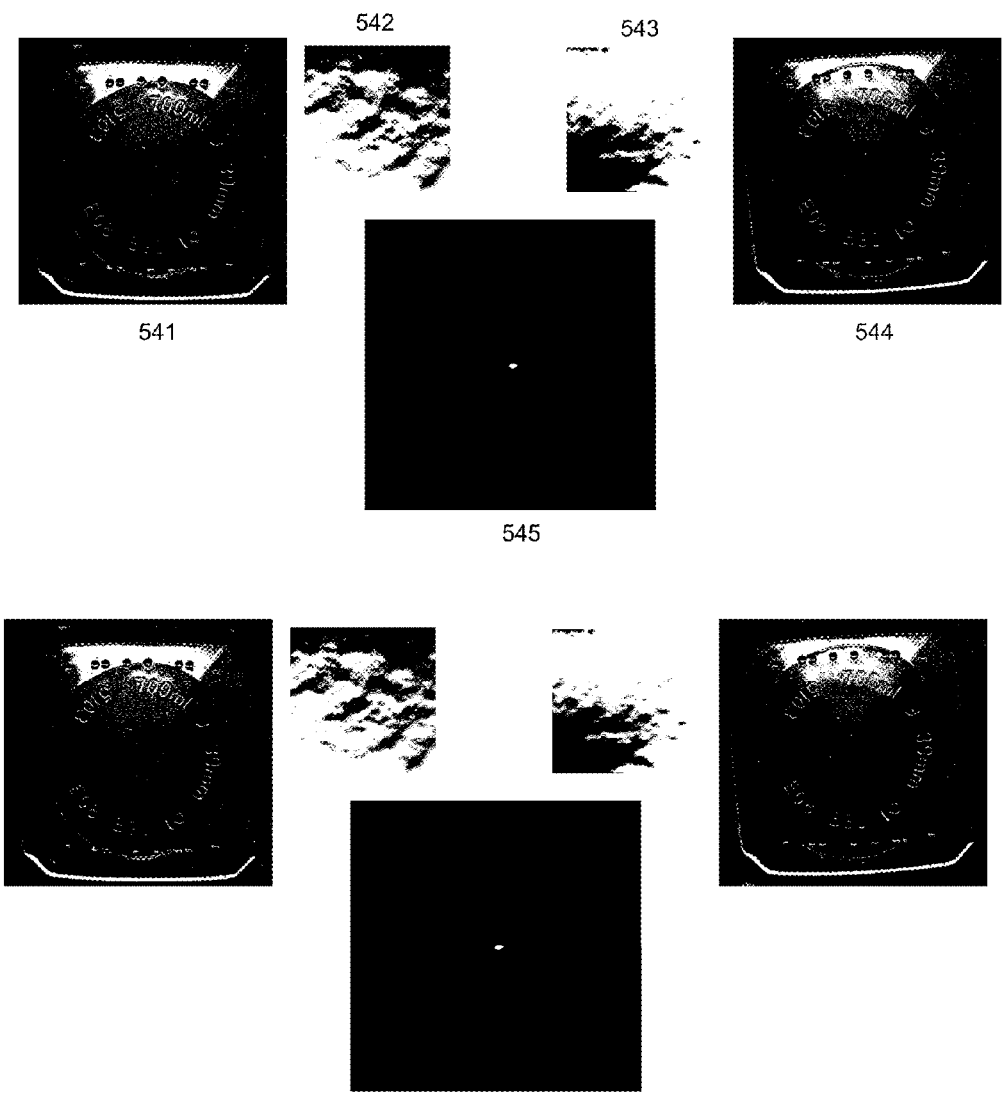

FIG. 54: FIG. 54: Shows cross-correlations obtained between molded glass bottles. Area 542A1 is a close-up of the bottom of bottle 541A, area, 543 B1 is a close-up of the same area on bottle 544B. Both bottles come from the same mould cavity. As a result the cross-correlation 545C between images A1 542 and 543A2 feature a peak which indicates that both areas have a similar microstructure.

Figure 55:
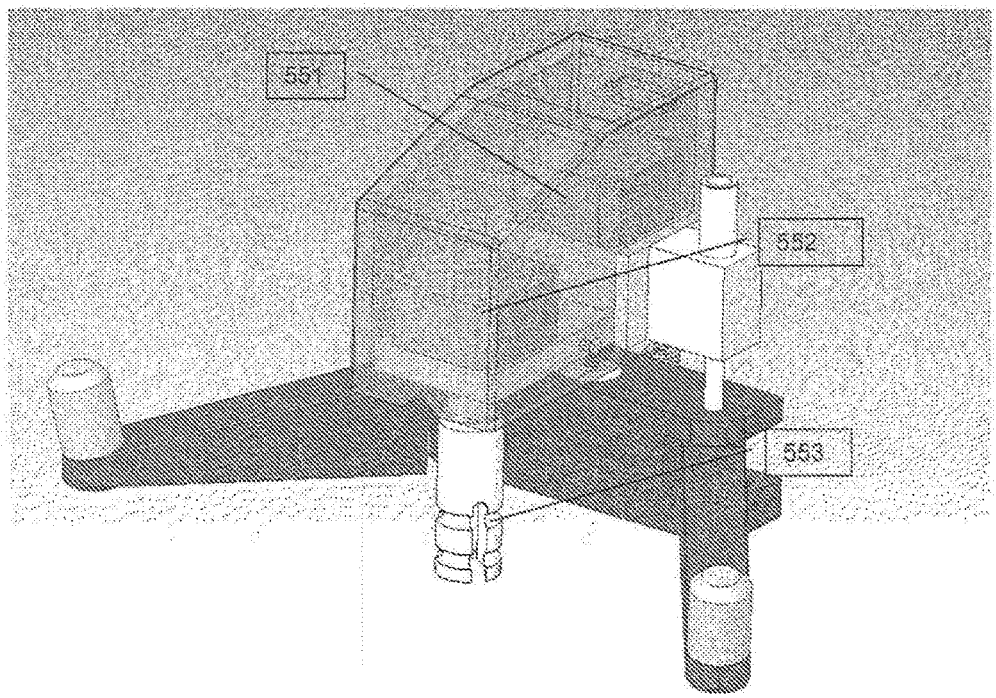

FIG. 55: Device enabling to automatically capture reference images of sample with different rotation angles, rotation is controlled by 552, vertical motion by 551 and the sample hold by 553.

Figure 56:
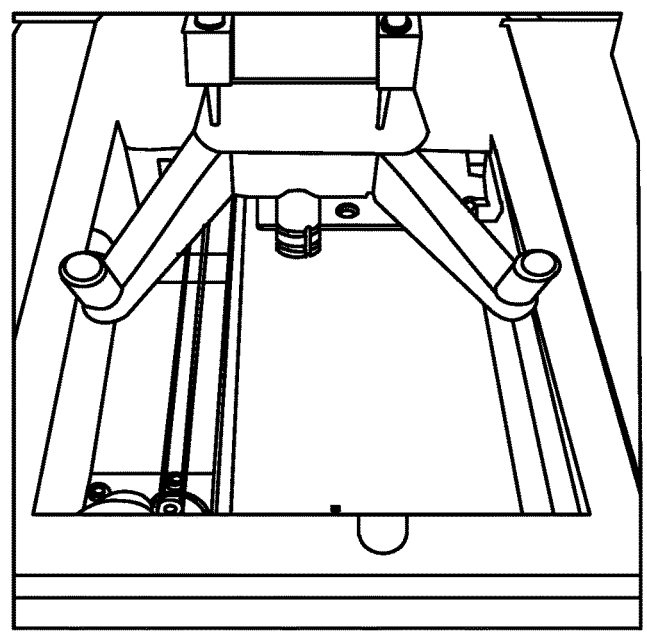

FIG. 56: The device of FIG. 55 can be put on a document scanner in order to capture images at different angles.

Figure 57:
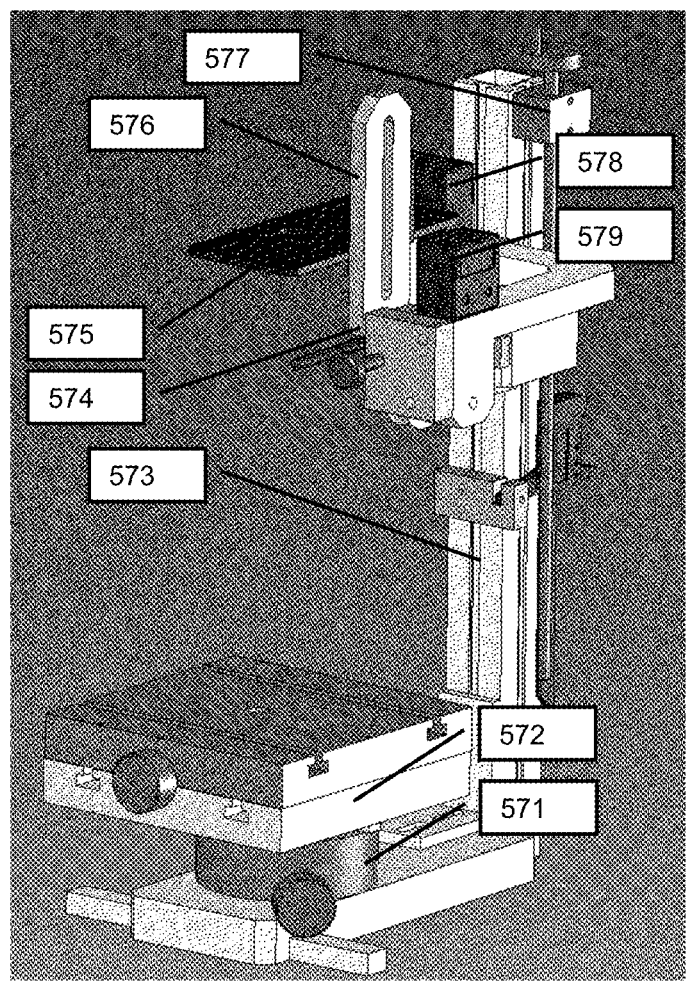

FIG. 57: A manually operated system that enables to precisely position an imaging device in respect to the surface of an object. Sample is put on 572 and observed at a distant position defined by the arm 573, The XY position is set by 572, vertical axis rotation by 571, height by 577 and 576, rotations by 574 and 578 (rotation sensor is 579). The imaging device is put on 575.

Figure 58:
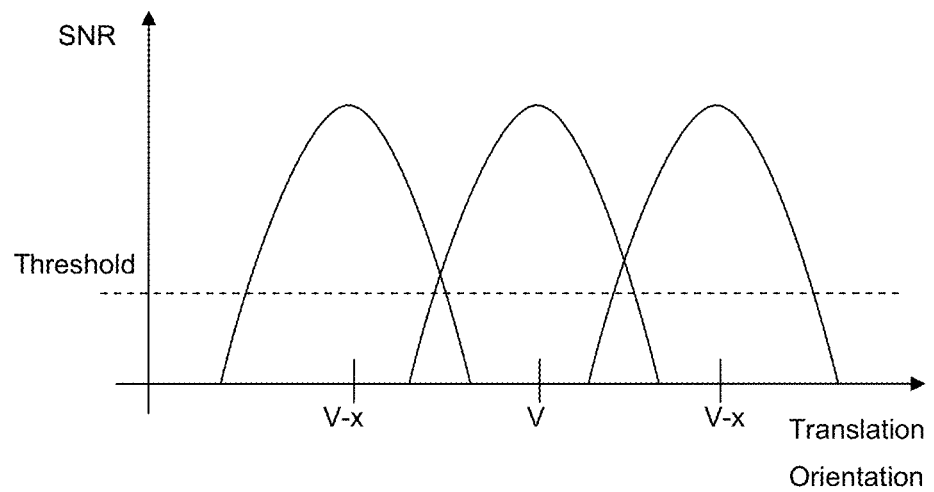

FIG. 58: Graph showing how the SNR (Signal to Noise Ratio) between the acquired image and the reference image varies when the translation or orientation differs between the images. It also shows how increases the tolerance to orientation/translation when additional reference images are used.

DETAILED DESCRIPTION OF THE INVENTION

Microstructure Images
Image Acquisition Device
Generalities

An image of the surface is acquired by means of a digital imaging device, which can be a digital scanner, a digital camera, a mobile phone with integrated camera (possibly using a special macroscopic lens), a portable microscope, a microscope, a specially designed device, etc. . . . The image acquisition can be performed one by one of static objects, or even on a production line, such a printing of folding boxes or the assembling line in the watch inducts. In this case, the acquisition systems may be designed especially for high-speed image capture with special, high-speed, cameras and for instance stroboscopic, synchronized light sources. An image acquisition for each and every object is of interest in the case of unique object identification, similar to the human fingerprint.

Image acquisition devices typically output a matrix of values corresponding to a color component sampled along a uniform orthogonal grid. The image acquisition can be done by reflection or transparence, depending on the product (paper, carton, metal, coating or polymer for instance) and the particular properties of the material. In the case of imaging by reflection, different types of imperfections may be imaged depending on the position of the lighting source. The different lighting orientations can be used to further increase the detection rate (successful finding of a match with a recorded image) and decrease the false positive detections (wrongly identifying a counterfeit product with an image of the database). Different light wavelength may also be used to acquire several pictures of the same area (with same or different wavelength for lighting and imaging). In particular objects may be images in different color spaces which are appropriate to highlight the microstructure (RGB, HSV, Lab, etc). This application focuses specifically on the processing of 1 color, but all described processes can also be applied to the case of object images acquired with several color components. More generally, additional imaging conditions may be chosen for a given imaged product if a risk of false positive/negative is identified based on the images recorded in the database for the previous products. A diagram illustrating this process is shown in FIG. 12. Similarly, it is also possible to systematically acquire several images (or other parameters) for a given area and remove, a posteriori, images from the database if they are not required to avoid false positive or false negative detections. The acquisition device should be chosen such that relevant details can be seen.

2D CCD with Diffuse Reflection

The diagram for acquisition by diffuse reflection with 2D CCD can be seen in FIG. 17. The image acquisition device (171) can be anything but a digital camera is a good candidate. The item to verify (174) is put in a light box. The light box (173) is used to diffuse the light (172). It can also be modeled by an annular flash. This can reveal some interesting details.

1D CCD with Diffuse Reflection

In FIG. 19, the diagram for acquisition by diffuse reflection with 1D CCD can be seen. The acquisition device can be anything but a scanner is a good candidate. The item to verify (191) is put on a sheet of glass (192). A moving light (193) and a moving mirror (194) are working together to reflect the light on a fixed mirror (195), which reflects it on a 1D CCD. This reveals other interesting details.

2D CCD with Specular Reflection

In FIG. 18, a diagram for acquisition by specular reflection can be seen. The acquisition device (181) can be anything but a microscope (either optical or electronic) is a good candidate.

1D CCD with Specular Reflection

Another possibility consists in modifying a digital scanner as in FIG. 18, by moving the CCD or the lighting part. The light (182) is coming from a known direction and is reflected (183) by the item to verify (184) in another direction that can be computed with the Descartes Law. The Descartes Law insures that the incidence angle is the same than the reflected angle.

Choice of the Best Device

It should be mentioned that an acquisition device may be capable to produce images needed for rotation/translation synchronization in addition to the images used for fingerprint. As it is shown later in the application rotation/translation synchronizations are typically performed using images of the object that include specific feature points. Such feature points can be acquired using imaging devices with large field of views or by using motored multi-axis stages enabling to drive the sample at precise locations or by moving the camera of the acquisition device.

Nowadays such devices exist but they have only a 1D CCD that is movable. It can therefore take two pictures of different resolutions of the same item. Unfortunately, such devices are quite slow, especially when acquiring images at high resolutions. It is possible to specially design a system using a 2D CCD in order to have the same functionalities. This device features both high dpi and large field of view. It offers the possibility to put the item to verify at any location on the device and move the CCD to take pictures from different zones at different resolutions. The first picture can serve for a macroscopic correlation which can be used to retrieve the model type, translation and rotation of the object. After such information has been retrieved, the camera can then be moved automatically to take the second picture in a specific zone which serves for unique identification or traceability. In FIG. 51, 511 is the main case, which guides part 517. This part is moved in one direction using electric motor 518 connected with to the part 517 with the threaded rod 513. Likewise, the part 515 is guided by case 517 and its displacement controlled thanks to electric motor 512 using a threaded rod 516. The digital camera 5112 is mounted on part 515, along with a lighting system 5113 and a semi-transparent mirror 5112 which is used to light the imaged surface with a specular lighting. Alternatively, other types of lighting can easily be conceived in order to enable diffuse lighting, as for instance the flash of a digital camera. The sample to be detected is put on the non-reflective glass 519. The motors and camera (and possible lighting) are controlled by a computer. Optionally, the detection process can be launched using button 5110 and result of detection displayed on system 5111 (led or LCD system for instance).

Furthermore the illumination can be either diffuse or specular. In case of specular light, it will be reflected by some mirrors. The specular light can reveal different details than the diffuse light. In FIG. 21 and FIG. 23, the details of a coated dial of two different watches are shown with specular axial light at about 10,000 dpi. In FIG. 22 and FIG. 24, the details of the same watches are shown with diffuse light with 1D CCD (scanner) at 4,800 dpi. It can be seen in these figures that for the first watch it is better to use diffuse light as there are more details in FIG. 22 than in FIG. 21. On the contrary, for the second watch it is better to use specular light as there are more details in FIG. 23 than in FIG. 24.

The above described device is generic as described in FIG. 20. It can have a specially designed excrescence (202) on which it is possible to put any item. For example, a watch with a strap that cannot be opened completely can be slide on the excrescence.

Choice of the Best Color Channel

As already mentioned the choice of the color space and color channel plays also an important role on the overall performance and must be taken into consideration when designing the overall architecture of the present invention. Depending on the object material and surface textures, different color space and different color channels may be optimal. Commonly used color spaces are YUV (luminance, chrominance), RGB (red-green-blue), CMYK (cyan-magenta-yellow-black), HSV (hue-saturation-value), LAB (lightness, color-opponents). In most cases a single color channel, such as the luminance, is appropriate for good functioning of the current invention. However, in certain cases processing of multi-color channels is a clear advantage. It is also interesting to note, that in a number of cases best performance can be achieved when using a different channel during template insertion and authentication.

Video Processing

As a video is a sequence of images, it is a natural extension of working on video frames instead of still image captures. When working on video frames, additional challenges arise and must be addressed. Such challenges concern focusing and re-focusing, lighting, white balance (auto/manual), frame compression, resolution limitations, etc. However, as we will see later, working with a continuous video stream presents multiple advantages and increase quality of the user experience.

Characteristics of Fingerprint Noise

Noise Types

As already mentioned, the types of noise used in the present invention may have different characteristics and are created by different processes. For instance, the noise may be created by the tools used to produce objects, such as sanding or turning. It is obvious that sanding will create a more or less rough surface, for instance measured by the Charmille numbers, with a random appearance. The surface roughness is and important object characteristic and only certain roughness ranges are appropriate for the purpose of our inventions. A totally polished surface also features a roughness, but of course it cannot be used in our inventions as the resolution requirements to acquire the surface noise would be much too high. For turning the situation would be totally different. In this case the surface usually features a spiral like structure following the cylinder. This spiral can be considered as a type of noise, which however may not be characterizes as random in the same way as the sanded surfaces. Nevertheless, the turned surface is appropriate for identification as it features other characteristics, such as self-similarity or periodic auto-correlation elements. It is interesting to note, that the sanded surface is for a human easily visually distinguishable from a turned object, however, for the purpose of the present application the visual aspect is not as important as we work mainly on a macroscopic level. The object material and texture has a direct impact on the appropriateness for imaging the macrostructures and impacts the optical and light setup. For certain surfaces additional light sources, such as a flash light, may be helpful in order to enhance the microstructure characteristics, especially for rough textures or mirroring surfaces. In other cases, ambient light is totally sufficient. There may also be cases, where the combination of images taken with and without flash is of use and enhances the overall performance.

As seen in the previous sections, the macroscopic noise must not necessarily feature a uniform and homogeneous texture. It is indeed possible to work with directional and even non-homogeneous microstructures, such as brushed metal. In this case the process of extracting the usable microstructure characteristics may become significantly more challenging as the nature of the microstructure features an important parasite autocorrelations or cross-correlation part. In such cases, it may be interesting to work in specific transform domains, such as the wavelet domain or log-polar domain. Very often such non-uniform microstructures feature also a non-flat frequency spectrum, which makes the selection of characterizing coefficients a good pre-processing step. Independent on the noise characteristics, the combination of different color channels and the exploitation of cross color statistics and relationships can help in both extracting the microstructure and decreasing the effect of non-desired elements.

Ideal Case Versus Real Case

The ideal case for fingerprint identification is an image made out of pure white noise. Indeed, in such case all frequencies contribute equally to the correlation, which maximizes the detection robustness and selectivity (i.e. difference between true positive and true negative detections). In practice, real image statistics of object are different from white noise. It is important to notice that if the image differs too much from noise, it wouldn't be possible to recognize it by cross-correlation. In fact in this case macroscopic details will mainly contribute to the cross-correlation and then picture from different items which have a reassembling macroscopic structure will be considered as being the same. For these reasons, it is important to characterize the deviations in order to remove them. Some of these deviations can be characterized easily in spatial domain (lack of homogeneity for instance) and others can be more easily detect in the frequency domain (anisotropy and spectrum shape). In FIG. 45, it can be seen that the Fourier spectrum (452) of a spatial image used for Fingerprint (451) is quite different from the Fourier spectrum (454) of random noise (453). The following describe some approaches to correct such deviations:

Change of Resolution

Microstructures have typically different types of defects and each one can be ideally imaged at a specific resolution. For instance, let us consider the case of circular defects made by uniform circular disks of 10 um of diameter uniformly spread on the sample such that 50% of the surface is covered. A resolution of 2400 dpi will result in each defect being resolved by 1 pixel, a resolution of 24,000 dpi will image only one defect on a 128×128 image and a resolution of 240 dpi will average of approximately 100 defects for each pixel. In such a case, it can be foreseen that 2400 dpi will be the best resolution, and that the obtained image will be closest from white noise.

Pre-Processing

It is also possible to alter the image by processing it in order to have its statistics get closer to white noise and remove or decrease the impact of disturbing macroscopic elements, such as printed information, embossing, scratches, effects non-uniform light distributions, etc. One possible pre-processing is flattening and is described extensively below, such approach will in particular decrease lack of homogeneity typically caused by non-uniform object lighting. FIG. 46 shows that the Fourier spectrum (462) of the flattened image (461) is very like the Fourier spectrum (464) of random noise (463). Spectrum whitening is also a possibility of pre-processing to make the picture very like random noise. Spectrum whitening is described extensively below. In addition to approach the macroscopic image statistics to white noise, pre-processing is also used to enhance the macroscopic texture characteristics, which can be seen as an isolation of the characteristics of interest. There exists multiple methods which indeed combine the removal of non-desired elements and enhance the macroscopic texture characteristics, one such filter is the local or global histogram equalization. Pre-processing can also consist in a sequence of step, each step being tuned for a specific purpose. Experience has shown that for pre-processing the following manipulations have shown effective: local or global flattening, histogram equalization, Wiener filtering, least significant bit LSB preservation (discarding the most significant bits MSB (this approach is very effective to eliminate the effect of printed text), various low-pass filters, contrast enhancement, masking of non-desired areas and replacing them is substitute values, dust and scratch removal, morphological filters, color channel combinations, etc.

Post-Processing

It is also possible to process the Fourier coefficients of the images to be correlated. The interest of such approach is that it enables to use only those coefficients which describe the noise of the image. For instance, macroscopic variations can be partly cancelled by not using low frequency coefficients; anisotropy variations can also be decreased by threshold or morphological filter of the spectrum. Post-processing can of course be applied in any spatial or transform domain. Depending on the specific post-processing requirements, filters methods similar to those in the pre-processing steps can be used.

Practical Considerations

If the final application is to use the Fingerprint for product authentication, the finer the microstructure the harder it will be for a counterfeiter to reproduce it. More specifically, the fingerprint the most challenging to counterfeit would require imaging at the atomic level (thus requiring acquisition with imaging based on X rays or smaller wavelength, electron microscopy or tunnel effect microscopy). On the contrary, macroscopic details are easier to counterfeit. Another application of fingerprint is that it enables to identify them without any disturbing marking. This is particularly useful for luxury products (watches, vials, etc) for instance, where aesthetic is a major concern, where is enables authentication or traceability at the item level without any visible impact on the product (another approach consists in marking the product at a microscopic level, as can be done with technologies like Cryptoglyph). Another application is to provide authentication and item-level traceability for parts which cannot be carry any marking because of mechanical, chemical or other constraints related to the conditions of use (or any other aesthetic reason). For instance, some parts may be subjected to hard thermic or chemical process that would erase any type of marking.

Resolutions Requirements

It is basically possible to use any sufficiently random structure to uniquely identify a product. In particular it is possible to use the microstructure of a graphical design (in particular the barcode, text, logo, artistic designs, lines, etc) printed on a product as a random identifying structure (use of barcode has also been described for counterfeit detection in U.S. Pat. No. 6,869,015, using a system based on particles mixed with the barcode) or to use the microstructure of the underlying material. However, the resolution of the imaging device should be adapted to the characteristics of the microstructure.

An example of such a microstructure is given in FIG. 2. It shows the typical microstructure (the word "imperfection" is also used with an equivalent meaning in this document) of regular paper as seen with an equivalent resolution of about 11,000 dpi, which corresponds to a resolution of a few micrometers. In practice, it is considered that for standard paper and carton, the random structures have a size that rarely extends above a few millimeters (however, some special material may have much larger random structures or highly anisotropic structure sizes). Typically, the considered structure size will be below 1 mm or even below 100 um. Standard imaging devices listed above can reach such level of details. For instance a 1200 dpi scanner can theoretically resolve structures of 21 □m. Other type of materials, like polymer, metal, coating or glass for instance, may exhibit different types of microstructures requiring either lower resolution (and thus larger field of view in order to keep the same quantity of image information) or higher resolution. In FIG. 3, the microstructure of a metallic part is shown at 4,800 dpi. The size of the microstructure elements are about 47 um. The field of view is about 10 mm×10 mm. In FIG. 4, the microstructure of a piece of polymer is shown at 2,400 dpi. The size of the defaults is about 349 um and the field of view is 50 mm×50 mm. In FIG. 5 the microstructure of an offset printed label is shown at 2,400 dpi. The size of the defaults is about 42 um and the field of view is 2.5 mm×2.5 mm. In FIG. 6 the coated part of a dial is shown at 10,837 dpi. The size of the details is about 58 um and the field of view is 1.2 mm×1.2 mm. For all these materials the details are uniformly spread across the image. Thanks to some image processing steps that are described in more details in the next sections, it is possible to obtain a uniform variation of the microstructures inside an image. Furthermore it was noticed that these microstructures were randomly spread on the item. This insures randomness between different items. Very often it is difficult to define a clear range of the microstructure feature size due to the random nature. In this case, it is desirable to set the optics and lighting such that the effective resolution resolves the most prominent and differentiating part of the feature size range. It should also be noted at this point, that very often a resolution lower than the nominally necessarily resolution still results in very satisfying results. A similar concept was introduced by U.S. Pat. No. 7,492,920 U.S. Pat. No. 7,492,920 where a scanning resolutions lower than the printing resolutions is used.

Generally speaking, it appears that a resolution of 2400 dpi or higher is often required to characterize a unique fingerprint. However, some materials exhibit unique fingerprints with significantly lower resolutions, this is particularly common for textures which have been designed, on purpose, with a noisy and variable pattern. Furthermore, unique fingerprint can be used in order to perform 1 to 1 matching. In this case the resolution can be lower because it is not necessary to compare with all the items in the database but only with the claimed one. 1 to 1 matching can be performed in particular when a serial number is displayed on the item to verify. This serial number can be read by a human operator or via OCR and transmitted to the matching algorithm which will then only compare with the claimed item. In the case of a microscopic fingerprint, a lower resolution may be sufficient. Finally, macroscopic fingerprints can be performed with resolution of 300 dpi or lower. FIG. 25 is the schema representing the different dpi necessary for each level of the fingerprint. The different technologies are represented on the vertical axis (251) and the different dpi's are represented on the horizontal axis (252). There are always gray zones and white zones for each technology. The white zone represents the best dpi zone for the technology whereas the gray zone shows up to where it is possible to extend it. Unique fingerprint (255) has no upper boundary as the dpi to identify an item uniquely depends on the size of its microstructures. Unique fingerprint may also extend in some cases in the lower resolutions area (like leather for instance and more generally any natural material). Microscopic fingerprint (254) and macroscopic fingerprint (253) provide very close functionality. The only difference is that, in microscopic fingerprint, microstructures are considered whereas in macroscopic fingerprint macrostructures are considered. An upper boundary is therefore necessary because it defines the boundary between microscopic and unique and between macroscopic and microscopic. For the same reasons a down boundary is also required.

Microstructure of Printed Paper

A particular type of randomness can be observed in the contours of a printed shape or inside a tint area or at locations where several colors are applied. For instance FIG. 13 shows the contours of text printed in rotogravure technology and how they vary between two successive prints. In this case, these contours have some features which are common between two contours (like 131 and 133 for instance) but also features which are different (like 132 and 134). Common features (i.e. micro fingerprint) typically have sizes that extend on a larger area than different features (i.e. unique fingerprint). This means in particular that contour matching can be performed using high frequencies of the signal. The similar large features come from cells location on the cylinder and the variation between two prints comes from the texture of the paper and how the ink deposits on the surface.

More generally, the print randomness depends on several parameters, including the location of the cells engraved on the cylinder, the viscosity of the ink, the printing speed and the micro structure of the carton, the ink filling of the cylinder cells, etc. on one hand and the ink absorption on the paper on the other hand. All these parameters have an influence on the randomization of the shape contours or tint area. It is this randomness that can be used to identify individual products but also production batches, individual cylinder used for production or the printing works. It is also possible to deduce the aging of the cylinder (and hence at which approximate time a product was printed) from the images (for instance, the doctor blade that pushes the ink in a rotogravure cylinder progressively wears the engraved cells after millions of rotations). In particular, the common features of the 2 images of FIG. 13 come from the fact that they have been printed with the same cylinder; another cylinder engraved with slightly different parameters would provide substantially different contours. All these techniques are not limited to rotogravure and also applied to any printing technology. Another example is shown in FIG. 14 with a tint area printed with industrial offset (the original image was yellow and was later processed to enhance the contrast). The image is clearly not uniform and will always differ between two different prints.

Random Microstructure of Other Materials

Microstructure of Chemical Etching

In order to illustrate this type of structure with a practical example, we consider in the following the particular case of a marked watch case. Such engraving are typically performed by chemical etching. So each engraved logo is unique as it can be seen in FIG. 15. 151 is a part of a chemically engraved logo of a back of a watch and 152 is the same part of the same logo on another watch of the same model. This is an example of unique fingerprint. Chemical etching is usually done on metallic surfaces but can also be applied to any other material.

Microstructure of Stamped Material

The back of the watch can also be stamped instead of chemically engraved. For this kind of material, the dpi of the acquisition device should be much higher than in the preceding case. If not, it will only be possible to distinguish the shape of the stamp used to mark the surface. It is shown in FIG. 26 that with a big enough dpi, it is possible to see differences between the two items. Here the field of view is about 0.4×0.6 mm and the dpi is 10,837. This is an example of unique fingerprint. Stamping can also be used for microscopic fingerprint. In fact, if the stamp is marked with random noise, it will always display the same pattern on the object where it is applied. In particular, this technique can also be used in the case of pills manufacturing: Indeed in such case, pills are typically made of powder which is compressed in order to create a solid object. The surface of the tool used to compress the powder can be marked with noise, in such a way that each pill features the same random pattern (i.e. microscopic fingerprint). Again, stamping is usually done on metallic material but it can also be done on any other material.

Microstructure of Brushed Material

Another standard surface finishing is brushing, typically on metallic surfaces (like watch case for instance) but brushing finish may also apply for many other materials. Again the ratio between the dpi and the field of view has to be high enough to see details. In FIG. 27 it is difficult to see the details with naked eyes because the brushing is very present. But the microstructures are here. It is shown in FIG. 28 that the cross-correlation is not damaged by the brushing. The correlation peak is a bit stretched out but as there is no peak when two different items are compared, this is not a problem. This is an example of unique fingerprint. Brushing is often done on metallic surfaces but can be applied to any other material.

Microstructure of Laser Engraved Metals

Laser is the English acronym for "Light Amplification by Stimulated Emission of Radiation". Different types of laser exist but the most current one is the CO2 laser. Laser engraving is often used for little series or for unique marking. For example, serial numbers are very often laser engraved. This gives the possibility to recognize the number with OCR and then perform a 1 to 1 matching with the claimed number. If the engraving is not unique, laser engraving is one example of unique fingerprint by 1 to n matching. In fact, the laser burns the metals where it is applied. So the microstructures of the metal become apparent. FIG. 8 shows the microstructure of laser engraving at 30,000 dpi with a field of view of 0.13 mm×0.13 mm. Of course laser engraving can be done on any material, such as plastic, and not only on different metals. A particular attention has to be given to the fact that laser engraving induces some pulses that can be perceived as repetitive if the resolution of the taken picture is not high enough. Such pulses are not present at the beginning and the ending of the engraving. In FIG. 9, 91 shows the structure of the beginning of the engraving and 92 shows the structure of the pulses. Therefore if the resolution of the acquisition device is quite low, for example 6,400 dpi, the matching can be performed in the beginning or in the ending of the engraving to avoid the periodicity of the pulses. On the contrary, when the resolution is becoming big, for example 30,000 dpi, these special zones should be avoided because the details are too big and the image is not noisy enough. In this case, the repetitive pattern of the pulses is not visible and the matching should be done into the pulses area.

Microstructure of Homogenous Metals

It is possible to detect the microstructure of a homogenous metal part at a quite low dpi. FIG. 10 shows that a 7.1 Mega pixels digital camera with an optic of 28.8 mm and a focal distance of 20 centimeters is enough to see these microstructures. The resulting picture is at 1445 dpi and the field of view is 2.2 mm×2.2 mm.

Microstructure of Resins

Solidified resin items can be identified with the unique fingerprint technology as their microstructure is unique. FIG. 7, shows the microstructure of resin at 20,000 dpi. The field of view is 0.35 mm×0.35 mm.

Microstructure of Coating

Different types of coating exist; in particular coating can be used for protection or finish purposes others can be used for coloring purposes. Application means are also various, but typical methods include bath, electro-coating, pulverization or printing technologies such as offset, serigraphy, etc. FIG. 29 shows the difference of microstructures of a painted coating at about 10,000 dpi with a 1×1 mm field of view. Coating can be put randomly and it this case it is a very good candidate for unique fingerprint authentication; but it can also be applied on purpose at some specific random locations or with a specific random or pseudo-random characteristic. This can for instance achieved by applying varnish layers with random holes as proposed in U.S. Pat. No. 7,965,862. The so introduces surface characteristic then serves as a good candidate for both, macroscopic and microscopic fingerprint authentication, depending on the pattern design and variation over the different objects. Yet another type of coating is the painting used for art and more generally any visual processing of an item for artistic or pleasant looking aspects purposes.

Microstructure of Molded Materials with a Non-Glossy Surface

If a material is molded, (particularly if it is molded with a sanded mould which creates "sanded finish" appearance), the microstructures of each molded part look similar. So if the dpi is chosen carefully, all the items that come out of a same mould feature similar surface, whereas those who come out of some different moulds look completely different. This is illustrated is FIGS. 30. 301 and 302 come out of the same mould and have the same microstructures whereas 303 comes out of another mould and has other microstructures. Pictures are taken at 2,400 dpi with a field of view of 5×5 mm. An example of that is the case of cover of some containers. This is a typical example of microscopic fingerprint.

Microstructure of Molded Materials with a Glossy Surface

Molded materials with a glossy surface are not very good candidates for the unique fingerprint technology because it is necessary to use very high resolution to model the differences between items. But if the molded material is a plastic and if it contains fiber glass, it becomes a very good candidate for the unique fingerprint technology because the fiber glass induces random patterns. It is possible to resolve details at a quite low resolution. FIG. 11 shows a smooth molded plastic part with fiber glass at 1445 dpi. The field of view is 2.2 mm×2.2 mm.

Microstructure of Ink Deposit on Non-Porous Materials

If ink is deposited on a non-porous material, for example glazed paper, each drop has its own shape and location. Labels are taken as an example. A label will be the same than all the other labels that are printed with the same printer on the same position of the offset sheet. On the contrary, a label printed by another printer or in another position of the offset sheet will look different. This is shown in FIG. 31. 311 and 312 are printed with the same printer and the same position on the offset sheet. 313 is printed with another printer. This is again an example of microscopic fingerprint.

At the extreme, this technology can be extended by reducing the dpi in order to check if the overall graphical design of a box matches with the original design. This approach is for instance applicable to fake medicines that are sold on the Internet. This is a particular example of macroscopic fingerprint. We can even extend it further and base the authentication on the form of the object/product in 2D or even 3D.

Other Microstructures

More generally any surface treatment or machining process resulting in noisy images or images with sufficient entropy may be used as a template for image retrieval. This includes in particular surface sanding, milling, spinning, drilling, embossing, thermoforming, etc. . . . In addition to surface based characteristics, it is possible to base the invention on elements below the object surface, such as gas inclusion in plastic films, or even changes in material compositions which may for instance result in a change of the diffraction index of the materials. In a similar way, the surface of foams features a very unique and interesting microstructure due to the internal composition.

Artificial Pseudo-Random Microstructure

It is also possible to introduce in a controlled manner some micro-defects. One good example is the so-called "Cryptoglyph" technology (detailed in U.S. Pat. Nos. 7,684, 088 and 7,965,862). This technology enables to incorporate some ink dots or varnish holes on paper or carton for instance. This is performed using printing technologies like offset, flexo or rotogravure. The location of the dots is determined by a digital image that is used to create the offset, flexo or rotogravure cylinder. Therefore, with this approach, every printed material has some micro-defects (holes or dots) located at the same position, and in this sense is similar to the molding method which transfers the same microstructure from the same mold to all molded items. Once transferred on the material, the items featuring the Cryptoglyph can be processed (and actually any pseudo-random or purely random printed or engraved pattern) using all the methods and techniques described in the current application. In addition to these methods, it should be noted that the digital image of the dots or holes given to the printer can also be used as reference image. In practice it appears that the cross-correlation of the original digital image of artificially generated defects will generally give a higher cross-correlation signal than the cross-correlation obtained by using a physical picture of the item as a reference image. All detection techniques based on Cryptoglyph properties listed in above patents are also possible.

Image Recording

General Strategy

Throughout this invention, we use indifferently the term of "Reference image" or "template". First of all, a specific area has to be defined; the same area will be used for recording and future comparisons. The location of this area is optimal when its microstructures are uniformly spread out the image as it was explained above. Such an area can be retrieved automatically. Indeed, this area should match some specific mathematical requirements enabling to maximize detection rate and minimize false detections. In particular, images having statistics of uniform noise have proven to perform particularly well. Many approaches are available in the literature which enable the measurement of noise characteristics and may be used here. One example is to analyze the Fourier transform of the image, for instance white noise is known for having a flat spectrum. It is also possible to derive the optimal dpi resolution by analyzing with part of the Fourier spectrum characterizes a noise signal as described above. This is shown in FIG. 32. 322 is the uniform Fourier Transform of 321 which contains microstructures that are uniformly spread out over the image. It is possible to take one or two images at two different levels of details for pre-processing steps purpose. This depends on the future processing and can be determined by the material, the shape and the application.

Storage Issue

Type of Storage

The data can be stored in different ways. When using the macroscopic fingerprint technology or the microscopic fingerprint technology, the amount of data to store is much smaller than the amount of data of the number of items to protect in the case where multiple items feature a similar surface structure. For this reason, if the amount of data is small it is possible to store it together with an ID (which is a unique identifier of the item) in on a file based storage system without reverting to a full blown database concept. When a large number of different items are to be authentication, for instance when using the unique fingerprint technology, the total amount of data to store is proportional to the numbers of items to protect. This can become huge, especially if there are lots of items (for instance millions of watches or billions of folding boxes). In this case it is not anymore possible to store data in a plain data file base storage approach. It is therefore necessary to store data in a place where it can easily and selectively be accessed. A database appears to be the most flexible storage place. It is self-contained, can be backed up and moved from one place to another. Furthermore, it can be combined with an existing database at the customer place, such as SAP.

Location of the Database

Location of the database is an important aspect of the current inventions as it has a direct impact on system speed and reliability. It is obvious that data transfer of a medium fast or slow link has a direct impact on system reactivity. Therefore during system design, the architect has to decide if a local or remote database is appropriate. One can even imagine having a local database sitting on a laptop and synchronizing with the master database periodically. Connections to the database follow traditional link, such as LAN, WAN, or even wireless networks such as GSM. The question of the database gets even more important when the data set is large or authentication is performed on a mobile device, such as a smart phone. In the latter, computational power of smart phones is limited and when defining an authentication system, the architect needs to decide if the number items to be checked is feasible on the portable device or if a remote server with the attached database is necessary. If local computations can be done, then the portable device needs again to synchronize the database periodically in order to assure that the products can be verified.

Image Compression

Once the microstructure has been digitized, the corresponding image has to be stored and will constitute the record set (typically accessed through database tools). The basic requirement is to obtain an image of the microstructures that contains a sufficient amount of details in order to enable a unique identification on an object with a statistically high enough confidentiality. The key element to assure a high reliability of the authentication system is the image size. The bigger the image the better detectability and statistical discrimination. However, the image size and number of images have of course a direct impact on the database size. As an example, if we assume gray scale images with a size of 1024 times 1024 pixels and a total number of 1 million images, the theoretical size of the database would be at least 1 Terabyte! This makes it clear that for large number of products, for instance when using the unique fingerprint approach, the way data is stored must be optimized. On the other hand, when we use for instance the macro or micro fingerprint approach for molded products, the number of images in the database corresponds to the number of molds, which is in general reasonably small.

Various lossless and lossy image compression schemes may be used to decrease the volume of the images in the database. For lossless compression, methods such as Run-length encoding (used in PCX, BMP, TGA, TIFF), Predictive coding (DPCM), entropy encoding, adaptive dictionary algorithms (LZW, used in GIF and TIFF), deflation (used in PNG, MNG, TIFF), and chain codes can be used. Lossless compressions methods have the advantage of preserving image quality. However, the achieved compression rates in lossless schemes are not very high. Lossy compression methods achieve much higher compression rates but have the drawback of introducing compression artifacts. Nevertheless, it is possible to use lossy compression schemes in the scope of the present inventions. Such lossy compression schemes include, but are not limited to color space reduction (palettes), chroma subsampling, transform coding (such as dicrete cosdine transforms used in JPEG, Fourier transforms, and wavelet transforms), and fractal compressions schemes. Even though lossy compression methods alter the image, experiments show that the presented image matching can be performed successfully even for high compression ratios (compression may be performed on both the reference and the tested image or only on the reference image). For instance, many experiments have shown that compression ratios of 50 to 100 can be applied using for instance compression scheme based on the DCT (Discrete Cosine Transform). Therefore, a 100 by 100 pixels grayscale image, which represents 10 kilobytes, can be compressed down to 0.1 kilobyte. For storing scans of 10 millions of items, hard disk capacity of 1 gigabyte is therefore sufficient (similarly 1000 by 1000 pixels images would require 100 gigabyte of space, which is really reasonable). The use of wavelet compression may also be useful, as it would benefit to the image retrieval task. Indeed the image retrieval can then be hierarchically performed on increasing wavelets frequencies of the images (thus speeding up the retrieval process for instance). Other information may also be stored in place or in complement of the scanned images. For instance, invariant features (image moments for example, statistical properties, etc), parameters related to contours, minutiae features or any other information able to speed up the retrieval process or increase the matching reliability.

Storing Multiresolution Images

In the case when multiresolution images have to be stored, it is possible to store them efficiently, in order to avoid storing redundant information. For example, if the correlation is done in the Fourier domain, it is interesting to store only the Fourier coefficients of the image as well as the ID. Since a scale in the spatial domain induces a crop in the Fourier domain, this property can be used to improve the efficiency of the storage. In fact it is possible to store only the coefficients of the highest resolution image, split across the different columns of the database so they can be accessed easily. The coefficients corresponding to those of the lowest resolution image can be stored in one column, then the remaining coefficients corresponding to the coefficients of the next resolution image minus the coefficients of the lowest resolution image in the next column, and so on. An example is given for storing Fourier transform of images in the paragraph concerning Decision Tree and in FIG. 49. Similar concepts are of course applicable to other scale-frequency transforms, such as the wavelet transform. In addition, a combination of a multiresolution transform with can also be used for data compression, such as wavelets, is a very elegant and effective optimization concept.

Database Efficiency

In addition to the type of information stored (Spatial data, Fourier data, Wavelet date, etc. . . . ) which has been described above, the software architecture used for storing data is also critical. Indeed it can impact in many ways the speed and the storage size. In order to increase the efficiency of database access, it can be partitioned either horizontally or vertically depending on the type of access. When inserting a huge number of rows in the database it can be noticed that the time for retrieval is not linear. This is because the database is becoming too large to be accessed in a reasonable time. Partitioning is better than making views because it is completely transparent to the user. Furthermore, as views are dynamic virtual tables, changing the data in the table alters the view and therefore induces an additional computation time. What's more, the view should be created by the user and is not part of the design of the database.

- Vertical partitioning consists in storing some columns of the table in a specific location and the other columns in another location. This is useful if some accesses are done to retrieve only part of the columns and other accesses to retrieve another part of the column. The columns that are often accessed together are stored at a same location.
- Horizontal partitioning consists in storing some rows of the table in a specific location and the other rows in another location. This is useful if only some parts of the rows are accessed together. For example "n" threads can access each a subset of the rows. The rows that are accessed together are stored in a same location.

The different partitions can be stored in the same file or in different files. They can also be stored on different hard drives. In fact, if there are too many concurrent accesses to the database, the maximum transfer bandwidth of the hard drive is reached. Therefore, using more hard drives can speed up the I/O operations.

Location of Snapshot

It should be noted that in the case of brand protection, it might be particularly interesting to exploit the microstructure of areas that are close to the logo (or any brand identification means). Indeed, parallel importers often try to destroy traceability information (like UV codes or datamatrix). They typically achieve this by scratching the surface or painting over the code. Surprisingly, doing so is often not illegal. However, altering the logo is illegal (moreover it clearly alters the product merchantability). Therefore, using microstructure of the logo or the underlying medium may help to protect from pirates alterations. Finally, the logo is a simple identifiable feature, which makes it convenient for inspecting purposes (in case the inspection process explicitly requires imaging a given area of an item). This idea is not limited to the logo and also applies to any trademark, copyright protected design or, more generally, to any design protected by the law, printed on packages or documents.

Use of Multiple Reference Images for the Same Item

In practice the image used for detection is never taken in exactly the same conditions as the image used for the reference ("template"). Sometimes it is even impossible to be close to original conditions, consider for instance the case of a circular disk with no marking, the operator has no indication on the rotation of the disk used to acquire the reference image. In order to facilitate the detection, it is possible to acquire several reference images in different conditions, thus increasing the tolerance to future deviations. For instance, reference images with different lighting conditions can be used. Likewise, it is also possible to register reference images at different relative positions. If we consider that the object position is defined by 6 values: the relative translation (x,y,z) and the relative orientation (alpha, beta, gamma), then it is possible to take n reference images for different values around a nominal position. In practice the SNR of the cross-correlation with the reference image will decrease as the position/rotation value differs from the nominal value v used for the reference image as shown in FIG. 58. It therefore makes sense to space the translation/orientation values of the reference images ideally in order to reach a cross-correlation SNR above a given threshold for the whole interval (v−x, v+x) for which a successful detection is expected. For instance we may use a reference image taken at 0 degrees of in-plane rotation and 2 additional ones taken at −1 degree and +1 degree. In the most general way, assuming n1, n2, . . . n6 different possible discrete values for each position variables, then n1*n2 . . . *n6 images should be taken in order to sample uniformly the 6 dimensional space defining the relative position of the imaging device and the object. In practice, the 2 translation values defining the position within the plane of the object are generally not critical (since the cross-correlation operation, performs by essence an automatic research in translation), 4 values remain critical, the distance to the object, the in-plane rotation (that is the rotation in the average plane of the sample surface), and the 2 tiling values. In order to acquire such images, a very specific method has to be used that ensures a sufficient level of accuracy. One solution consists in using sensors located on the acquisition device itself (possibly even already embedded inside, like those on some smartphones models), which then enables to determine the tiling, distance, etc. Another solution consists in using a dedicated mechanical system capable of precisely positioning the acquisition device. This device can operate on only one degree of freedom (like the rotation for the circular item example mentioned above) or can be designed to work with all degrees of freedom. The latter is particularly appropriate when the acquisition of the images (either for reference or for detection) is performed using a hand-held device. Indeed, it eases the authentication process by giving some tolerance to the positioning of the device, which is useful to ensure user-friendly operations and particularly critical when the system has to be used by non-expert operators (this is in particular the case when authentication is performed by the consumer himself, at the point of sell, prior to purchase for instance). An example of such a device is shown in FIG. 57. The in-plane rotation is (manually operated) controlled by 571, the X-Y in-plane position by 572, the vertical position by 577 and 576, and the two remaining rotation angles by 574 and 578 (rotation measured with sensor 579). The mobile device is put on 575. The system is defined to enable different angle/distance to be used while keeping the same area of interest in the field of view.

The approach of taking several reference images has however some drawbacks. In particular it requires a dedicated hardware and may be time consuming. In order to speed-up the process, a modified approach consists in generating new reference images by distorting a single (or few) reference image. Distortions will strive to realistically generate the reference images as if they had been actually taken. This includes in particular geometrical (but possibly also lighting) distortions (scale, stretch, perspective, rotation transformations). For instance, for a circular object (that is, an object featuring no visible feature and that would therefore prevent the operator to know how to rotate the object with the same angle as the reference image was taken), 4 reference images can be taken at 0, 90, 180 and 360 degrees and reference images for the intermediate angles can be synthetically generated by automatically interpolating between those images (in practice a step of 1 degree is generally appropriate). Yet another way to accelerate the process of taking multiple reference images consists in using a robotic device to automatically set the lighting/position and take the pictures. One example of such a device is shown in the Figures. This particular system is capable of performing multiple acquisitions with different in-plane rotation angles (FIG. 55). It is basically a robotic system that is put a document scanner (FIG. 56). A step-motor 552 controls the rotation of the sample, another step-motor 551 enables to lift the sample between two different rotations. A software application controls the motors and the document scanner. The latter is used to acquire a new picture each time the sample reaches a new angle. The sample itself is hold mechanically (553).

Different Acquisition Devices for Reference and for Detection

In order to further facilitate the acquisition of reference images, it may also be possible to use a different device for capturing reference images and for authenticating objects. For instance, a document scanner may be used for capturing images and a mobile phone may be used for authentication. Some processing may be needed in order to obtain resulting images as close as possible; despite that imaging devices are different. One particular approach consists in performing 3D shape reconstruction of the surface with both devices. Numerous algorithms exist for such problems, like those in particular known as "shape from shading" approaches. In this respect, it should be noted that a document scanner enables to acquire images with a specific light orientation (as defined by the light hardware embedded on the scanner head) and is therefore an excellent tool for such 3D reconstructions. It is of course possible acquire 2 or more images on a scanner in order obtain more precise shape.

Image Detection

General Strategy

The general strategy is depicted in the schema of FIG. 34. When the picture is taken it is very likely that it suffered geometrical alterations with respect to the original image. These alterations are due to position of the image capture device with respect to the object surface and may result in scaling, rotation, shift, shearing, and perspective aberrations. In the following we will focus on rotation and shift, however, the other alterations must also be addressed with different methods. Disregarding scale, shear, and perspective aberrations, when the picture is taken, its position and rotation in respect to the original image is not known. The new coordinates x' and y' have to be deduced from the translation vector, the angle of rotation and the old x and y coordinates. This is illustrated in FIG. 33. The rotation can be retrieved by a Fourier transform or by iterative steps. The rotation compensation strategy is explained in more details below. The location can be retrieved by a 1D projection for example. Then, masking (332) has to be computed, depending on the size of the field of view and on the size of the microstructures. After that all the pre-processing operations (333), such as flattening can be computed. Finally, the image matching (334) is performed. After image matching, a metric enables to decide that one or several images from the record set do actually match to a certain level. Ultimately, the number of images belonging to this matching set should be 1 (cardinality equal to singleton). Depending on the application, this image will identify a unique object (and any useful side information, typically by using a database access) or set of objects with common features. For instance, in the case of micro fingerprint applications, such common feature can be a mould identifier. Another example, for macro fingerprint applications, may be a genuine printed package.

Rotation Compensation

The rotation angle can be found if the picture includes some anisotropic visual information which is identical for all items. For instance, if there is a line across the picture, it will be possible to use this information in order to exactly find the rotation angle. Of course this line will be a drawback for cross-correlation purposes. That is why it is possible to take different pictures from the item to verify, even at different resolutions and with different fields of view. Each image can then be assigned to a specific operation. In practice it is possible to capture an image with a higher field of view of each template, with the picture containing the region of interest or not. Then the rotation angle of the template is retrieved. The same operation is applied to the snapshot image. The compensation angle is then defined by the difference between the two rotation angles. Transform domains may be used to aid the extraction and characterization of anisotropic information. For instance, the Hough transform or the Fourier transform may be used. In the case of the Fourier transform, the spatial anisotropy of the image or its microstructure (for instance introduced by brushing of the material surface) will result in a line in the modulus of the Fourier transform of this image. This is shown in FIG. 16. 161 shows the Fourier transform and 162 shows the angle, which is a radial sum of the value of the Fourier Transform related to each angle. One solution for finding the main anisotropic direction is to compute the following equation:

$$p(\theta) = \int_0^R I(r,\theta) \cdot dr$$

where I(r,theta) is the value of the modulus of the Fourier transform at the polar coordinates r and theta, I( ) the modulus of the Fourier transform, and p( ) is the value of the accumulated modules for a given angle (162).

This angle is actually determined with a 180° accuracy because of Fourier transform symmetry properties of real images. Moreover, the spatial anisotropy of the image may contain several main directions (for instance a square contains two main direction which are perpendicular) which results in different candidate angles. The right angle can be determined by testing each of the possible angles. When the spatial anisotropy contains only one main direction, this direction is perpendicular to the angle found by the sum over the axes. That is why, in FIG. 16, the sum is done over an angle a in 161 and the result is displayed for an angle "a+90". A testing procedure consists in cross-correlation with a reference image.

It should be noted that the image used for rotation detection (and the corresponding reference image) may be taken at a resolution (dpi) and at a location that is different from the image used to characterize the microstructure of a surface. Finally the angle value can be more precisely determined by a trial error procedure around the angle previously found. For instance, it is possible to iterate between −1 to +1 degrees by steps 0.1 degrees, computing the SNR for each angle, and keep the angle that results in the best SNR.

Once the rotation angle is known, it is easy to retrieve the location of the specific pattern to cross-correlate. In fact, it could be possible to store in the database the coordinates and size of the pattern relative to a certain angle. In FIG. 33, x and y are stored in the database. X' and y' can be retrieved easily once the displacement and rotation is known.

It is also possible to adopt a totally different strategy that avoids computing the rotation angle: the basic idea consists in taking a circular shape around a point of interest and unwarping to a rectangular shape. FIG. 43 describes this process. 431 is the circular donut around a point of interest that has to be cut. The cut is done in AB. A is the origin and B is the end of the new image. The circular shape is then mapped (or unwarped) on a rectangular (432) shape using standard image interpolation methods. Such image can be compared (for instance using cross-correlation) with a template image that has been generated using the same process. The location of cross-correlation peak will vary with the rotation angle, but the SNR value will not be affected. Therefore this technique enables to detect matching images without the need for a prior compensation in rotation. The technique can also be used using a 1-dimensional signal: in such case, the circular shape is a circle, along which the image is sampled.

Another possibility to avoid computing the rotation angle is to transform the (x,y) coordinates of the image into log-polar coordinates ($\xi$, $\eta$). The mapping is done as in Equation 1.

$$\xi = \log\sqrt{x^2 + y^2}$$
$$\eta = \arctan\left(\frac{y}{x}\right)$$

Equation 1

It must be noted that for the transformation into the log-polar domain the selected origin of the coordinate system is crucial and it must be exactly at the same position of the template and the image. This problem may be bypassed if the log-polar transformation is applied to the magnitude of the Fourier transform, a commonly used approach also often related to the Fourier-Mellin transform.

A more sophisticated log-polar approach to address the problem of geometrical transformations is as following. The detection of the presence of a fingerprint image F in the image G of an object by cross-correlating F with G may succeed only when several constraints are met. Essentially, the imaging conditions used for taking the two images must be exactly the same. These imaging conditions include:
(1) F and G must have the same scale
(2) F and G must have the same orientation
(3) The same point-of-interest must be used for F and G
(4) Both objects must be illuminated with the same source placed at the same location These strict imaging conditions would normally hinder the effective authentication of objects in the field. The method described hereafter enables cross-correlation detection of a fingerprint image F in the image G of an object when some or all the above constraints are not satisfied. Let G(x,y) be a grayscale image of the object and F(x,y) a grayscale image of a fingerprint. Let w and h be the height and width of both G and F. An authentication device checks G for the presence of F with the following steps:

(1) compute $F_x'$ and $F_y'$, the horizontal and the vertical gradient of F
(2) compute $G_x'$ and $G_y'$, the horizontal and the vertical gradient of G
(3) compute $F_{xy}'=F_x'+i\,F_y'$ and $G_{xy}'=G_x'+i\,G_y'$, where i is the square root of −1
(4) compute $F_2(x,y)$, the magnitude of the 2D Fourier transform of $F_{xy}'$
(5) compute $G_2(x,y)$, the magnitude of the 2D Fourier transform of $G_{xy}'$
(6) compute $P(\rho,\theta)$, the log-polar map of $F_2(x,y)$
(7) compute $Q(\rho,\theta)$, the log-polar map of $G_2(x,y)$
(8) compute $P_\rho'$ and $P_\theta'$, the radial and the angular gradient of P
(9) compute $Q_\rho'$ and $Q_\theta'$, the radial and the angular gradient of Q
(10) compute $P_{\rho\theta}'=P_\rho'+i\,P_\theta'$ and $Q_{\rho\theta}'=Q_\rho'+i\,Q_\theta'$, where i is the square root of −1
(11) compute $X_{PQ}$, the normalized cross-correlation of $P_{\rho\theta}'$ and $Q_{\rho\theta}'$ The maximum value of $X_{PQ}$ provides a measure of the presence of F in G. Thanks to the log-polar maps used in steps (6) and (7), this measure is independent of the relative scales and orientations of F and G. Thanks to the fact that $X_{PQ}$ is a cross-correlation of the magnitude of two Fourier transforms (steps (4) and (5)), this measure is not affected by misalignments of F and G. Thanks to the gradient operators used in steps (1) and (2), this measure is insensitive to the variations of the illumination that was used when the image G was taken.

Translation Compensation

Translation compensation is a critical operation in order to automatically perform the detection at the exact location where the reference image is located. A general approach to compensate for translation is to use an image that includes feature points or a known feature shape. The location of the region of interest, with respect to the feature or set of feature points is known. In practice, one approach is to acquire a low resolution image of the object, with higher field of view, such that both the region of interest and the feature points or shape are visible. This operation is done for each snapshot and for a set of templates. For the set of templates an image is captured and transformed into a mask. The mask will be unique for a whole set of objects. The snapshot image is then correlated with the template mask. The position of the cross-correlation peak enables to find exactly the X/Y position of the snapshot and therefore to determine the location of the region of interest that should be acquired at higher resolution with narrow field of view. When correlating at high resolution the position of the correlation peak indicates the translation vector. So a new image can be captured in the correct position in order to perform a matching of perfectly aligned pictures. This operation will drastically increase the SNR of the good match.

Preprocessing

Generalities

The cross-correlation is typically computed pre-processed images. As we have already seen, pre-processing is used for different purposes, such as removing disturbing elements in the image, extract the micro/macrostructure or just flatten images. In the following we will focus on image flattening, but please note that other pre-processing steps are as important as flattening. One way to perform flattening is to do a mathematical operation that consists in taking the difference between an image and its frequency low-passed version. The goal of this operation is to remove macroscopic color variations across the image and which are not significant, like lighting variations for instance. In particular, it enables to set all the borders of the image to the same value, which avoids border effects during a cross-correlation based on Fourier Transform (FFT based correlation implicitly tiles the image, artificially creating border effects between tiles if image is not uniform). This operation is necessary because in practice the captured picture is not a white noise. So the aim of the flattening is to make the captured image very like a white noise. In FIG. 35, the effect of flattening is shown. 351 and 353 are images that have not been flattened. 352 and 354 are the same images after flattening. In this example, the cross-correlations are computed with a template image that should match with the image 353 but that should not match with the image 351. The cross-correlations for each image are shown on the right side. It can be seen that the cross-correlation image 355 and 356 show no correlation peak, which is normal. The image 357 does not show a clear cross-correlation peak although the image should normally match with the template. The cross-correlation of the flattened image 358 shows a clear cross-correlation peak.

Different Methods for Flattening

The flattening can be done with several different methods. The first one is the absolute difference between an image and a low-passed version of it. It is described by Equation 2. B is the flattened image, A is the original image and f(A) is the low-passed image or any function of the image enabling to perform flattening.

$$B = |A - f(A)| \quad \text{Equation 2}$$

The second one is the subtraction between the image and a low-passed version of it. It is described by Equation 3.

$$B = A - f(A) \quad \text{Equation 3}$$

The third one is the blending of the image and the opposite of its low-passed version. It is described by Equation 4, where g(A) is the opposite of the image, typically if A is normalized, g(A)=1−A and α is the weight in [0,1] given to the image for the blending.

$$B = \alpha A + (1-\alpha)g(f(A)) \quad \text{Equation 4}$$

Any other method that helps to remove macroscopic color variation or that highlights the random noise of the image can be used. For example, the Fourier transform can be thresholded in order to correlate only some relevant coefficients. Another possibility is to perform spectrum whitening as explained below.

Alternatively the first or the second method gives better results. In fact, the subtraction gives better results when the device used to capture the image, such as a microscope, has a specular light. If the device, such as a digital scanner, has a diffuse light, then the absolute difference gives better results. Theoretically, the subtraction should give better results because it really models the difference between the two images. Even if no information is lost, the absolute difference reduces the dynamic range by two; therefore the results of the correlation are less good. This can be seen in FIG. 36. 361 has a better SNR than 362 because the flattening of 361 is done by subtraction whereas the flattening of 362 is done by absolute difference. Nevertheless, when the device has a non-specular light, an anti-correlation (as in 363) appears next to the correlation. This anti-correlation is so high that the SNR of the correlation decreases a lot. In this case if the absolute difference is computed, the anti-correlation is transformed into a correlation and the SNR is significantly increased (as in 364).

Different Spaces for Flattening

Some flattening methods imply the calculation of a low-passed version of the captured image. This low-pass is often performed by convolving a Gaussian filter with the captured image. A Gaussian filter is displayed in Equation 5. The size of the filter is 3σ×3σ. Its origin is in its center. The r in the formula below indicates at which radius of the center the current pixel is.

$$f(r) = \frac{1}{2\pi\sigma^2} e^{\frac{-r^2}{2\sigma^2}} \quad \text{Equation 5}$$

The Gaussian filtering can be performed in different mathematical spaces. Two examples of these spaces are the Spatial Domain and the Fourier Domain. It has to be noted that a cross-correlation in the Spatial Domain corresponds to a multiplication in the Fourier domain. If the image becomes large, the cross-correlation is less time consuming in the Fourier Domain than in the Spatial Domain. It is generally admitted that if a sequential process is used, the cross-correlation is more rapid in the Fourier domain if the size of the image is bigger than 21×21 pixels. Nevertheless the convolution in the Fourier Domain can lead to unexpected results. In fact, the image is repeated periodically in order to transform it in the Fourier Domain. If all the borders do not have the same value (which is generally the case and one of the main reason why flattening is needed), this will introduce discontinuities in the signal. That's why the result of the convolution can be different as what is expected. Some solutions can be used in order to smooth the discontinuities in the border of the signal. One of these solutions is padding of the original image even if the convolution is done in the Fourier domain.

Different Padding for Flattening

To perform the convolution between the captured image and the Gaussian filter it is necessary to pad the image. In the spatial domain, this is straight forward as it can be seen in FIG. 47. To insure all the pixels of the filter (471) are convolved with the image (472), it is necessary to pad the image. In the Fourier domain, the padding can reduce the discontinuities induced by the Fourier Transform. The padding can be performed with different approaches. FIG. 48 shows the utility of padding. The filter (481) can be convolved with the image (483) and all the pixels of the filter can be used because the image is padded (482).

Figure 38:
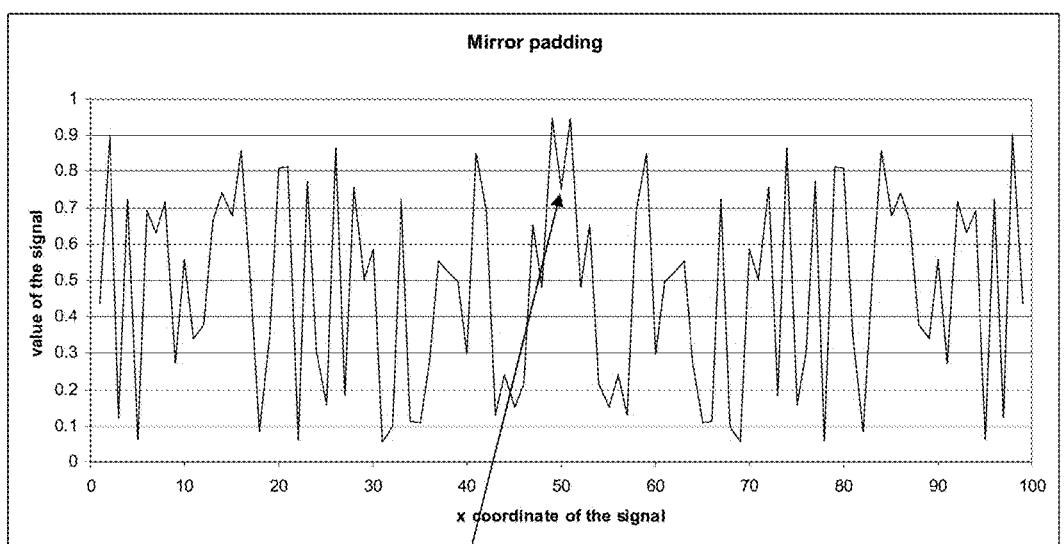

Zero padding is the simplest padding. It consists in adding zeros on the whole surface that should be padded. This is not very efficient because it induces border effects. The performance can be improved if the Periodic padding consists in repeating the image horizontally and vertically. This has less border effects than zero padding. FIG. 37 shows an example of periodic padding of a 1D signal. 371 shows the discontinuity of the signal Mirror padding consists in repeating the flipped image horizontally and vertically. This has very few border effects. FIG. 38 shows an example of mirror padding of a 1D signal. 381 shows the slight discontinuity of the signal.

A special padding consisting in mirroring the signal, then inverting it and finally shifting it so that the first value of the padded part is the same than the last value of the non-padded part. FIG. 39 shows an example of Flip Flat padding for a 1D signal. 391 shows that there is no discontinuity in the signal.

Adjusting the Sigma and Radius for the Flattening Filter

If a Gaussian filter is chosen, its size can be fixed to 3σ×3σ. In fact the width of the Gaussian depends on the sigma. If the size of the filter is 3σ×3σ, then the values in the borders of the filter are close to zero. There is therefore no need to take a bigger size.

The sigma should be chosen carefully in order to give the best results. The sigma should be adapted automatically because pictures of different items can have different microstructures of different sizes. Furthermore the material properties can induce different lighting distortions. Therefore, the sigma needed for flattening could be different from one type of item to the other. It is then necessary, for industrializations purposes to have an automatic way to optimize the sigma. There are several possibilities listed below to optimize it.

One possibility is to flatten the image with a given sigma and perform its auto-correlation to compute the SNR. When the obtained SNR is maximal, it can be said that the sigma is optimal. This optimum can be found by any optimization method such as the dichotomy method.

Another possibility is to analyze the Fourier spectrum of the flattened image. When the spectrum is the most next to white noise spectrum, the sigma is optimal.

Masking of macroscopic details can also be done. This is explained extensively below.

Other Approaches

The above flattening methods provide only a succinct overview of possible approaches. In general all linear or non-linear filter methods and image processing concepts that on one side enhance the desired surface structure and remove unwanted elements are of used. Such processing methods may include, but is not limited to, the use of one or a combination of the following methods: local/global Histogram Equalization, different low-pass/high-pass filters, averaging, median filtering, Gaussian filters, Laplace filters, contrast enhancements, gamma corrections, color clipping, band-pass filters, fractal filters, non-linear histogram stretching, morphological filters, edge filtering, watershed filters, scratch and noise removal, sharpening, Sobel filters, moment based filters, etc.

Masking

Motivation

If the field of view has a size that implies that some macroscopic details are visible, they should be masked. In fact macroscopic details often induce a macroscopic correlation which can imply a false positive detection as they result in an important contribution in the correlation metric. The importance of masking disturbing elements is shown in FIG. 41. It is shown that, without masking, the cross-correlation (414) of a template (411) and another picture of the same item (412) is not better than the cross-correlation (415) of the template (411) with a picture of another item (413). Even worse, the cross-correlation (415) of the template (411) and the picture of the other item (413) has a good peak because of macroscopic cross-correlation. This kind of mismatching is a false-positive detection that must be absolutely avoided. Several methods exist to address this problem, such as substituting the disturbing element by the mean value.

Masking Fixed Locations

One possibility to do the masking is to put all the values that have not to be taken into account to a fixed value which can be either the mean value of the image, or a value, which will not change the mean value of the image, or even noise. In FIG. 41, the padding is done with the mean value of the pixels that are not cancelled by masking. When the template padded (416) is cross-correlated with another picture of the same item padded (417), the peak of cross-correlation (419) is visible. When the template padded (416) is cross-correlated with a picture of another item (418), there is no more peak (4110) of cross-correlation. This example illustrates how a masking approach can help to avoid false-positive detection and also improve the detection rate. Such mask may be recorded in the database.

Masking with Smooth Borders

This approach may be insufficient in some cases. For example the padded area can induce borders that will highlight the macroscopic correlation. In FIG. 42, 421 and 422 are not well padded. Therefore 423 is a false positive. If this is the case, it is possible to pad every pixel that is below a certain threshold b or above another threshold a in addition to the previous padding. This padding has to be done with the same value m used for the previous padding.

$$v(x,y)>a => v(x,y)=m$$

$$v(x,y)<b => v(x,y)=m \quad \text{Equation 6}$$

This has the effect to smooth the borders of the padded area as for 424, 425, 427 and 428. Furthermore, two successive snapshots can have slightly different areas that are padded. With this kind of padding the true negative (426) can be differentiated from the true positive (429) and there is no more problem of fake positives.

Normalizing to Decrease Improve Masking Performance

When masking the images to be correlated in order to decrease the correlation impact of non-desired elements, the quality of the correlation image can further be enhanced by normalizing it. The normalization is based cross-correlation between the two binary masks of the image, we call this normalization-mask. The cross-correlation is then normalized by the normalization-mask by dividing each coefficient of the cross-correlation with the corresponding normalization-mask.

Overview of Matching Algorithms

The image matching purpose is to define a metric which enables to decide if two images are similar. A perfect similarity can be characterized by a null Mean Square Error between two images and a matching metric will typically converge to a known value in this case. Image matching can be performed using cross-correlation or matching in transform domains (Hough or Fourier spaces for instance) possibly enhanced by log-polar transforms in order to be invariant with scale or rotation. It is also possible to use spatially transform domain in order to map the image in a way that is more efficient for matching purposes. For instance, it is possible to compute a 1D profile corresponding to the sum of color intensity along each line and use such 1D function in conjunction with 1D signal matching algorithms for fast retrieval (possibly refined with a vertical profile). Another spatially transform domain was shown in previous section and illustrated in FIG. 32. The so-called "minutiae" approach used in fingerprint matching can also be used. Its principle is to use only a limited number of localized feature points instead of using the whole image.

In the case where microstructure of printed area is used (like in FIG. 13), it is also possible to use matching techniques based on contours of the printed shape. State of the art contour matching techniques may then be used as for instance Fourier descriptors or 1D cross-correlation (the contour being converted to a 1D signal).

Artificial neural networks may also be used in order to perform the image matching or the contour matching operation. More generally, let the image be described by a given set of parameters. Any classifier may be used to find the best match in a database. The choice of the best classifier will depend on the computational requirements, the image statistics, etc. In order to help the image matching operation, the knowledge of the original design may also be used. For instance FIG. 13 corresponds to a letter which orientation, scale and spatial position on the item to verify is known. Therefore an automatic scanning system may be able to locate this letter with a low-resolution scan, then rescan the letter with a high resolution and finally compensate for the rotation.

Matching by Cross-Correlation

2D Cross-Correlation

The cross-correlation is particularly suitable for matching images which contain noise. Indeed, it can be used basically for any kind of uniform noise without special tuning or adaptations.

The formula is shown in Equation 7, where A and B are the two correlated images and x and y the position of the result of the sum in the correlation picture φ.

$$\varphi_{A,B}(x, y) = \sum_{x'=-\infty}^{\infty} \sum_{y'=-\infty}^{\infty} A(x', y')B(x' + x, y' + y) \quad \text{Equation 7}$$

This correlation can be computed in the Spatial domain or in the Fourier domain. In the Fourier domain, the correlation is represented by a multiplication as displayed in Equation 8, where $\Im$ is the Fourier transform.

$$\varphi = \Im^{-1}(\Im(A)\Im(B^*)) \quad \text{Equation 8}$$

Other Types of Correlations

It should be noted that several variations of cross-correlations exist which can also perform efficiently in the case of microstructure. They are listed below.

Phase correlation. If only the phase has to be correlated, both images should be transformed in the Fourier domain. Then the first image is multiplied with the complex conjugate of the second image and divided by the modulus of the first image multiplied with the complex conjugate of the second image. Finally, the resulting Fourier image is retransformed into the spatial domain. This is explained by Equation 9

$$\varphi = \Im^{-1}\left(\frac{\Im(A)*\Im(B)'}{|\Im(B)*\Im(B)'|}\right) \quad \text{Equation 9}$$

Cross-correlation with special padding strategy. Indeed, in the formula from Equation 7, the indices x'+x or y'+y may exceed the image size in the finite case and a strategy has to be followed to define which values should be used in such cases. Some of these strategies include padding the image with values varying symmetrically or anti-symmetrically (left/right and up/down) across their borders, or padding with a fixed value (the mean value for instance).

Cross-correlation by 1D projection. Instead of correlating the whole 2D picture, it can be projected on one or the other axis, for example by making the mean of the coefficients of each column or the mean of the coefficients of each row. Any other projection method is also possible. The cross-correlation of 1D signals is much more rapid than the cross correlation of 2D signals, especially when the image becomes huge. Nevertheless it is also less robust.

Cross-correlation of chosen coefficients. When correlating the images in the Fourier domain, it is possible to choose the coefficients which are relevant for the cross-correlation. Typically the coefficients which have mathematical characteristics close to white noise can be chosen. Furthermore, if an image contains an auto-correlating pattern, such as a grid or a brushing, the frequencies corresponding to the auto-correlation can be discarded. This induces a speed up as a fewer number of coefficients are correlated.

Filtered cross-correlation in the Fourier domain. If an image contains an auto-correlation pattern, it is possible to filter the Fourier transform of this cross-correlation to remove the repetitive pattern.

Matching Quality

A measure representing the matching quality between 2 normalized images can be defined with Equation 10, where M is the maximum of the signal and μ its mean.

$$SNR = 20*\log(M/\mu) \quad \text{Equation 10}$$

If the images are not normalized, the matching metric should normalize them as in Equation 11, where m is the minimum of the image $$SNR = 20*\log\left(\frac{(M-m)}{(\mu-m)}\right) \quad \text{Equation 11}$$

This value characterizes the signal to noise ratio (SNR) of the cross-correlation image and is measured in decibels (dB). When several cross-correlations are computed (using several images of the same area or from different areas), the SNR can be very significantly increased by the multiplication of two cross-correlations aligned on their peaks. It is also possible to take morphological criteria into account, such as opening and closing operations on the cross-correlation image.

A different metric is based on the variance and takes the form of $$SNR = 20*\log\left(\frac{(M-m)}{\sigma+\alpha}\right) \quad \text{Equation 12}$$

Where M is the maximum of the signal, μ the mean, σ the variance and α a corrective parameter to control the SNR behavior.

Before calculating the SNR of a given signal, it may also be useful to adapt the cross-correlation image, for instance by:

Replacing values below the mean by the mean
Replacing values below the mean by 0
Mirroring values below the mean on the mean axis In certain cases these manipulations increase overall system performance and decrease sensitivity to parasite signals.

Yet another metric consists in consists in computing the ratio between cross-correlation peaks. In the most simple implementation we consider the values φ(x1,y1) and φ(x2, y2) corresponding respectively to the maximum correlation value over (x,y) cross-correlation image and the second maximum correlation value. The fundamental concept behind this approach is that:

For a noisy cross-correlation, thus corresponding to a negative correlation (therefore no match between cross-correlated images), we will have a first peak φ(x1,y1) and a second peak φ(x2,y2) of similar value.

For a positive cross-correlation, there will be a significant difference between those values.

$$SNR = 20 * \log\left(\frac{\varphi(x1, y1)}{\varphi(x2, y2)}\right) \quad \text{Equation 13}$$

This approach is of course not limited to a ratio between the maximum peaks. An arbitrary number of peaks can be used for this computation, and the computation itself may not only be based on a simple ratio but rather any function or algorithm that matches the fundamental concept described above. In all cases, a correct definition has to be used for the peak. One simple approach consists in defining a peak as a cross-correlation value such that its 4 or 8 neighbors have lower values. This definition is not restrictive but can of course be generalized to an arbitrary number of neighbors, possibly weighting neighbors by their distance to the peak (thus enabling the possibility to have two neighboring peaks).

Robustness

In order to avoid false positives, the matching algorithm has to be robust against some modifications of the item. When a big enough dpi is chosen, the image captured can contain a sufficiently big amount of information so that the matching algorithm is robust against slight modifications. In particular, in the case of watches, the dpi should be big enough to permit to be robust against adding adhesive or static layer, adding dust, damaging by scratching and all other damage that let up to half of the information. It also has to be noticed experimentally that this method is robust throughout glasses, even watch glass, flat or convex, with or without anti-reflective coating on it. It is also robust against x-y displacement. An offset of 50% still permit to recognize the item. These considerations are true for the particular case of watches but can be applied to any item, which is recognized using the Fingerprint technology.

Speed Up of the Technology

Decision Tree

A possibility to speed up the detection process is to perform the matching for image of smaller size to make a first step and then matching smaller sets of bigger images. For instance if the image size is 1024×1024 and if there are 10,000,000 items in the database, performing all cross-correlations with all templates may take a significant amount of time (up to 1 hour in some cases). A detection strategy consists in performing the detection in several stages.

There are different possibilities to obtain a set of smaller images. It is possible to use cropped versions of the templates, quantized versions of the templates or downsampled versions of the templates. Downsampling is preferred instead of cropping. First, downsampling is more resistant in case of dust or other small variations on the image; second, as the positioning is very precise, cropping can lead to the image and template to be completely misaligned. This will not be the case with downsampling. A first stage is performed with downsampled versions of the snapshot and template images and then the next stage use larger versions of the snapshots and templates. This approach is illustrated by diagram of FIG. 40: cross-correlations are first computed with a set $S_0$ of $X_0$ templates using an image size of $2^n \times 2^n$ pixels (the same method may of course be used for non square images or non integer power of 2 image sizes). A number $X_{12}$ of cross-correlation images have an SNR over a given threshold $t_1$ and are then selected as candidates for a second test with larger image of size $2^{n+1} \times 2^{n+1}$. The same procedure continues with threshold $t_2$ and with increasing image sizes and thresholds until the original image of size $2^{n+x} + 2^{n+x}$ is reached resulting in one unique candidate $X_{x2}=1$ which corresponds to the snapshot. Such strategy is not limited to the case of cross-correlation and can potentially be applied with any matching metric.

A practical example is given in order to illustrate this process. In an experiment n=3 and x=10 were used for cross-correlations of $X_0=10,000,000$ templates with a test image. The following number of candidates was then obtained: $X_{12}=112539$, $X_{22}=1234$, $X_{32}=2$, $X_{42}=1$, $X_{52}=1$.

Depending on noise characteristics, downsampling down to 8×8 images size can easily be reached.

If the correlation is done in the Fourier domain, the coefficients can be stored in a database in an efficient way. It is generally admitted that downsampling an image in the spatial domain will result in a crop in the Fourier domain. Therefore only the coefficients of set $S_x$ are stored in the database. Then for the matching of sets $S_0$ to $S_{x-1}$, only some of the coefficients are retrieved from the database. To be accessed efficiently they are split between the different columns. The coefficients for the $2^n \times 2^n$ images can be stored in one column. Then, instead of storing all the coefficients of the $2^{n+1} \times 2^{n+1}$ images, only the remaining ones up to this size can be stored in the next column. The coefficients that are stored in each column 491 of the database table 493 are represented by the black area on FIG. 49. The figure shows that column 1 has only one coefficient (the average value of the image), the column 2 has the 3 following coefficients, the column 3 has 12 coefficients, etc. . . . This approach enables to optimize the required bandwidth for transferring data (492) from the database on the hard disk to the CPU. In fact, all the coefficients of set $S_0$ are transferred but then only the remaining coefficients from the relevant rows are transferred. A new line 494 is allocated in the database for each template image. Furthermore the multiplied coefficients of the relevant correlations can be stored in order to avoid redundant multiplications. In fact only the coefficients that are displayed in black should be correlated.

Bayesian Network

A speed up can also be obtained by using a theory based on Bayes probabilities. The notations are the same as those of FIG. 40. Let P(G) be the probability that an item is genuine. For a set $S_i$ of cross-correlation, if the SNR is above the given threshold $t_{i+1}$, then the probability for the image to be already recorded is denoted a. This is modeled by Equation 14.

$$P(G|SNR_i > t_{i+1}) = a$$

$i=0, \ldots, x-1$ \quad Equation 14

It can be stated that if the SNR is some fraction lambda between $t_{i+1}$ and $t_{i+2}$, then the probability for the image to be already recorded is b and b>a. This is modeled by Equation 15.

$$P(G|SNR_i > t_{i+1} + \lambda(t_{i+2} - t_{i+1})) = b$$

$$b > a,$$

$$i = 0, \ldots, x-1$$

$$\lambda \in [0,1] \qquad \text{Equation 15}$$

All the following assumptions are formulated:

The higher the SNR of a cross-correlation of images of a given size, the higher the SNR of the cross-correlation of images of bigger sizes and the higher the probability of the image to be a recorded one. This is explained by Equation 16.

$$P(G|SNR_i > t_{i+1}) = a \Rightarrow P(G|SNR_{i+j} > t_{i+j}) = b \Rightarrow P(G) = c$$

$$i = 0, \ldots, x-1$$

$$j > 0 | i+j \leq x$$

$$0 \leq a \leq b \leq c \leq 1 \qquad \text{Equation 16}$$

For a given set of cross-correlation, if the SNR is under a given threshold, then the probability for the image to be already recorded is 0. This is modeled by Equation 17

$$P(G|SNR_i < t_{i+1}) = 0$$

$$i = 0, \ldots, x-1 \qquad \text{Equation 17}$$

For the cross-correlation from $S_x$, if the SNR is above the predefined threshold, then the probability for the image to be already recorded is 1.

$$P(G|SNR_x > t_{x+1}) = 1 \qquad \text{Equation 18}$$

The speed up can be obtained the following way. First all the items of set $S_0$ are correlated together. For each item, if the probability to be genuine is below a, the item is discarded. If it is between a and b, it is put in a set of possible match to be correlated in $S_1$ as for the decision tree algorithm. If the probability to be genuine is more than b, then the picture is directly correlated at higher sizes up to size $2^{n+x} + 2^{n+x}$. If it is the good match, the algorithm stops. Else it continues to correlate templates of set $S_0$, until all have been correlated. Then if the match is still not found the same algorithm is applied for the following sets $S_1$ up to $S_x$.

Best Rank

This method is a hybrid one between Decision tree and Bayes networks. The notations are those of FIG. 40. Experimental results show that, for a given set of templates, the SNR obtained with low resolution images (typically those of set $S_0$) may significantly differ between imaged items. Furthermore, the rank of the good match is not inevitably the first.

Nevertheless, the rank has a smaller variation than the SNR. Experimentally it has been tested to be always in the 5% first. So it can be assumed that if the rank for a given size of one template is good, there is a higher chance of a match.

So sets can be created by taking into account the templates with highest ranks. FIG. 50 is useful to understand this theory. The following notations are used:

x is the number of sets, as shown in FIG. 40, p is the current set used for cross-correlation.

i is the current iteration $C'_{ixp}$ is the number of templates to take at iteration i from set p, for the next set p+1.

The $C'_{ixp}$ best templates are taken at each step. In fact as some of the best templates have already been correlated during the preceding iteration, there is no need to correlate them again. $C_{ixp}$ is bigger for smaller size images than for the bigger ones. If after one iteration, the good match is not found, all the $C_{ixp}$ are increased until the good match is found or until a decision is taken that the image is not in the database. As the size of the image has a geometrical growth, the set of remaining templates at each set should also follow a geometric law. The idea is to have an increasing common ratio for the geometric progression. Two things are important with this method: the stop criterion as well as the increasing law of the common ratio of the geometrical progression. A geometrical law can be chosen to increase the common ratio of the geometrical progression. The stop criterion is chosen so that the application stops before correlating all the templates with a size of $2^{n+1} \times 2^{n+1}$. In fact it is assumed that, if all the templates of size $2^{n+1} \times 2^{n+1}$ are correlated, there was no need to use the templates of size $2^n \times 2^n$. More precisely the $C_{ixp}$ are computed as in Equation 19 until i<j. The first line computes the number of templates to take at each step. It corresponds to the number of templates as computed in the second line minus the templates that have already been taken in the preceding iterations. The second line computes the geometrical progression with a common ratio of a. The power corresponds to the iteration number (i) as well as the number of set (x) and the current size (p). The third line simply formulates that at the first iteration no templates have already been correlated, therefore the number computed by the second line should be taken into account. The fourth line represents the stop criterion. It tells that the algorithm should stop if $S_1 \geq S_0$.

$$C'_{ixp} = C_{ixp} - C_{(i-1)xp}$$

$$C'_{ixp} = a^{i(x-p)}$$

$$C'_{0xp} = C_{0xp}$$

$$i = 0, \ldots, j, j | C_{jx1} \leq \text{Card}(S_0) \qquad \text{Equation 19}$$

For example if a=2 and x=5, the following number of templates $C_{ixp}$ should be taken at each step. Each row is representing an iteration i. The columns represent index of the set of images. It should be remarked that the last column always contains only one template, as only one match can be found. In the first row, at 1=0, only the best template is correlated. In the next row, at i=1, 32 templates from $S_0$ are taken to correlate in set $S_1$. It can be remarked that the number of template taken from $S_0$ is growing rapidly. The coverage of the database can be seen in FIG. 50.

TABLE 1

| | p | | | | | |
|---|---|---|---|---|---|---|
| i | 0 | 1 | 2 | 3 | 4 | 5 |
| 0 | 1 | 1 | 1 | 1 | 1 | 1 |
| 1 | 32 | 16 | 8 | 4 | 2 | 1 |
| 2 | 1'024 | 256 | 64 | 16 | 4 | 1 |
| 3 | 32'768 | 4'096 | 512 | 64 | 8 | 1 |
| 4 | 1'048'576 | 65'536 | 4'096 | 256 | 16 | 1 |

Neighbors Classifiers

This theory is based on the transitivity of the correlation. It is true that if an image A correlates completely with an image B and if the image B correlates completely with an image C, then A correlates completely with C. But, if an image A doesn't correlate with an image B and if the image B doesn't correlate with an image C, then nothing can be told about the correlation of A and C. The question is then if A correlates to some degree with B and B correlates to some degree with C, what can be told about the correlation of A and C? It can be assumed that the highest the degree of correlation of A and B and of B and C, the highest the probability that A and C also correlate. Therefore, the goal is to compute subset of templates that are well correlating together. Then, for the images of group $S_0$ from FIG. 40 instead of correlating the snapshot with all the templates, it is correlated only with the representative of its group. Then a certain number of groups are chosen and the best rank method is used for the other set of images; for $S_1$ up to $S_x$ of FIG. 40.

Real-Time Performance by Reduction of Number of Reference Images

In the case of interactive detection (see below), a real-time detection performance is required. Such scenario requires optimizing drastically the detection operation, particularly if the computation is performed on a mobile device. One approach that is appropriate for molded items consists in indicating to the system the cavity identifier (typically engraved on the plastic item). This enables to reduce the number of reference images used to a single one. In practice some additional reference images may still be required (see Interactive positioning paragraph) in order to ease the detection process, but all will be for the selected cavity mold (or set of cavity molds in some cases). One interesting option consists in actually automatically recognizing the mould identifier. Ideally, the image can be captured and processed by the same device used for the fingerprint image. In the best case, the area of interest may be chosen close enough to the cavity identifier so that one single image is sufficient to perform both cavity identification and authentication. The retrieval of the cavity identifier (as a numerical value) from a picture of the engraved/printed identifier can be performed using state of the art processing method, like in particular those used for Optical Character Recognition (OCR). If the imaging device features an illumination system (typically a flash), then it may also be possible to capture 2 images of the same area of interest with illumination on and off. The use of those images may ease fingerprint detection and cavity identification. In particular, the lack of specular reflections for a picture without flash makes it easier to apply OCR technique (while the use of the flash is generally recommended to enhance the visibility of the details of the fingerprint image). It should be noted that this speed enhancement technique is not limited to identification using cavity Id but may be detected by various other mean than a numerical identifier. Basically, any information which can be retrieved at the moment of authentication to identify the cavity is appropriate (barcode, visible features specific to a cavity, etc).

Robustness

Noise

Noise Evaluation

Some additional noise can induce a common pattern between all the captured images. Therefore the correlation of the noise can induce a fake positive. The noise of the camera is composed of different noises: the thermal noise and the CCD sensor noise. The thermal noise is not a problem in the present case because it is random and changes at each image capture. The sensor's noise is induced by the difference of light response of each pixel of the CCD sensor. Moreover, dust can be present directly on the CCD sensor or on one of the mirrors or lens of the optical way of light. This noise is a constant and that's why it should be removed. It is quite difficult to characterize. Nevertheless, it is quite easy to approach by doing the mean of some captured images.

Noise Removal

Different methods can be used to remove the noise. They are listed below.

If it is on an identified location, it can be padded either with the mean value of the image or with a random noise at the mean value of the image.

If the noise is spread out everywhere on the image and cannot be localized, removing the correlation induced by the noise instead of the noise itself can be a very good compromise. FIG. 44 shows one possibility of removing the correlation due to the noise of the camera. 441 shows the normalized noise correlation and 442 is the normalized correlation between the snapshot and its corresponding template. It can be seen that there are two peaks of correlation; the sharp centered one (445) is due to the noise and has a value of $\lambda$. The other one is the real peak. The mean of the correlation is $\mu$ (446). 443 represent the noise correlation, which is stretched in order to correspond to the noise in the correlation between the snapshot and the template. It has the same mean $\mu$ (448) and the same value for the peak due to the noise $\lambda$ (447). 444 is the normalized subtraction from the correlation between the snapshot and the template. The stretching is obtained by the formula of Equation 20, assuming that $\mu$ is the mean of 442 and $\lambda$ is the value of the noise correlation in 442.

$$sv = \frac{v-m}{M-m}(\lambda - \mu) + \lambda \qquad \text{Equation 20}$$

In cases where the noise induced by the imaging sensor, such as CCD or CMOS, creates a stronger cross-correlation response that the surface structure of the object under investigation the most straight strategy to solve the problem consists in reserving one image sensor for template acquisition and a set of different sensors for image detection.

In the event where product detection is performed through the analysis of a video stream, for instance when authenticating products using a smart phone, noise reduction can be performed through the combined analysis of multiple video frames. Said combinations can be based on averaging over time of single frame detection with a combination of the detection results of each frame. More elaborate strategies may of course be considered, such as requiring subsequent detections on the frames, with the constraint that the use must have slightly moved the detection device during authentication (for instance by analyzing the input from accelerometers).

A combination of snapshots take with and without flash light may also be useful in decreasing parasite noise.

Spectrum Whitening

Sometimes, it can be difficult to find a homogenous zone and the correlation can reveal macroscopic details instead of microscopic ones. So the Spectrum of the Fourier transform can be whitened in order to remove macroscopic details. There are several approaches to whiten signals, which are listed below.

Official whitening. The usual way of whitening a signal is described by Equation 21. In this equation, x is the signal, μ is the mean of x, Δ is the diagonal matrix of eigenvalues of the covariance matrix of x, E is the orthogonal matrix of eigenvectors of the covariance matrix of x and w is the resulting whitened signal $$w=\Delta^{-1/2}E^T(x-\mu)$$ Equation 21

Removing some Fourier coefficients. In order to whiten the spectrum, some coefficients of the Fourier transform of the signal can be discarded.

Any other method to whiten the spectrum can be used.

Rotation and Scale Compensation

Some imaging devices, such as a mobile phone, do not enable to reposition the item in the same orientation than the template. Furthermore a scale factor can distinguish the image from the template. It is then possible to store multiple templates with different scale factors and different rotation angles. For downsampled images, such as templates from set $S_0$, if the images have different angles or scale factor, the Fourier transform is quite the same. On the contrary for set $S_x$, if the images have different angles or scale factors, the difference between images is big. Therefore the idea is to have an increasing number of templates at each size of images as in FIG. 52. It shows the tree representing the different scale factors or rotation factors for an item. 521 shows that at low resolution, the templates with different scale factors have the same Fourier transform. Then, when the resolution increases, the different scale factors become distinct. At high resolution (522), there is one Fourier transform per scale factor. This approach is also true for changes in rotation factor. If a hierarchical approach is used to retrieve the good match, this will improve the robustness with only a marginal speed decrease because cardinal of set $S_0$ (whose correlations with acquired image accounts for most of the computation time) is simply unchanged.

Finally, it should be noted that the applications of above described tree approach is not limited to rotation or scale compensation. This approach can be used to any compensate or progressively refine many image parameters which are critical to the cross-correlation process. For instance, such approach can also be used at translation level. In this case, a first correlation is performed with a cropped version of the imaged object and the size of the crop size is progressively increased in order to refine the SNR. The tree refinement strategy shown in FIG. 52 can also be used in this case if following modifications are done:

The cropping operations are performed by sub-sampling the Fourier images of each tree node (for instance by keeping only even or odd coefficients).

Crop location at a given level in the tree is given by the position of the cross-correlation peak at the previous level (i.e. at the lower resolution).

Interactive Positioning

In the case of manually handled imaging device (in the following we indifferently use the word of mobile phone, mobile device, hand-held device or smartphone) the device may display an overlay showing the contours (or any noticeable feature that can easily noticed by the operator) of the product to be imaged in order to aid the operator to position precisely the imaging device. This approach insures that rotation, translation, scaling, tilting, translation, etc are within some margins. This technique can further be enhanced when the mobile device features a flash. Indeed, the location of the spot corresponding to the reflection of the flash on the product surface gives an indication of the relative tilting angle between the product and the mobile device. It is therefore possible to overlay a graphic over the real-time video shown on the mobile home in order to indicate to the operator where the spot should be, leaving to the operator the task to ensure a relative tilting (and possibly also translate, change distance to object, etc) in order to reach that objective. This approach can also be partially automated by letting the device compute the location of the light spot and giving indications to the operator, based on where the light spot should ideally be. For instance, it can tell "Device tilt is not correct" or even display an arrow indicating in which direction the device should be tilted (or any other orientation). Detection of the spot (and therefore its location) can typically be performed using the color information (specular reflection of the spot often leads to saturated luminance value for instance) or the shape (circular). Tilt detection can also be identified using on-device accelerometers. A possible strategy consists in having the user lay the mobile device onto the product under investigation. The application running on the device detects this and memorized the relative position in space. The user then pulls the phone back in order to have the snapshot image taken. The accelerometers can then be used to determine if the user has tilted the device while pulling it back. This information can then be used for corrective actions.

Interactive Detection

The basic concept described throughout this invention is a system that provides a positive or negative conclusion whether the observed image matches a reference image. However, this approach is sometimes not appropriate. For instance, consider the case of authentication using a mobile phone. In practice an operator may have an object in hand that features the exact micro-structure of the reference image but still have a negative detection because the image is not focused, light is too low, orientation of the mobile phone is not correct, etc. In practice, the immediate consequence would be that the system will wrongly conclude that the object is a counterfeit (false negative) because it failed to match the taken image with stored reference image. In order to circumvent this problem, it is possible to use a real-time (i.e. several images per second, typically capturing the frames from the video buffer of the device) analysis of the taken images and alert the operator only when a positive match has been found, thus avoiding definitely any false-negative occurrence. As a result, such system does not explicitly delivers a "fake detected" message, but will rather let the operator conclude by himself that if he fails to successfully detect despite trying for some reasonable period of time (say 30 seconds) then it is likely to be a fake. It should be noted that, the system can itself feature a timer that automatically displays a "fake" message after some given amount of time has elapsed.

Other Techniques Increasing Robustness

The robustness can be increased by several other methods listed below.

Rotation may be compensated by using cross-correlation in the Fourier domain 532 of a 1D signal. Such signal is obtained by sampling the Fourier modulus over a circle 531, on both the template and acquired image as shown in FIG. 53. The cross-correlation position indicates the angle of rotation.

The SNR of the good match can be increased by correlating the mean of a set of snapshots of the same item with the template.

It can also be increased by correlating a set of snapshots of the same item with the templates and then align them on their correlation peak and then averaging them.

Any other method enabling to highlight the microscopic structures is considered as a robustness improvement of the technology.

The invention claimed is:

1. A method of authenticating an article of manufacture, the surface of the article of manufacture featuring predetermined, reproducible macroscopic characteristics as well as random or pseudo-random, non-reproducible microstructure noise characteristics, the random or pseudo-random, non-reproducible microscopic noise characteristics rendering the article physically unique, the method comprising:

acquiring an image of the visible feature using a predetermined imaging technology to produce a visible feature image with an imaging lighting orientation and an imaging resolution sufficient to show a least one article surface microstructure feature at the pixel level;

generating an authentication pattern based on the visible feature image;

querying, with the imaging device, for a reference product item, a reference authentication pattern in a predetermined central server database;

receiving from the predetermined central server a reference authentication pattern;

comparing, with the imaging device, the authentication pattern with the received reference authentication pattern; and authenticating, with the imaging device, the article of manufacture if the authentication pattern correlates with the reference authentication pattern within a predefined pattern matching threshold.

2. The method according to claim 1, wherein the predetermined, reproducible macroscopic characteristics comprise the size, the shape or the colors of a graphic design.

3. The method according to claim 2, wherein the graphic design size renders the graphic design discernible to a naked eye.

4. The method according to claim 2, wherein the graphic design size renders the graphic design discernible only under magnification.

5. The method according to claim 2, wherein the graphic design displays a serial number on the article surface.

6. The method according to claim 2, wherein the graphic design displays a barcode on the article surface.

7. The method according to claim 2, wherein the graphic design displays a datamatrix code on the article surface.

8. The method according to claim 1, wherein the surface material of the article is metallic, and wherein the manufacturing technique comprises chemical or laser engraving, chemical etching, stamping, or brushing.

9. The method according to claim 8, wherein the article is a luxury product with a metallic surface.

10. The method according to claim 9, wherein the luxury product is a watch and the metallic surface is the back of the watch.

11. The method according to claim 1, wherein the manufacturing technique is incapable of exactly reproducing the non-reproducible microstructure noise characteristics, whereby at least one article surface microstructure surface feature renders the article physically unique.

12. The method according to claim 1, wherein the random or pseudo-random, non-reproducible microstructure noise characteristics comprise a predetermined resolution, coarseness, surface roughness, or other property enabling the imaging of at least one article surface microstructure feature at the pixel level using the predetermined imaging technology at a resolution below 4800 dpi.

13. The method according to claim 1, wherein the authentication pattern is a filtered image of the visible image feature.

* * * * *